United States Patent
Martin et al.

(10) Patent No.: US 10,928,513 B2
(45) Date of Patent: Feb. 23, 2021

(54) SYSTEM FOR MONITORING AND/OR SURVEYING CONDUITS

(71) Applicant: REECE INNOVATION CENTRE LIMITED, Newcastle Upon Tyne (GB)

(72) Inventors: James Martin, Whitley Bay (GB); Reza Tamadoni, Durham (GB); Luke Griffiths, Gateshead (GB); Rebecca Sills, Whitley Bay (GB); Simone Stuart-Cole, Morpeth (GB); Ralf Ferber, Horsham (GB)

(73) Assignee: REECE INNOVATION CENTRE LIMITED, Newcastle Upon Tyne (GB)

( * ) Notice: Subject to any disclaimer, the term of this patent is extended or adjusted under 35 U.S.C. 154(b) by 0 days.

(21) Appl. No.: 16/062,666

(22) PCT Filed: Dec. 15, 2016

(86) PCT No.: PCT/EP2016/081268
§ 371 (c)(1),
(2) Date: Jun. 15, 2018

(87) PCT Pub. No.: WO2017/102990
PCT Pub. Date: Jun. 22, 2017

(65) Prior Publication Data
US 2019/0310364 A1    Oct. 10, 2019

(30) Foreign Application Priority Data
Dec. 15, 2015   (GB) ...................................... 1522151

(51) Int. Cl.
*G01N 29/07*   (2006.01)
*G01S 15/04*   (2006.01)
(Continued)

(52) U.S. Cl.
CPC .............. *G01S 15/04* (2013.01); *G01N 29/07* (2013.01); *G01N 29/14* (2013.01); *G01N 29/348* (2013.01);
(Continued)

(58) Field of Classification Search
CPC .......... G01S 15/04; G01S 15/06; G01M 3/24; G01M 13/243; G01M 13/2807;
(Continued)

(56) References Cited

U.S. PATENT DOCUMENTS

| | | | | |
|---|---|---|---|---|
| 5,389,692 A | * | 2/1995 | Bertram ................. | B05D 7/222 |
| | | | | 428/160 |
| 6,082,193 A | * | 7/2000 | Paulson ................ | G01M 3/243 |
| | | | | 73/152.58 |

(Continued)

FOREIGN PATENT DOCUMENTS

| | | |
|---|---|---|
| EP | 2778069 A1 | 9/2014 |
| GB | 1302028 | 1/1973 |

(Continued)

OTHER PUBLICATIONS

Search Report, dated Mar. 7, 2016, in GB1522151.8.
International Search Report & Written Opinion, dated Mar. 29, 2017.

*Primary Examiner* — Hung T Nguyen
(74) *Attorney, Agent, or Firm* — Thomas | Horstemeyer, LLP

(57) ABSTRACT

A method for inspecting a conduit comprising the steps of: emitting an outgoing signal into the conduit to establish an acoustic plane wave within the conduit; and detecting a reflected outgoing signal from the conduit, wherein the outgoing signal is arranged such that low frequency components contribute to more of the outgoing signal, from a time perspective, than high frequency components.

17 Claims, 48 Drawing Sheets

(51) Int. Cl.
*G01S 15/06* (2006.01)
*G01N 29/44* (2006.01)
*G01S 15/10* (2006.01)
*G01N 29/34* (2006.01)
*G01S 15/34* (2006.01)
*G01S 15/88* (2006.01)
*G01N 29/14* (2006.01)
*G01N 29/50* (2006.01)

(52) U.S. Cl.
CPC ......... *G01N 29/4463* (2013.01); *G01N 29/50* (2013.01); *G01S 15/06* (2013.01); *G01S 15/10* (2013.01); *G01S 15/34* (2013.01); *G01S 15/88* (2013.01); *G01N 2291/011* (2013.01); *G01N 2291/044* (2013.01)

(58) Field of Classification Search
CPC ........ G01N 29/07; G01N 29/36; G01N 29/40; G01N 29/041; G01N 29/04; G01N 2291/044; G01B 17/00; E21B 47/06; E21B 47/047; E21B 47/095
USPC ............... 340/606, 607, 608, 611, 614, 618; 367/93, 83
See application file for complete search history.

(56) References Cited

U.S. PATENT DOCUMENTS

| | | | |
|---|---|---|---|
| 6,179,084 B1 * | 1/2001 | Yamamoto | G01V 1/42 181/106 |
| 6,940,409 B1 * | 9/2005 | Green | G01M 3/243 340/286.05 |
| 7,266,992 B2 * | 9/2007 | Shamout | G01M 3/243 73/40.5 A |
| 2003/0033879 A1 | 2/2003 | Adewumi et al. | |
| 2005/0011278 A1 * | 1/2005 | Brown | G01F 1/666 73/861.18 |
| 2010/0319463 A1 * | 12/2010 | Richardson | G01N 1/2211 73/861.11 |
| 2014/0311245 A1 | 10/2014 | Horoshenkov | |
| 2015/0114120 A1 * | 4/2015 | Schroder | G01M 99/00 73/579 |
| 2015/0300161 A1 * | 10/2015 | Kamata | G01V 1/48 166/250.01 |
| 2015/0362465 A1 * | 12/2015 | Martin | G01N 29/11 73/592 |
| 2016/0252422 A1 * | 9/2016 | Howitt | E03B 7/071 73/40.5 A |

FOREIGN PATENT DOCUMENTS

| | | |
|---|---|---|
| GB | 2310719 | 9/1997 |
| GB | 2527208 | 12/2015 |
| WO | 2011124924 | 10/2011 |
| WO | 2015073313 | 5/2015 |

\* cited by examiner

SYSTEM FOR MONITORING AND/OR SURVEYING CONDUITS

CROSS-REFERENCE TO RELATED APPLICATIONS

This application is the 35 U.S.C. § 371 national stage of PCT application having serial number PCT/EP2016/081268, filed on Dec. 15, 2016. This application also claims priority to GB application entitled "SYSTEM FOR MONITORING AND/OR SURVEYING CONDUITS," having serial number 1522151.8 filed on Dec. 15, 2015, each of which are entirely incorporated herein by reference.

FIELD OF THE INVENTION

The present invention relates generally to conduits and particularly to a system and a method for monitoring and/or surveying conduits. It provides a means whereby conduits can be monitored and the presence of, and/or location of, potential partial and total blockages; and/or clandestine deposits can be identified.

BACKGROUND OF THE INVENTION

Whilst conduit-surveying devices based on acoustic reflectometry are available on the market, they are generally aimed at the water industry and the focus is primarily on monitoring the liquid level, for example in rain water storm drains. Whilst a build-up of fluid in a conduit can indicate the presence of a blockage further down the network, this is not always the case. Furthermore, detecting the rise in liquid level as a result of a blockage in the network offers no insight into the blockage location. A number of monitoring systems measure the rate of flow of fluid in a drain which can be a useful means of monitoring the state of the drain or sewer. There are other devices available which are designed to locate blockages in conduits but they exclusively operate in air/gas.

To the best of our knowledge, there are no commercially available devices that can accurately detect blockages in fluid filled pipelines, nor are there any available that can be permanently mounted and whose performance is unaffected by the surrounding media. As such, no adequate means of monitoring the condition of conduits exists.

The present invention seeks to provide a means for surveying and/or monitoring conduits. This invention has applications in a number of industries. In particular, applications are found in the military for conduit inspection, and the water, nuclear, oil and gas industries for pipeline network inspection and monitoring.

The term "conduit" includes, for example culverts, pipes, sewers, drains and tunnels. Culverts, tunnels, drains, sewers, and general pipeline networks can easily become either partially or totally blocked for a variety of reasons.

In the military, conduits that pass under or near transport routes (i.e. roads, train lines etc.) can be packed with explosives (mines or improvised explosive devices) which, if detonated, can cause loss of life, asset damage and disruption to transport routes and networks, i.e. the route can be disrupted, material damaged and destroyed, and personnel either killed or injured. Military patrols need to make painstaking investigations of conduits that traverse their route. These surveys are very time consuming and place the static patrol at risk from attack. No rapid surveying method is known for surveying conduits with a view to identifying potential presence of explosives and improvised explosive devices. The development of a device that could quickly and accurately provide information on if a blockage exists, and where it is located, could serve as a tool for military personnel to quickly check for high risk obstructions.

In the fresh and waste water industries, conduits can become either partially or completely blocked due to cave-ins, tree root ingress (and other effects due to nature) or simply the accumulation of solid components from the media flowing through the pipes, e.g. fat-bergs in the sewerage network. When an obstruction occurs, sewerage may leak into the surrounding area creating a health risk and requiring significant remedial action. The development of a device that could quickly and accurately provide information on if a blockage exists, and where it is located, could serve as a useful tool and in the water industry, where regular surveillance of the condition of the conduit network will assist with the scheduling of planned maintenance and thereby reducing instances of urgent, unplanned maintenance.

SUMMARY OF THE INVENTION

The present invention relates generally to conduits and particularly to a system and a method for monitoring and/or surveying conduits. It provides a means whereby conduits can be monitored and the presence of, and/or location of, potential partial and total blockages; and/or clandestine deposits can be identified.

According to a first aspect there is provided a method for inspecting a conduit comprising the steps of: emitting an outgoing signal into the conduit to establish an acoustic plane wave within the conduit; and detecting a reflected outgoing signal from the conduit, wherein the outgoing signal is arranged such that low frequency components contribute to more of the outgoing signal, from a time perspective, than high frequency components.

In some embodiments the outgoing signal is a swept signal. A non-linear sweep may be used, in which more time is spent sweeping at lower frequencies than higher frequencies. The sweep is therefore front-loaded at low frequencies when compared to a linear sweep.

In some embodiments the rate of change of frequency accelerates towards the higher frequencies.

The signal may be amplitude modulated.

An amplitude curve can be imposed to protect an actuator.

In some embodiments the outgoing signal is an acoustic impulse.

In some embodiments a guided wave is set up for a conduit, such as a (sewer) pipe. For example the shortest wavelength may be less than the diameter of a pipe.

The present invention may allow for the use of smaller components to generate the signal, for example a smaller speaker may be used because more time is spent generating the lower frequencies rather than using a larger speaker to generate lower frequencies. This can be used to overcome the natural response of the speaker.

In some embodiments the outgoing signal relates to an exponential frequency sweep, such that the frequency components increase exponentially with respect to time In some embodiments the outgoing signal comprises a sweep through low frequency components at a different rate than a sweep through high frequency components.

In some embodiments the outgoing signal is a signal with a random sweep.

In some embodiments the outgoing signal relates to a linear period sweep, such that the period of the acoustic plane wave decreases linearly with respect to time.

In some embodiments the outgoing signal relates to a linear or non-linear frequency sweep.

In some embodiments the method is used for determining a condition of the conduit. In some embodiments the condition is the existence of a blockage within the conduit and/or a location of a blockage, or structural integrity of the conduit. In some embodiments the condition is a blockage and is an improvised explosive device (IED) in the conduit.

In some embodiments the conduit being inspected is a large diameter conduit having a diameter above 25 centimetres.

The conduit may be one of: a pipe; a pipeline; a culvert; a sewer; a drain; and a tunnel.

In some embodiments the conduit is filled with a liquid and/or gas.

In some embodiments a detector is used to detect the reflected outgoing signal.

In some embodiments a detector is used to detect a transmitted outgoing signal.

The detector may be one of: an acoustic transducer; a speaker; a microphone; a hydrophone; an accelerometer; a pressure sensor; and a vibration sensor.

In some embodiments the detector has a flat spectrum in the acoustic phase.

In some embodiments the step of detecting is accomplished using a series of detectors. In some embodiments the series of detectors provides a higher precision interrogation of an extended length of conduit. In some embodiments multiple measurement positions extend the length of inspection of the conduit.

In some embodiments the method may comprise mounting each detector outside the conduit to provide a non-invasive inspection of the conduit.

In some embodiments the method is used for detecting one or more blockages in the conduit.

In some embodiments the acoustic plane wave is a guided wave.

In some embodiments the acoustic plane wave has a frequency that is dependent upon a diameter of the conduit and the highest frequency has a wavelength that is larger than the diameter of the conduit.

In some embodiments the method for inspecting an air filled conduit comprising the steps of: emitting an outgoing signal, detecting a reflected outgoing signal from the conduit, and cross-correlating the detected reflected outgoing signal with the emitted outgoing signal. In some embodiments the cross-correlation determines a change in phase shift or polarity of the reflected signal, to determine an inherent feature of the conduit.

In some embodiments the method is used to determine the existence of a blockage within the conduit and determine a cross-sectional area of the blockage relative to the diameter of the conduit.

In some embodiments the conduit is filled with fluid and the detecting of the signal is performed using an array of acoustic transducers. In some embodiments the conduit is part-filled with fluid and part-filled with gas and the acoustic transducers are hydrophones.

In some embodiments the outgoing signal is emitted and/or detected externally of the conduit.

According to a further aspect there is provided a system for monitoring and/or surveying a conduit, comprising: an acoustic source for emitting a signal to propagate along the conduit; and an acoustic detector for receiving one or more signals that are propagating along the conduit.

In some embodiments the system further comprises a filter component (for the acoustic source).

In some embodiments the system further comprises a sweep component for determining a type of swept signal.

In some embodiments the signal is one of: a linear period sweep; an exponential frequency sweep; and a linear frequency sweep for the emitted signal.

In some embodiments the system further comprises a plurality of detectors.

In some embodiments the detector is one of: an acoustic transducer; a speaker; a cardioid microphone; a bi-directional microphone; a hydrophone; an accelerometer; and a pressure sensor.

In some embodiments each detector has a flat spectral response in the acoustic phase.

In some embodiments each detector is arranged to detect a reflected or transmitted signal.

In some embodiments each detector is permanently deployed in the conduit.

In some embodiments the conduit comprises a conduit medium that may or may not be actively flowing through the conduit.

In some embodiments the system further comprises a memory for storing data relating to detected signals.

In some embodiments the system further comprises a processor for analysing signal data. In some embodiments the processor allows for cross-correlation of the received signals with the emitted signals. In some embodiments the processor allows for determination of a cross-sectional area of a blockage in the conduit relative to a diameter of the conduit. In some embodiments the processor allows for determination of a propagation direction of received signals. In some embodiments the processor allows for determination of the existence of a small number of blockages in the conduit.

In some embodiments the analysis of signal data provides determination of a condition of the conduit.

In some embodiments the condition is a blockage and/or wherein a location of a blockage is determined.

In some embodiments the conduit is a polyurethane pipe.

In some embodiments the system further comprises deployment means for locating the acoustic source and/or acoustic detector on an external wall of the conduit.

In some embodiments the system further comprises coupling means for coupling the signal between an acoustic source and/or a detector and the conduit.

According to a further aspect there is provided a system and method substantially as hereinbefore described with reference to, and as shown in, the accompanying drawings.

According to a second aspect there is provided a method for inspecting an air filled conduit comprising the steps of: emitting an outgoing signal into the air filled conduit to establish an acoustic plane wave within the conduit; detecting a reflected outgoing signal from the conduit; and cross-correlating the detected reflected outgoing signal with the emitted outgoing signal.

The outgoing signal may be arranged such that low frequency components contribute to more of the outgoing signal, from a time perspective, than high frequency components.

The shortest wavelength in the outgoing signal may be larger than the diameter of the conduit.

In some embodiments the conduit is closed at one end.

The source for emitting the outgoing signal may be co-located with a detector. The detector may be a cardioid microphone, a bi-directional microphone, an accelerometer or hydrophone. The hydrophone may be hermetically sealed.

The spectrum detected by the detector may have a flat frequency response.

The method may be used to determine the existence of a blockage in the conduit.

The method may be used to accurately determine the location of a blockage or blockages in the conduit.

In some embodiments the conduit is a polyurethane pipe.

In some embodiments the inspection range provided by the method is over 300 meters along the length of the conduit.

In some embodiments the outgoing signal relates to an exponential frequency sweep, such that the frequency components increase exponentially with respect to time.

In some embodiments the outgoing signal may comprise a sweep through low frequency components at a different rate than a sweep through high frequency components.

In some embodiments the outgoing signal is a signal with a random sweep.

In some embodiments the outgoing signal relates to a linear period sweep, such that the period of the acoustic plane wave decreases linearly with respect to time.

In some embodiments the outgoing signal relates to a linear frequency sweep. In other embodiments the outgoing signal relates to a non-linear frequency sweep.

The method may be used for determining a condition of the conduit. The condition of the conduit may be the existence of a blockage within the conduit and/or the location of the blockage in the conduit. The condition of the conduit may be a structural integrity of the conduit.

The method may be particularly suited for monitoring or surveying a large diameter conduit having a diameter above 25 centimetres.

The method may be used for surveying a conduit, a pipe, a pipeline or a culvert.

In some embodiments the conduit may be filled with a liquid and/or gas or both.

In some embodiments the method may be used to detect a blockage that is an improvised explosive device (IED) in a culvert.

In some embodiments a receiver may be used to detect the reflected outgoing signal. A receiver may alternatively or additionally be used to detect a transmitted outgoing signal. In particular, a receiver may be permanently deployed for monitoring.

The receiver may be a speaker, microphone and/or hydrophone. The receiver may have a flat spectrum in the acoustic phase.

In some embodiments the step of detecting is accomplished using a series of receivers. The series of receivers may provide a higher precision interrogation of an extended length of conduit. The series of receivers may provide multiple measurement positions to extend the useful range of pinging.

In some embodiments a plurality of receivers may be arranged to detect more than one blockage in the conduit. The location of a second blockage may be located away from the position of a first and/or second receiver.

In some embodiments the acoustic plane wave has a frequency that is dependent upon a diameter of the conduit, wherein the highest frequency has a wavelength that is larger than a diameter of the conduit. The acoustic plane wave may be a guided wave.

In some embodiments a detector and/or receiver is mounted outside the conduit or on an external surface of the conduit to provide a non-invasive inspection of the conduit. The conduit or pipe may be filled with a hazardous substance.

According to a third aspect there is provided a method for characterising an air filled conduit comprising the steps of: emitting an outgoing signal into the air filled conduit to establish an acoustic plane wave within the conduit, wherein the outgoing signal is arranged such that low frequency components contribute to more of the outgoing signal, from a time perspective, than high frequency components; detecting a reflected outgoing signal from the conduit; and cross-correlating the detected reflected outgoing signal with the emitted outgoing signal.

In some embodiments the outgoing signal is a swept signal.

In some embodiments the outgoing signal is an acoustic impulse.

The cross-correlation may determine a change in a phase shift or polarity of the reflected signal to determine an inherent feature of the conduit.

In some embodiments the method is used to detect the presence of a fracture in the conduit wall or a gap in the conduit, such as a man-hole access point. The method may be used to determine an integrity of the conduit. The method may be used to detect a cave in or a T-junction in the conduit.

In some embodiments a condition of the conduit end is monitored. The conduit may be closed at one end or closed at both ends.

In some embodiments the conduit may comprise one or more T-junctions that are closed or open at one end.

In some embodiments the step of detecting a signal may comprise using an acoustic transducer. The step of detecting may be achieved using a cardioid microphone, a bi-directional microphone, a hydrophone or an accelerometer.

The outgoing signal may relate to an exponential frequency sweep, such that the frequency components increase exponentially with respect to time.

The outgoing signal may comprise a sweep through low frequency components at a different rate than a sweep through high frequency components.

The outgoing signal may be a signal with a random sweep.

The outgoing signal may relate to a linear period sweep, such that the period of the acoustic plane wave decreases linearly with respect to time.

The outgoing signal may relate to a linear or non-linear frequency sweep.

According to a fourth aspect there is provided a method for characterising a blockage within an air filled conduit comprising the steps of: emitting an outgoing signal into the air filled conduit to establish an acoustic plane wave within the conduit; detecting a reflected outgoing signal from the conduit; and cross-correlating the detected reflected outgoing signal with the emitted outgoing signal, wherein a cross-sectional area of the blockage relative to the diameter of the conduit is determined.

In some embodiments the outgoing signal is a swept signal.

In some embodiments the outgoing signal is an acoustic impulse.

The outgoing signal may be arranged such that low frequency components contribute to more of the outgoing signal, from a time perspective, than high frequency components.

The method may further comprise the step of establishing a baseline and inferring a blockage in the conduit based on a loss of transmitted energy through the conduit.

In some embodiments multiple receivers are used to perform the steps of emitting and/or detecting.

In some embodiments the step of cross-correlating may comprise using amplitude envelope data and/or a Hilbert transform function.

In some embodiments the step of cross-correlating may comprise a time-lapse analysis technique.

In some embodiments the step of cross-correlating may comprise subtracting a dataset for a reference or baseline recorded in the absence of a blockage from a dataset acquired or measured in the presence of a blockage.

In some embodiments the method is used to monitor changes in the condition of the conduit by removing signals from permanent features, e.g. man-holes or T-junctions, hence leaving only signals from new features, e.g. one or more blockages or obstructions in the conduit.

The method may be used to indicate a percentage of the conduit diameter that is blocked and/or the location of the blockage(s).

In some embodiments the method is used to monitor the evolution of a blockage size or cross-sectional area or growth of a blockage based on a plurality of measurements performed over time.

In some embodiments the conduit or pipe may be partially open and partially closed at one end, e.g. representing a gate or grill.

According to a fifth aspect there is provided a method for inspecting a fluid-filled conduit comprising the steps of: emitting an outgoing signal into the conduit to establish an acoustic plane wave within the conduit; and detecting a reflected outgoing signal from the conduit, and wherein the detecting of the signal is performed using two or more acoustic transducers.

In some embodiments the outgoing signal is a swept signal.

In some embodiments the outgoing signal is an acoustic impulse.

The outgoing signal may be arranged such that low frequency components contribute to more of the outgoing signal, from a time perspective, than high frequency components.

The step of detecting may be achieved using acoustic transducers that are arranged in an array. The acoustic transducers may be used to determine a direction of propagation of the detected signal.

In some embodiments the method may comprise the step of analysing detected signals using a shift and sum method, or array separation method, or pressure gradient method.

The method may be used to determine a condition of the conduit. The condition of the conduit determined may indicate a blockage in the conduit and/or the location of the blockage(s).

In some embodiments an acoustic transducer may be used to detect a series of reflected signals. The reflected signals detected may be recorded. There may be a lag in arrival time between each acoustic transducer in an array.

The method may be used to determine a speed of sound in the fluid within the conduit using at least two hydrophones. The speed of sound in the fluid may be determined based on the lag in arrival time of the same event at two hydrophones.

In some embodiments an array of acoustic transducers may be located in front of a source emitting the signal into the conduit. The array may comprise five or more acoustic transducers. Each acoustic transducer may be hermetically sealed. Each acoustic transducer may be a hydrophone.

In some embodiments the conduit is closed at one end.

In some embodiments the conduit is a polyurethane pipe.

In some embodiments the method is used to detect blockages in a conduit where the blockages are partially or fully submersed in a fluid, i.e. below a level of fluid in the conduit. The fluid in the conduit may be water.

In some embodiments the step of detecting is performed using a detector that is an accelerometer.

According to a further aspect there is provided a method for inspecting a fluid-filled conduit comprising the steps of: emitting from an acoustic source an outgoing signal into the conduit to establish an acoustic plane wave within the conduit; and detecting using two or more acoustic transducers a reflected outgoing signal from the conduit, wherein the acoustic transducers are co-located with the acoustic source.

In some embodiments the acoustic transducers are hydrophones and/or accelerometers.

In some embodiments the frequency response of the accelerometer may be scaled to match the bandwidth of the hydrophone (or vice-versa).

According to a sixth aspect there is provided a method for inspecting a conduit that is part-filled with fluid and part-filled with air/gas comprising: emitting an outgoing signal into the conduit to establish an acoustic plane wave within the conduit; and detecting a reflected outgoing signal from the conduit, and wherein the detecting of the signal is performed using an array of hydrophones.

In some embodiments the outgoing signal is a swept signal.

In some embodiments the outgoing signal is an acoustic impulse.

The outgoing signal may be arranged such that low frequency components contribute to more of the outgoing signal, from a time perspective, than high frequency components.

In some embodiments the conduit is inspected over a long range of over 5 metres.

In some embodiments a condition of the conduit is determined. The condition may be a blockage in the conduit.

In some embodiments the method provides for characterisation of the conduit for identifying its inherent features. For example, the ends of the conduit may be open-ended or closed-ended, or there may be man-holes or access points present along the conduit.

In some embodiments the hydrophones are permanently mounted.

In some embodiments the conduit is inspected irrespective of changing conditions within the conduit or the medium carried within conduit.

In some embodiments the array of hydrophones may emit a chirped-signal and detected signals may be cross-correlated with the emitted signals to survey the conduit.

According to a seventh aspect there is provided a method for separating data for detected signals received at two pressure sensors placed directly in line with a source and closely located, the method comprising the steps of: determining a direction of propagation of detected signals; and performing signal processing of the detected signals, to separate backward-traveling waves in an opposite direction from which a source is pointing, and forward-traveling waves in a direction in which the source is pointing.

The backward-traveling waves in an opposite direction from which a source is pointing may be referred to as up-going waves having up-going data signals.

The forward-traveling waves in a direction in which the source is pointing may be referred to as down-going waves having down-going data signals.

In some embodiments the pressure sensors are located in a conduit.

In some embodiments the pressure sensors are acoustic transducers, for example hydrophones.

In some embodiments the method may comprise use of two or more pressure sensors.

In some embodiments the step of signal processing may involve use of a pressure gradient calculation. The pressure gradients may be a vertical or horizontal pressure gradient.

The pressure gradient is taken in the direction of travel of the acoustic waves or signals within the conduit. For example, a horizontal pressure gradient is taken in a direction that is parallel to the direction of travel of the waves or signal through the conduit; and a vertical pressure gradient is taken in a direction that is perpendicular to the direction of travel of the signal through the conduit.

The pressure gradient technique may be used to determine a velocity or an acceleration of the acoustic signal within the conduit.

In some embodiments the step of signal processing may involve use of the equation:

$$p^u(x) = \frac{1}{2}\left(p(x) + c\frac{1}{i\omega}\frac{dp(x)}{dz}\right).$$

In some embodiments the step of signal processing involves suppressing up-going data signals.

In some embodiments the step of signal processing comprises the steps of taking the spatial pressure gradient, applying a temporal integration filter in the frequency domain to the spatial pressure gradient, and applying a band limitation to compensate for an amplification of low frequencies. The step of signal processing may further comprise applying a scaling to the pressure gradient according to a velocity of the waves propagating in the medium within the conduit.

In some embodiments the step of signal processing comprises the step of differentiating pressure data.

In some embodiments the step of signal processing comprises the steps of taking the spatial pressure gradient and applying a scaling according to a velocity of the waves in the medium within the conduit, differentiating the spatial pressure gradient for up-going data, and applying a convolution filter in the spatial domain.

In some embodiments the step of signal processing comprises the steps of differentiating the pressure gradient in the frequency domain and applying an inverse temporal integration filter.

In some embodiments the step of signal processing may comprise use of a shift and subtract calculation.

In embodiments comprising the shift and subtract calculation, the step of signal processing may further comprise shifting data from the second pressure sensor such that in the time domain it aligns with data from the first pressure sensor, and subtracting this shifted data for the second pressure sensor from the data for the first pressure sensor. In some embodiments down-going waves may be attenuated.

In embodiments comprising the shift and subtract calculation, the step of signal processing may further comprise applying further processing to remove any phase errors introduced as a consequence of the shifting data.

According to an eighth aspect there is provided a method for determining an origin of a detected reflected signal in a conduit, the method comprising the steps of: defining a first data set acquired in the absence of a blockage in the conduit; defining a second data set acquired in the presence of a blockage at a pre-determined location in the conduit; correlating the first data set with an outgoing signal to define a source signal; correlating the second data set with the outgoing signal; and deconvolution of the source signal of the first data set from the second data set, thereby increasing temporal frequency bandwidth in the second data set for an anomaly detection.

In some embodiments the outgoing signal is a swept signal.

In some embodiments the outgoing signal is an acoustic impulse.

In some embodiments the determination of the origin of the detected reflected signal in the conduit indicates the location of the anomaly in the conduit. The anomaly may represent a blockage in the conduit.

In some embodiments the step of correlating the first data set with an outgoing signal to define a source signal comprises compressing the first data set into a spike or impulse shape (source signal becomes a spike).

In some embodiments the step of correlating the second data set with the outgoing signal comprises compressing the second data set into a spike or impulse shape.

In some embodiments the outgoing signal is arranged such that low frequency components contribute to more of the outgoing signal, from a time perspective, than high frequency components.

In some embodiments the deconvolution of the source signal is performed using a sparse-spike deconvolution technique. The deconvolution of the source signal may be performed using a Weiner deconvolution technique.

In some embodiments the step of deconvolution is based on matching pursuit wavelet deconvolution, wherein the temporal sample having the highest absolute amplitude is iteratively selected to define the temporal sample having the maximum amplitude.

In some embodiments the step of deconvolution may further comprise using the temporal location of the temporal sample having the maximum amplitude to temporally centre the source signal at.

In some embodiments the step of deconvolution may further comprise subtracting the source signal from the second data set such that the deconvolved trace is estimated from the maximum amplitude.

In some embodiments the conduit is a sewer. The method may allow for automatic detection of a blockage in a sewer.

The method may be used to determine the existence of a small number of blockages in the conduit.

In some embodiments the method allows for accurate determination of the location of a blockage in the conduit.

According to a ninth aspect there is provided a method for inspecting a conduit comprising the steps of: providing an acoustic source and/or receiver on a conduit, the acoustic source and/or receiver located externally of the conduit; and detecting an acoustic impulse traveling through the conduit.

The acoustic source and/or receiver may be located on an external wall of the conduit.

The method may comprise coupling the acoustic impulse between the acoustic source and/or receiver and the conduit.

In some embodiments the method comprises emitting an acoustic impulse through the conduit from an acoustic source.

In some embodiments the acoustic receiver may be arranged as an array of accelerometers. The accelerometers may be linearly arranged along the length of the conduit in the general direction of an acoustic impulse traveling through the conduit. The spacing between each consecutive accelerometer may be 0.2 metres.

In some embodiments the acoustic receiver may comprise at least five accelerometers. The length of an array of the five or more accelerometers is at least 0.8 metres.

The method of inspecting the conduit may be non-invasive. For example, a medium within the conduit may be toxic or hazardous in nature.

In some embodiments the method further comprises the step of analysing the detected acoustic impulse to determine a condition of the conduit.

The conduit may be substantially filled with a gas, for example air; substantially filled with a fluid, such as water; or partially filled with gas and fluid.

In some embodiments the conduit is air-filled and/or fluid-filled.

In some embodiments the conduit is closed at both ends.

In some embodiments the acoustic impulse is arranged such that low frequency components contribute to more of the acoustic impulse, from a time perspective, than high frequency components.

The present invention also provides apparatus for performing methods described herein.

The apparatus may comprise means for generating an acoustic signal and means for detecting reflected signal.

In some embodiments the detector is a hydrophone. It has been found that a hydrophone can be useful for detecting signals both in an out of fluid submersion e.g. the hydrophone can be used to detect signals is air as well.

In some embodiments the detector is an accelerometer.

In some embodiments a mechanical isolation system is provided, for example to stop extraneous vibrations making their way to components of the system. The present invention may therefore provide for the vibration isolation of a speaker and/or other mechanical components.

In some embodiments, for example, a 3-dimensional suspension mechanism is used to suspend a speaker. This means that the signal generated from the speaker is "pure" and reflected signals can be reliably compared to an emitted signal.

Further particular and preferred aspects of the present invention are set out in the accompanying independent and dependent claims. Features of the dependent claims may be combined with the features of the independent claims as appropriate, and in combination other than those explicitly set out in the claims. Each aspect can be carried out independently of the other aspects or in combination with one or more of the other aspects.

The present invention will now be more particularly described, with reference to the accompanying drawings, in which:

FIG. 21 is a schematic describing geometry of hydrophone air test;

DESCRIPTION

The methods described herein are a means of surveying conduits, for example to detect and locate partial or total blockages. The same methods may be used to continually or frequently monitor the state of the conduits. A conduit may have an external wall or surface that has a circular or cylindrical cross-sectional shape. A conduit may be completely or mainly filled with air; completely or mainly filled with liquid; or filled with a mix of air and liquid. A conduit may be surveyed to provide a clear response for no blockage and a new response for comparing the new response to the clear response, such that deviation from the clear response may be an indication of a change within the conduit which requires further investigation or remedial action. A status signal may be transmitted to a control centre to provide an alert or status signal. For example, an alarm may be configured to send a local and/or remote alarm signal if a trigger event occurs, for example if a fluid level rising above a threshold is detected or if movement within a conduit is detected.

Figure 1A:
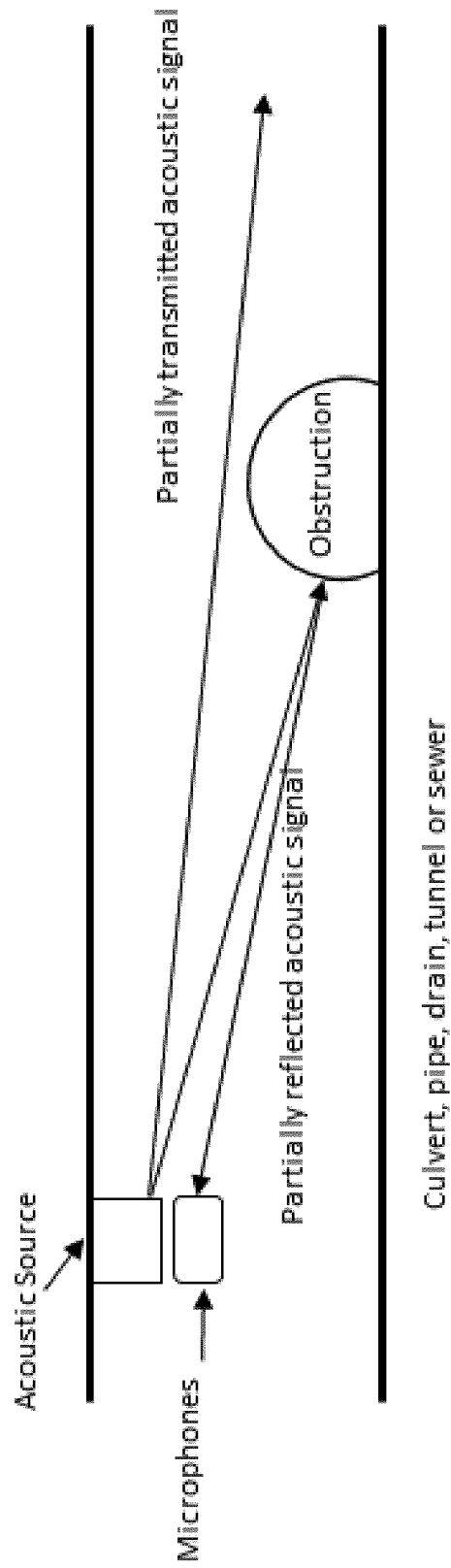
FIG. 1A is a schematic showing acoustic surveying of a conduit, where the acoustic source and receiver are co-located.

FIG. 1A shows a high frequency acoustic source, co-located with microphones acting as receivers. A starting pistol may be used as a high frequency acoustic source to survey a culvert both before and after the insertion of a fake improvised explosive device (IED). The source may alternatively provide a signal that is a broadband impulse, a swept signal or ultrasonic signal. A combination of omni-directional and bi-directional microphones may be used. The principle of the surveying technique relies on the fact that prior to insertion of the fake IED, all of the acoustic energy emitted from the source is transmitted through the culvert, whereas in the presence of the IED, some portion of the emitted energy would be reflected back towards the source and detected by the receiver.

In some embodiments a plurality of sources and/or a plurality of detectors may be provided. The or at least one of the detectors may be a microphone. Alternatively or additionally the or at least one of the detectors may be a hydrophone. Alternatively or additionally the or at least one of the detectors may be an accelerometer. Alternatively or additionally the or at least one of the detectors may be a vibration sensor. The system may further comprise a chemical detector, for example a detector for detecting volatile organic compounds such as methane.

The source(s) may be one of a speaker, an underwater speaker, a clipper outside the conduit, or a hydrophone. The acoustic source and the acoustic detector may be co-located; for example the detector may be slung or otherwise mounted adjacent (for example beneath) the source.

Figure 1B:
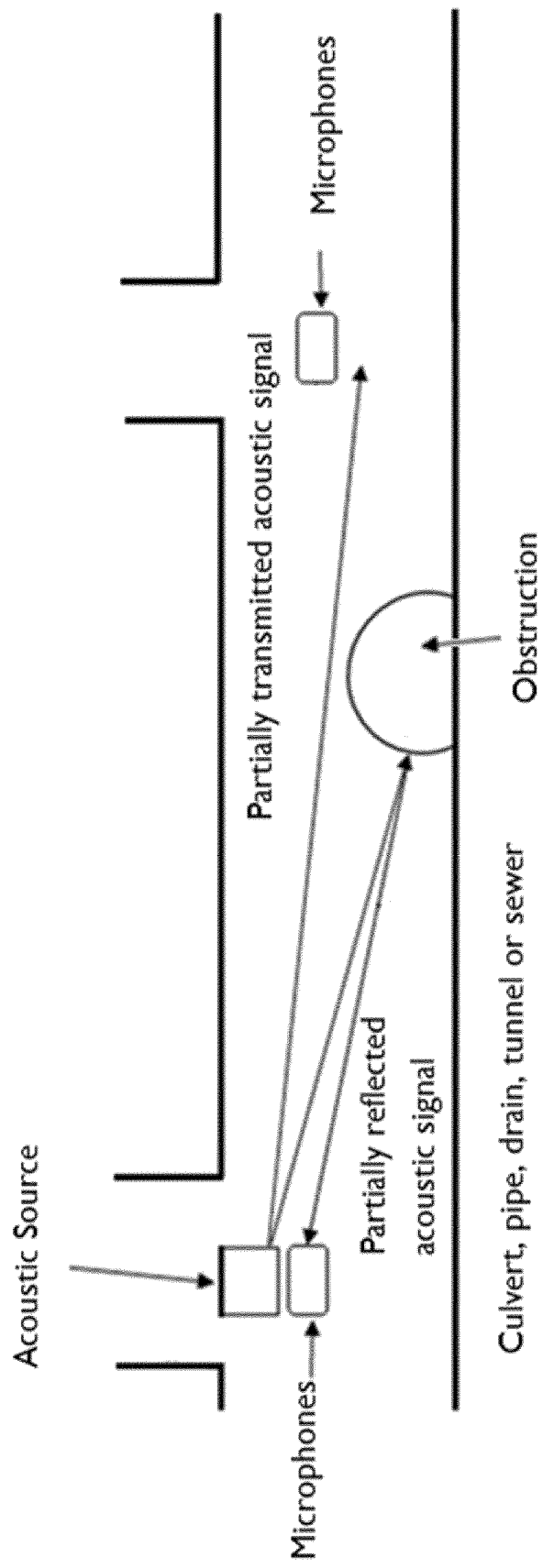
FIG. 1B is a schematic showing acoustic surveying of a conduit, where an acoustic source and first receiver are co-located on one side of an obstruction and a second receiver is located on the opposite side of the obstruction.

FIG. 1B shows acoustic surveying of a conduit, where an acoustic source and first receiver are co-located on one side of an obstruction (as shown in FIG. 1A) and a second receiver is located on the opposite side of the obstruction. The second receiver is arranged to detect signals on the opposite side of the obstruction. The second receiver is arranged to detect transmitted and partially transmitted signals from the source on the opposite side of the obstruction. The second receiver may detect the presence of manholes in the conduit wall.

Figure 1C:
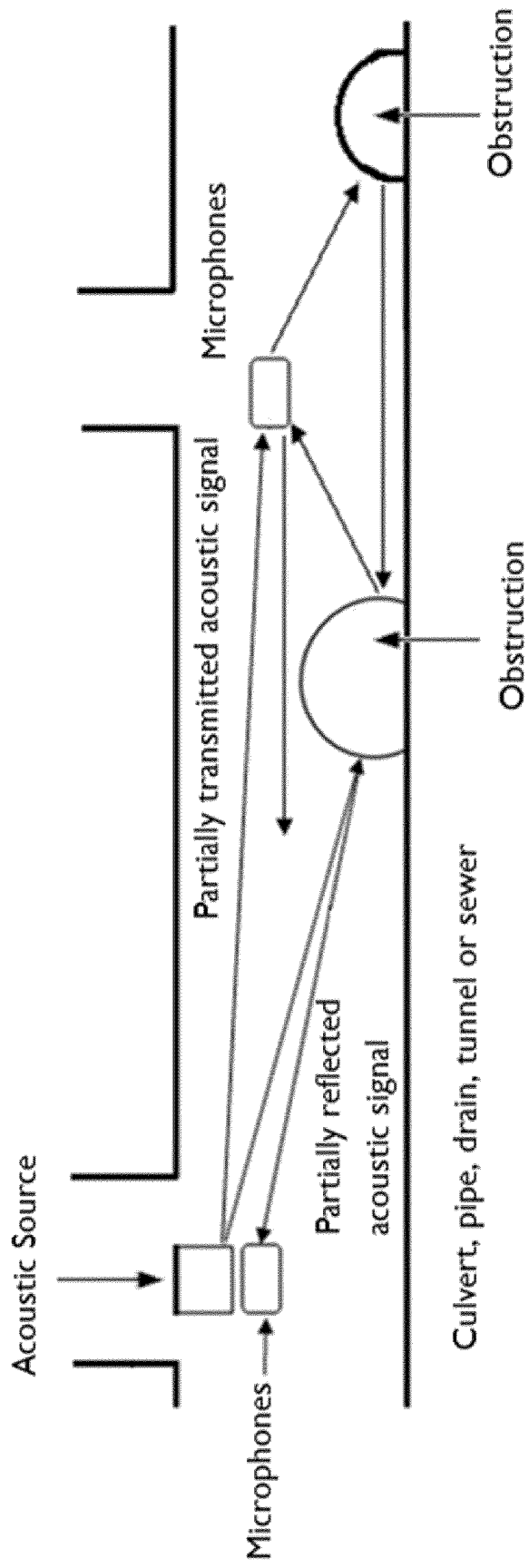
FIG. 1C is a schematic showing acoustic surveying of a conduit as in FIG. 1B, where second receiver is located on the opposite side of the obstruction to the first receiver and where the second receiver can detect transmitted and reflected signals on the opposite side of the obstruction.

FIG. 1C shows acoustic surveying of a conduit (as in FIG. 1B), where the second receiver is located on the opposite side of the obstruction to the first receiver. The second receiver can detect transmitted and reflected signals on the opposite side of the obstruction to the source. For example, the second receiver is arranged to detect a second obstruction in addition to the first obstruction. A plurality of receivers allow for the detection of more than one obstruction in the conduit.

Figure 2:
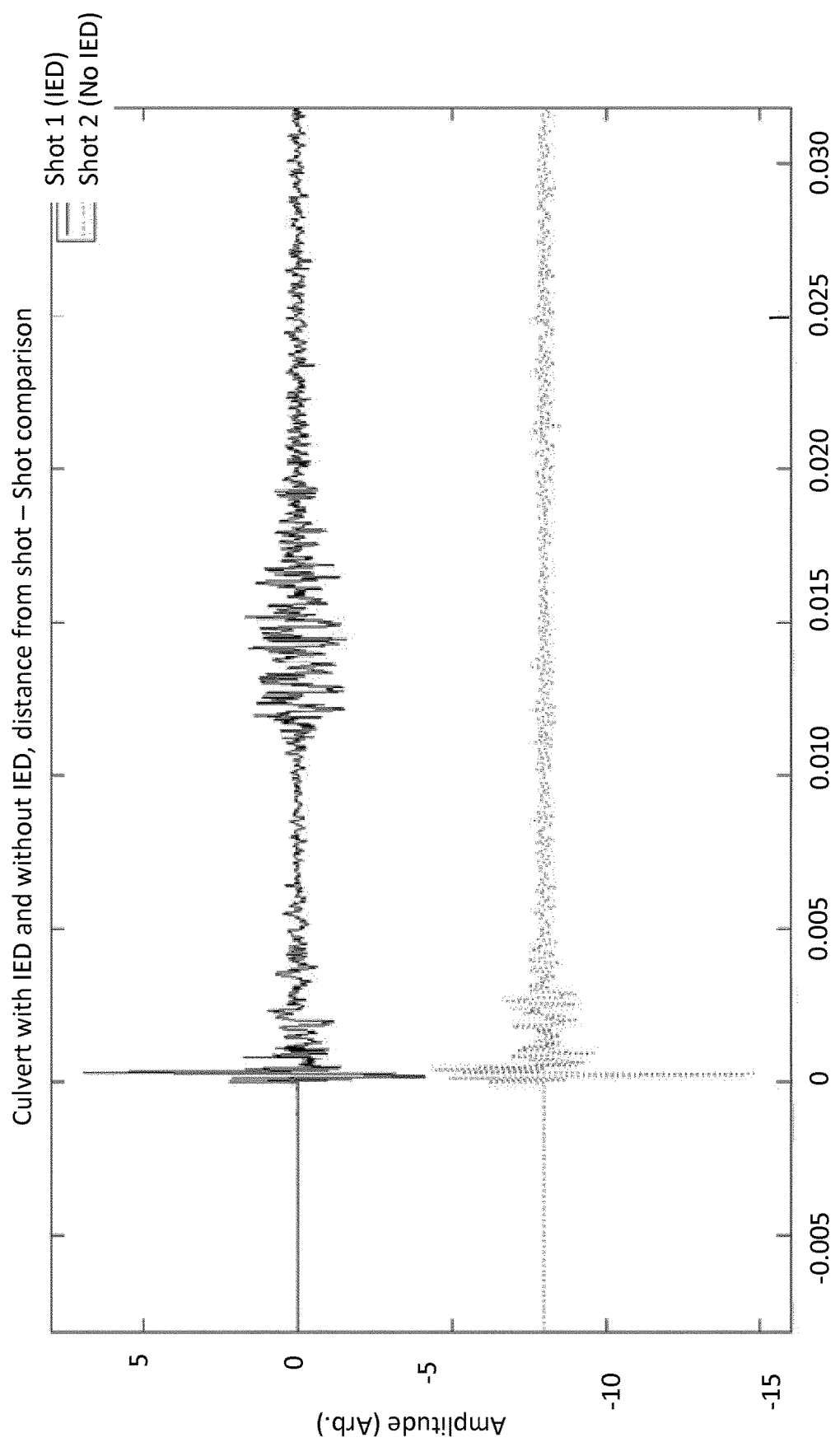
FIG. 2 illustrates recorded signals when: no improvised explosive device (IED) in the culvert (dotted line), with an IED placed in the culvert (solid line)

FIG. 2 shows an acoustic trace for a culvert with no IED (dotted line) and the acoustic trace for the culvert with an IED partially blocking the culvert (solid line). The large signal seen at 0.0 s corresponds to the firing of the starting pistol next to the microphone and represents the propagation start time $t_0$ from which reflection delays can be measured. A high amplitude reflection signal from the IED is clearly seen on the solid lined trace.

Figure 3:
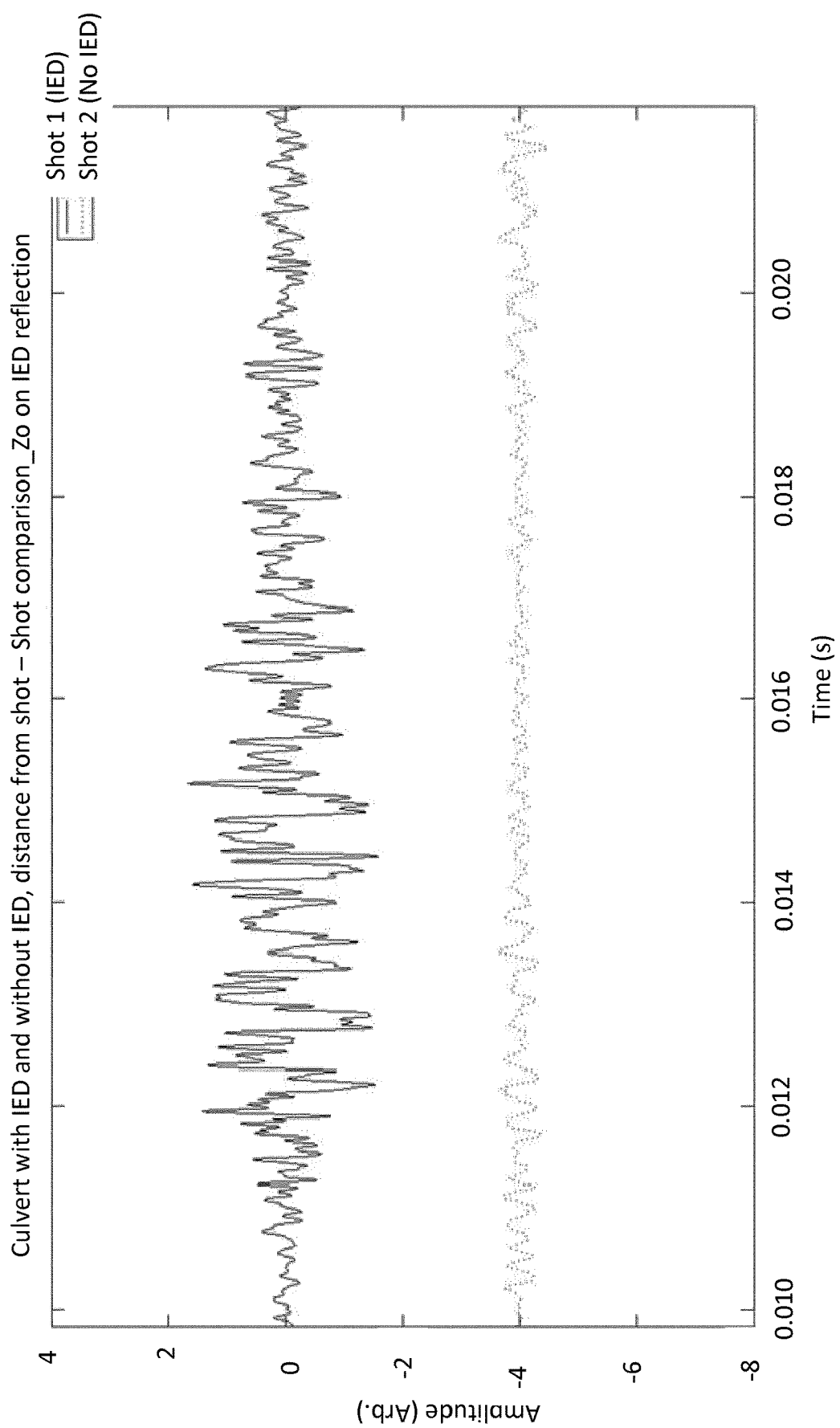
FIG. 3 illustrates a blow-up of the time range where the reflection from the IED can be seen on the blue trace.

FIG. 3 shows a blow-up of the traces around the arrival of the reflection from the IED. The IED reflection arrives at the microphone at 0.01045 s, which corresponds to a two way propagation distance of 3.44 m (assuming a propagation velocity of sound in air of 330 m/s). Taking into account the 0.15 m distance between the source/receiver from the grill covering the entrance to the culvert, it was calculated that the IED was placed 1.57 m from the entrance to the culvert; this corresponds to the position of the IED, which was approximately midway along the 3 m long culvert.

Some of the embodiments described herein improve the data acquisition process for monitoring or surveying a conduit where the conduit can be surveyed reliably with both gas and fluid (or a mixture of both) flowing through the conduit. For example, the conduit may be reliably surveyed in air and/or water.

In order to acquire optimal survey data, the outgoing signal must be carefully designed, taking into account the geometry of the structures being surveyed. Whilst the use of a pulse will result in a clean, easy to interpret signal, only a small amount of energy is generated by the source which can negatively impact on the data acquired. In order to generate a larger amount of energy, it is convention to use a frequency swept signal over several seconds, allowing multiple waves to be combined and recorded.

Cross correlation of the recorded signal with the known output signal allows high energy pulse data to be extracted. Data may be analysed in real time or may be analysed subsequently. Alternatively or additionally data may be transmitted for analysis or recordal elsewhere. Data may be transmitted in a compressed, uncompressed or full precision format.

In order to establish an acoustic plane wave within a pipe structure, the wavelength of the outgoing signal should be approximately 3-10 times longer than the diameter of the pipe. For example, for a 0.9 m diameter pipe, a typical diameter from a storm drain, the outgoing signal should have a wavelength of at least 2.7 m. Assuming the speed of sound in air to be 330 m/s, the centre frequency for the outgoing signal should be 330/2.7=122 Hz. Clearly, the diameter of the speaker must be smaller than the diameter of the pipe and hence far smaller than the wavelength that is required of the outgoing signal. The frequency spectrum of a signal may be tuned to emit a guided wave along the conduit which may help to increase the signal penetration along the conduit.

Figure 4:
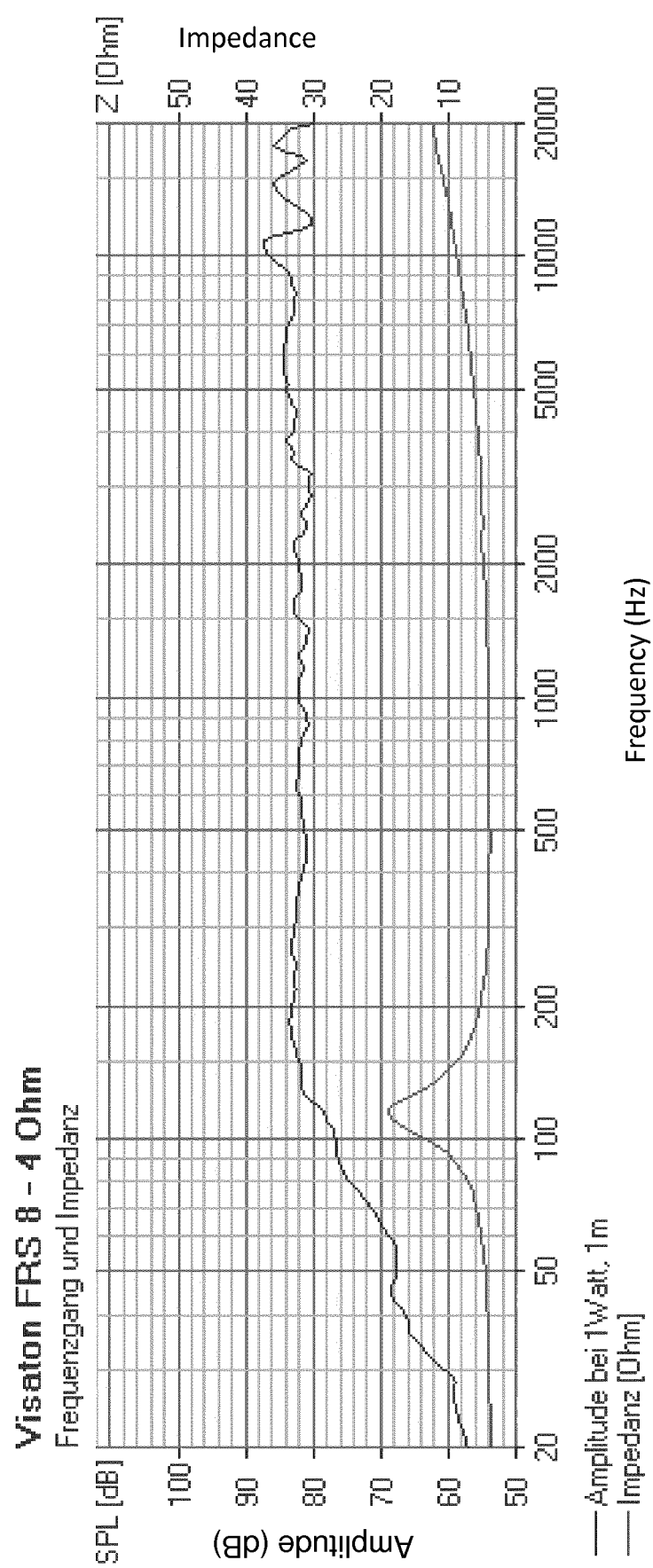
FIG. 4 illustrates a frequency response for a typical 0.08 m diameter speaker.

FIG. 4 displays the frequency response for a typical 0.08 m diameter speaker. The speaker shows a poor response at very low frequencies which is typical, and as such, it is often prudent to enhance the low frequency component of the outgoing swept signal. One way of doing so is to generate the swept signal such that the lower frequency range contributes to more of the signal, from a time perspective, than the higher frequencies.

Figure 5:
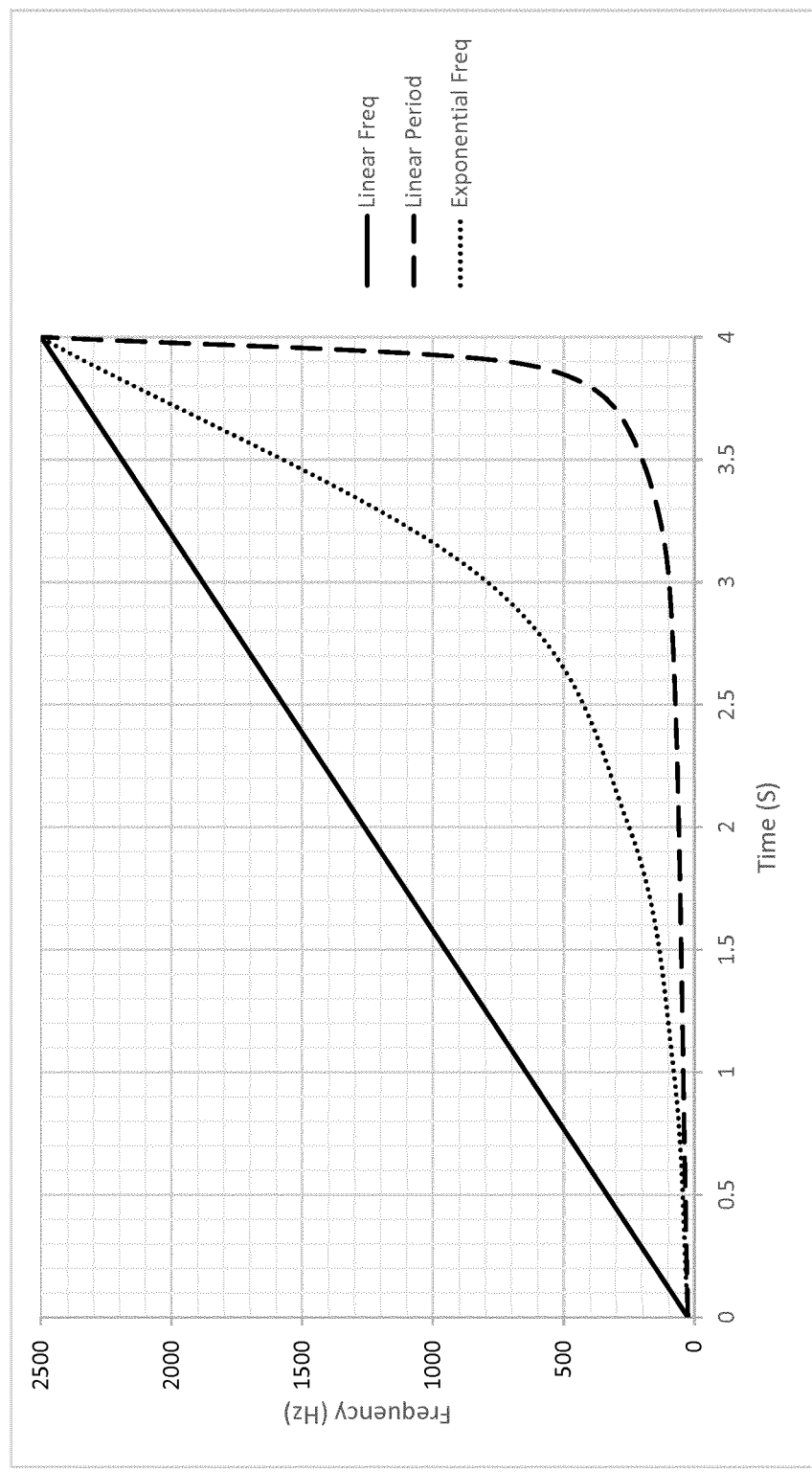
FIG. 5 illustrates a frequency of the three sweeps as a function of time.

An experiment was performed whereby three different sweep designs were tested in pipes with diameters ranging from 0.15 m to 0.9 m. The sweeps used were: a linear frequency sweep, a linear period sweep, such that the period of the waveform decreases linearly with respect to the time, and an exponential frequency sweep, such that the frequency increases exponentially with respect to the time. Their frequencies with respect to time, over four seconds, are displayed in FIG. 5. A broadband sweep may be used and is particularly suited for long range surveying. An acoustic impulse may be used and is particularly suited for short range surveying.

The equations for each sweep design are shown below where, f=frequency (Hz) and t=time (seconds):

Linear Frequency Sweep equation:

$$f=25\ Hz+(t\times 618.75) \quad (eq.1.)$$

Linear Period Sweep Equation:

$$f=1/(-0.0099t+0.04) \quad (eq.2.)$$

Exponential Frequency Sweep equation:

$$f=25\ Hz\times e^{(t\times 1.1519)} \quad (eq.3.)$$

Extensive testing in a range of pipes confirmed that the exponential sweep is most suited to pipe surveying and monitoring applications.

A method for monitoring an air-filled conduit will now be described. A 15 m long, 0.15 m diameter polyurethane pipe was constructed from five, 3 m long sections. An acoustic source was located at the entrance to the pipe and a cardioid microphone was located 0.26 m in front of the source. The experimental set-up is described by the schematic in FIG. 6.

Figure 7:
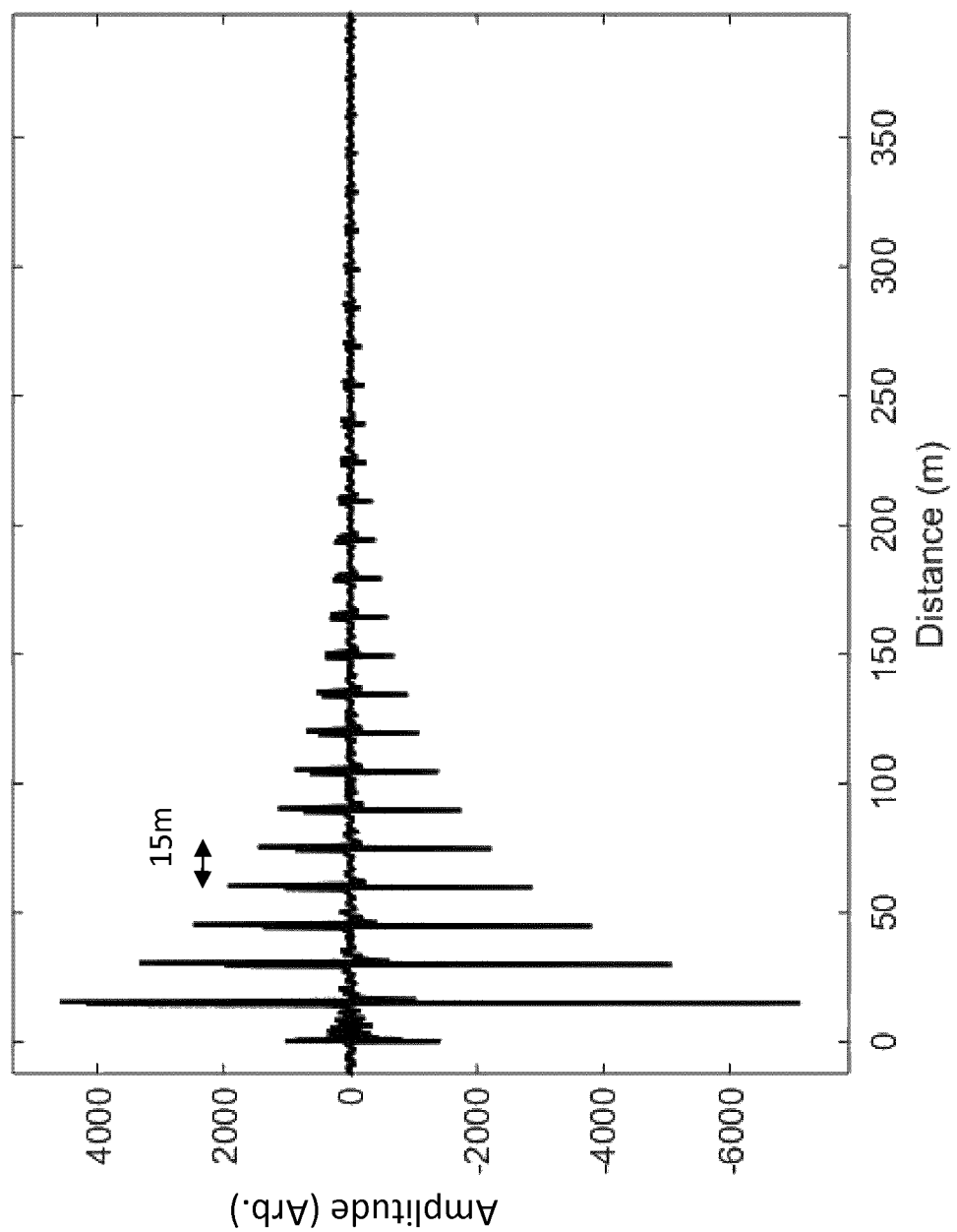
FIG. 7 illustrates a signal recorded by cardioid microphone in an air filled, closed ended pipe.

The emitted acoustic signal was the non-linear chirp described above and the recorded signals were cross-correlated with the known emitted signal. A series of reflections were recorded as shown in FIG. 7, where they are plotted as a function of distance from the source.

Each reflection occurs with a constant time interval of 0.044 s between peaks. Assuming the speed of sound in air to be 330 m/s, this time corresponds to a distance of 15 m and it is therefore reasonable to conclude that they are reflections from each end of the pipe. The reflection series clearly demonstrates the signal rebounding up and down the pipe registering as an event every 15 m on the graph. These rebounding signals can be seen clearly on the waveform beyond 300 m, suggesting this equipment could detect a full blockage in an otherwise clear pipe at a range over 300 m. It is important to note that energy is lost with each reflection and therefore the true range will be far larger in real applications.

Figure 8:
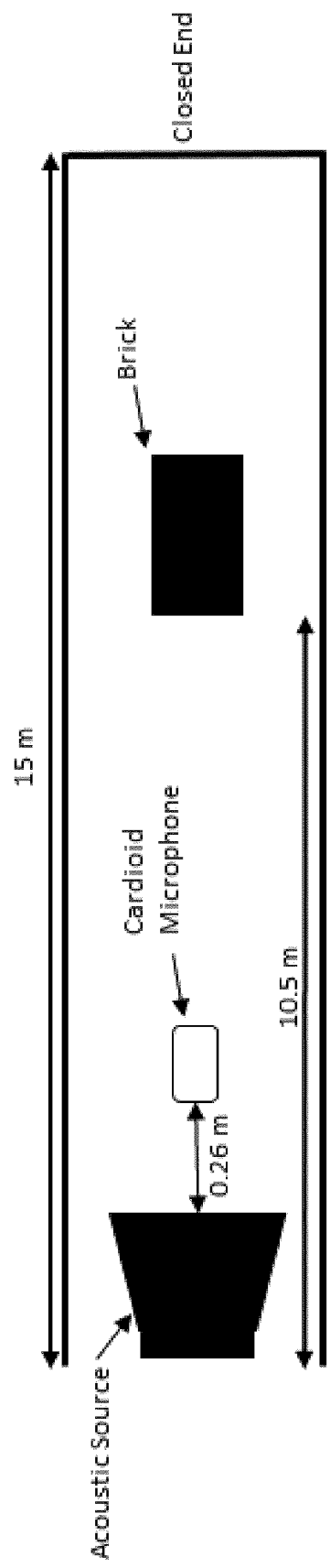
FIG. 8 is a schematic showing laboratory experiment surveying air filled polyurethane pipes with a blockage placed 10.5 m along the tube.

A second experiment was performed, identical to that described above but with a brick placed at 10.5 m along the pipe to act as a blockage, as described by the schematic in FIG. 8.

Figure 9:
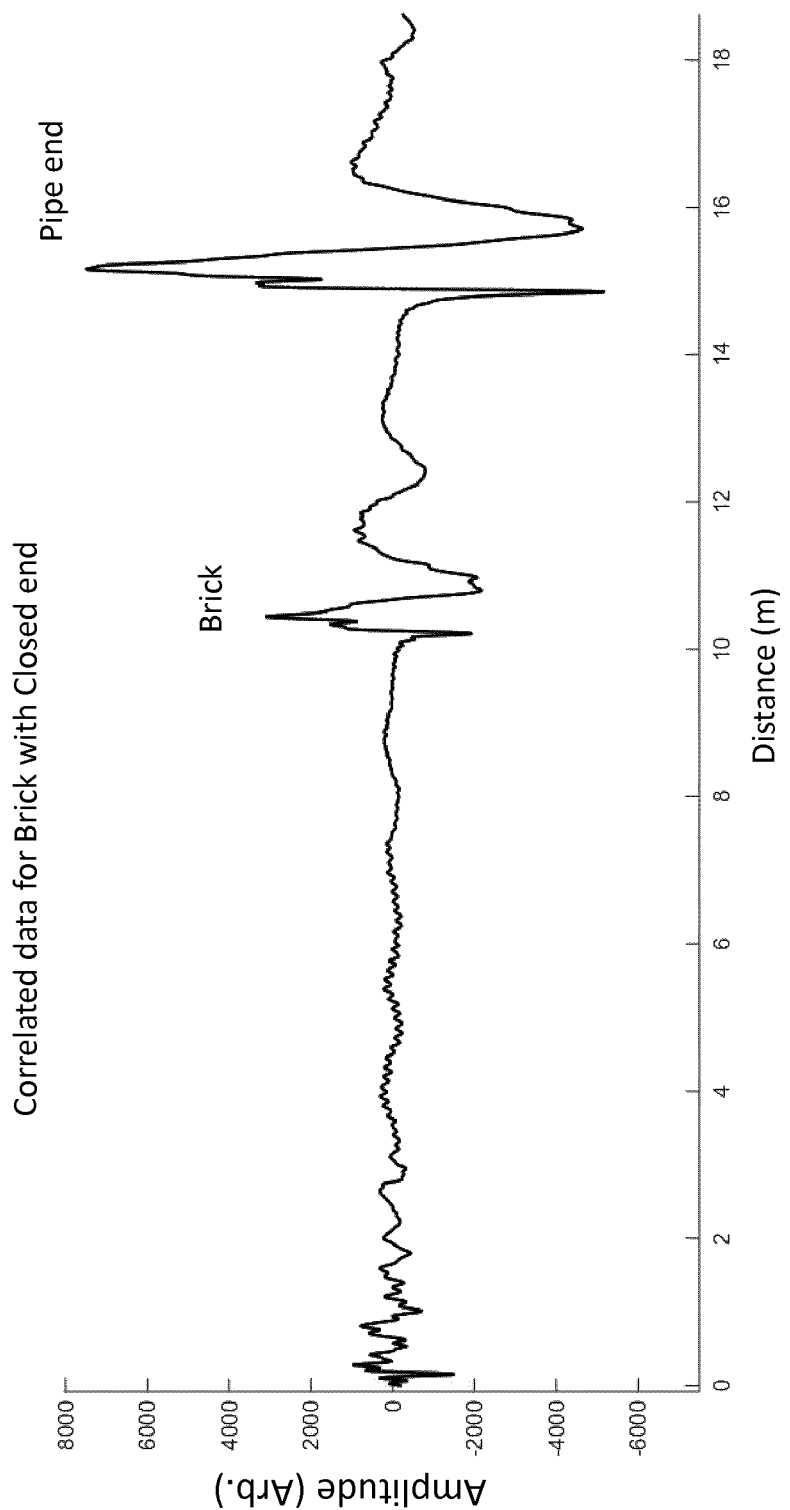
FIG. 9 illustrates a signal recorded by cardioid microphone in an air filled, closed end pipe containing a blockage at 10.5 m.

FIG. 9 displays the data acquired during the second experiment. There are two clear events displayed, one a reflection from the brick blockage and one a reflection from the pipe end, thus demonstrating that this arrangement is a reliable method for detecting the presence of a blockage in an air filled pipe.

A method for characterising the inherent features of an air-filled conduit e.g. manholes, open ends, closed ends, etc. will now be described.

Figure 6:
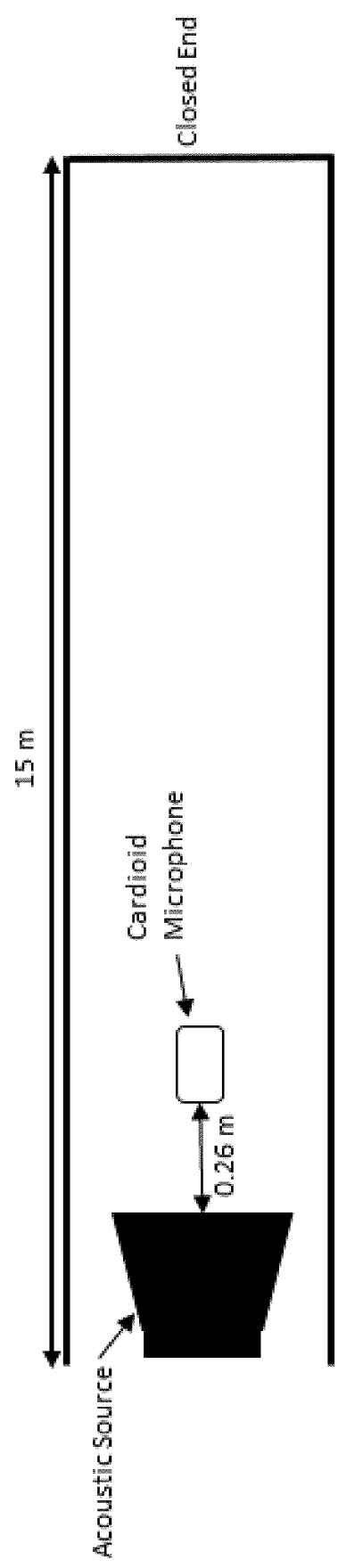
FIG. 6 is a schematic showing laboratory experiment surveying unobstructed, air filled polyurethane pipes.
Figure 10:
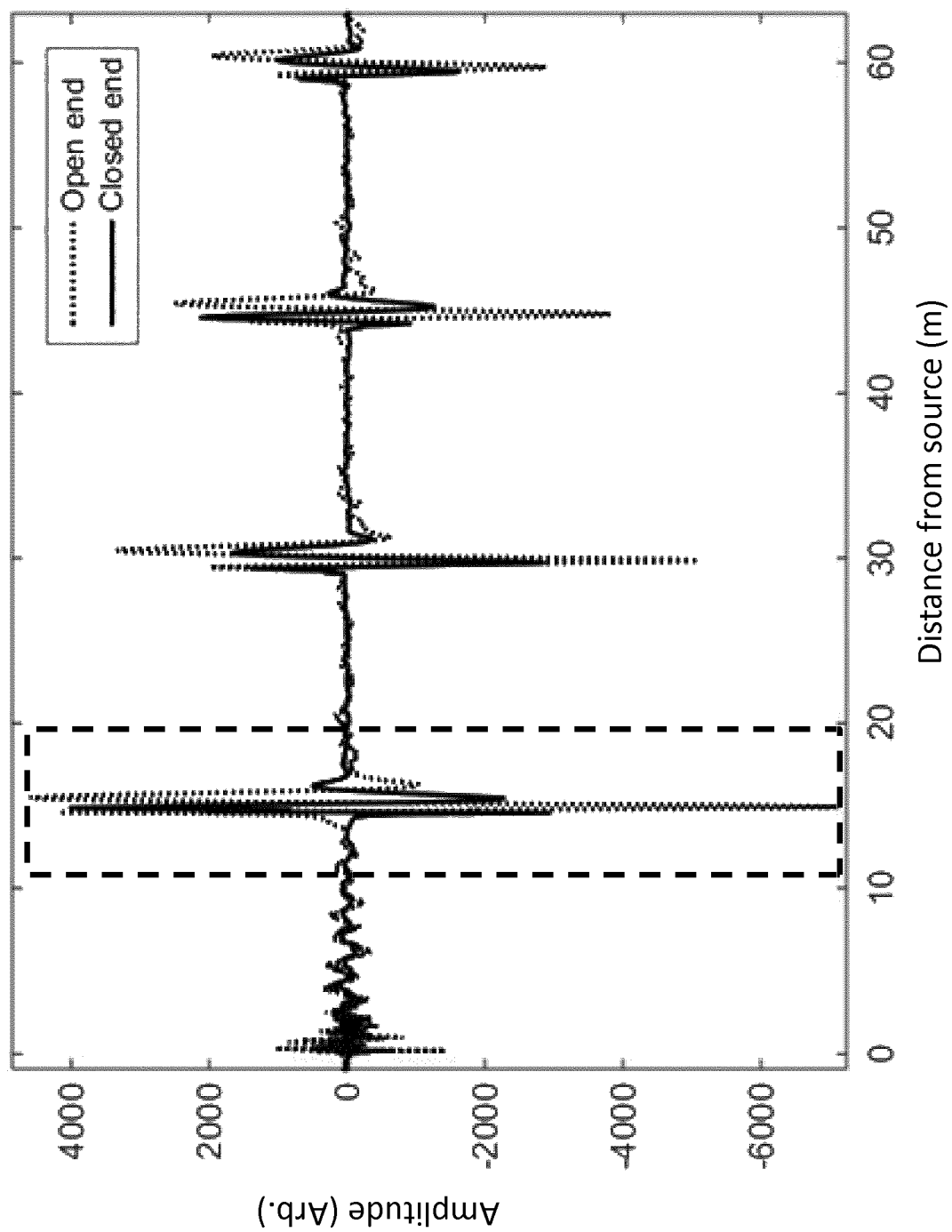
FIG. 10 illustrates a signal recorded by cardioid microphone in an air filled pipe with: an open end (dashed line) and a closed end (solid line)

In an attempt to assess the feasibility of characterising the features of a conduit, the experiment described by FIG. 6 was repeated, this time using both a closed and an open ended pipe and comparing the data. These data, plotted as a function of distance from the source, are displayed in FIG. 10.

Figure 11:
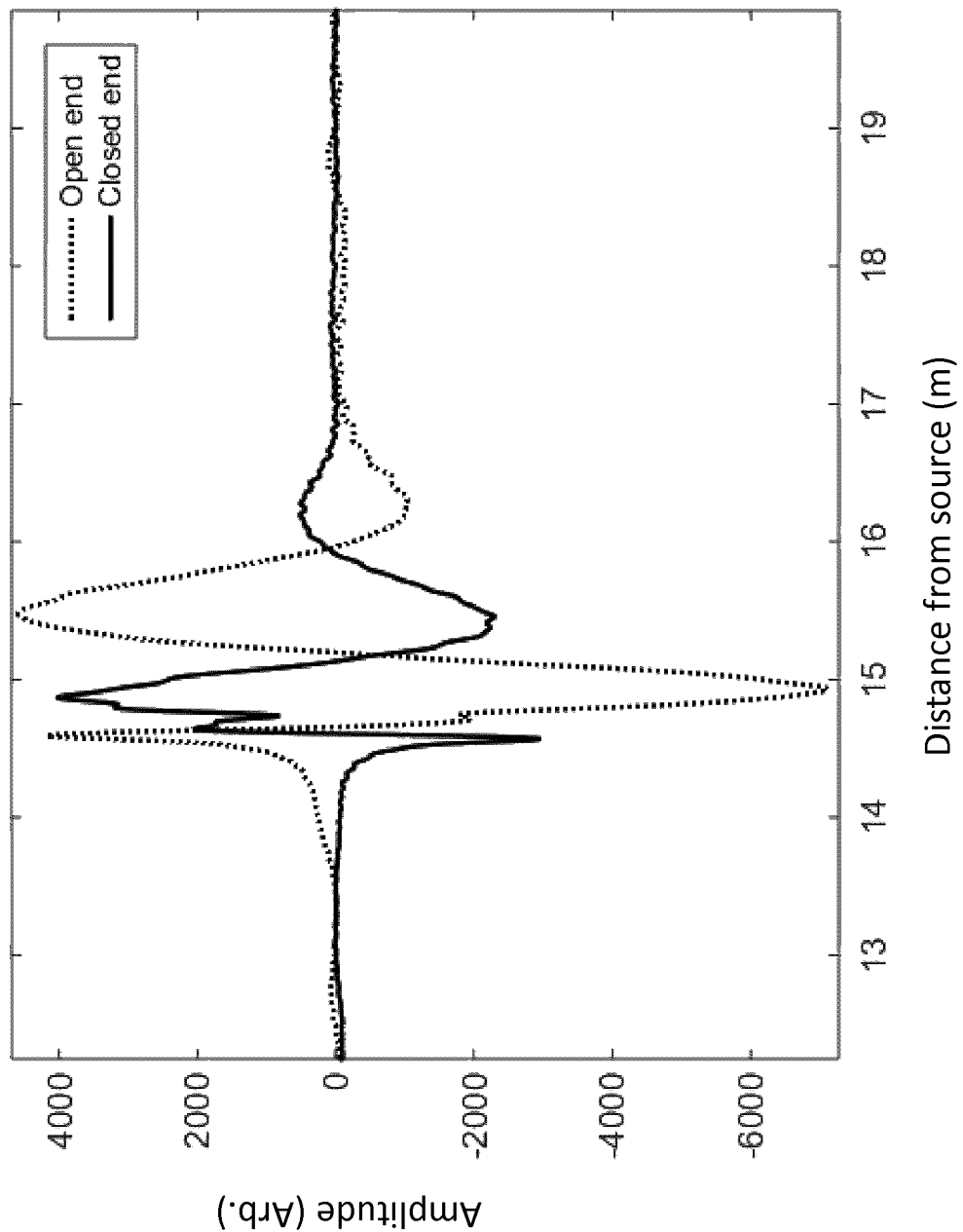
FIG. 11 illustrates a blow-up of the dash-boxed data displayed in FIG. 10.

Reflections are observed from both open (dashed line) and closed (solid line) pipe ends, with a clear difference between the two signals being observed. Reflections from a closed pipe end have a 180° phase shift relative to the incoming wave, whereas reflections from an open pipe end are in phase with the incoming wave. As such, whilst in the open end data the polarity of each event is the same, in the closed end data, a change in polarity is observed for each event due to the fact that the far end is closed whilst the near end is open. For clarity, FIG. 11 shows a blow-up of the first peak displayed in FIG. 10.

Figure 12:
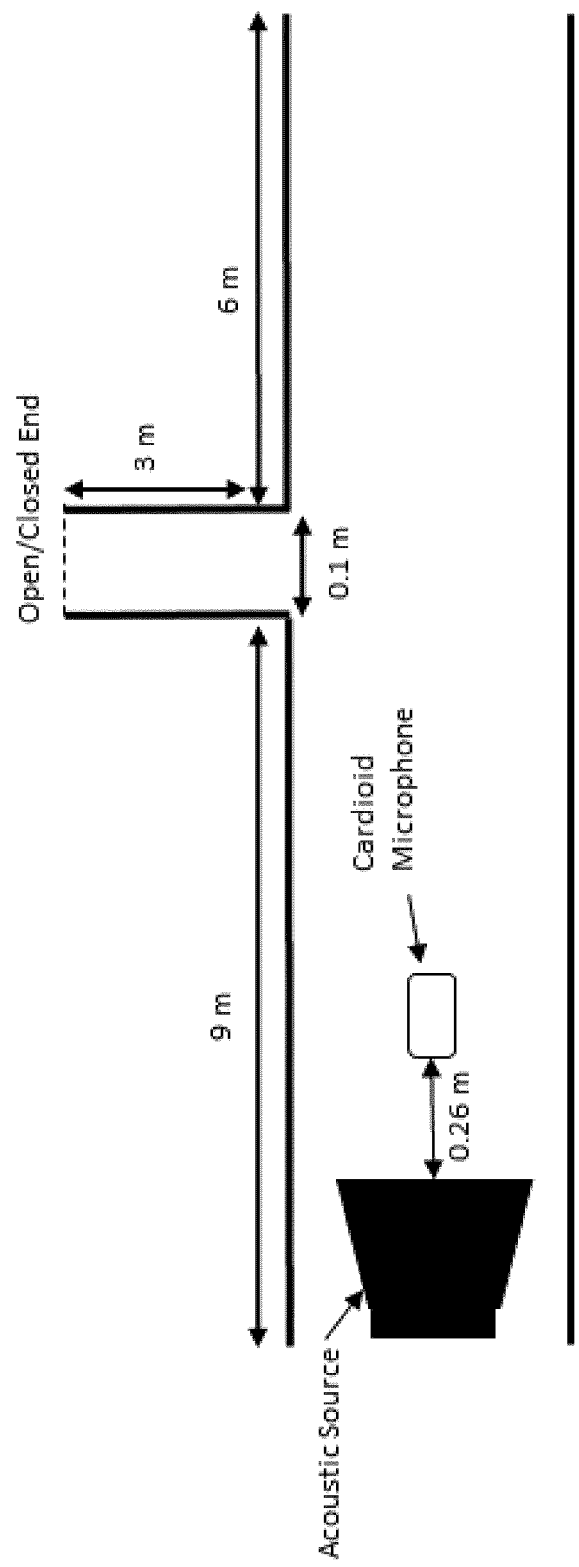
FIG. 12 is a schematic showing laboratory experiment surveying air filled polyurethane pipes with a T-junction, placed 9 m along the tube, acting as e.g. a manhole.

These data demonstrate a clear means by which the condition of the pipe ends can be monitored using the method and equipment described above in relation to the embodiments of FIGS. 6-9 and as a result, further experimental work was performed in order to ascertain if the same experiment could be used to detect the presence of a break or gap in a conduit i.e. a cave in or a man-hole. The experimental set-up is described by the schematic in FIG. 12.

A 15.1 m long, 0.15 m diameter polyurethane pipe was constructed from six, 3 m long sections such that a 9 m length and a 6 m length were joined using a T-junction, with another 3 m long section joined, via the T-junction, at 90° to the length. The emitted acoustic signal was the non-linear chirp described above in relation to the embodiments of FIGS. 4-5 and the recorded signals were cross-correlated with the known emitted signal. Whilst each end of the main body of the pipe was left open to the air, the experiment was performed with the T-piece both open and closed.

Figure 13:
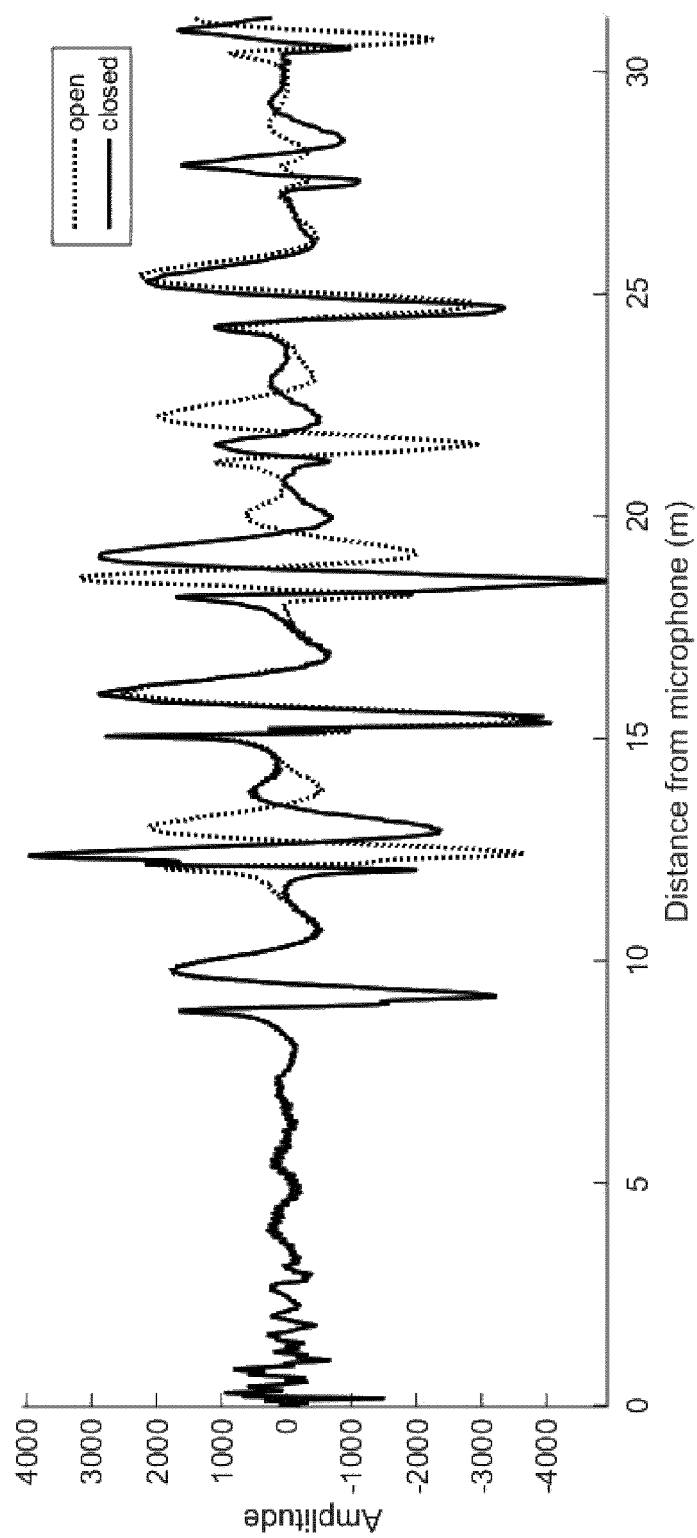
FIG. 13 illustrates a signal recorded by cardioid microphone in an air filled pipe with a T-junction, placed 9 m along the tube, and an open end.

FIG. 13 displays the data acquired from both the open and closed ended pipes, and there are three primary reflections. The event at 9 m is an open boundary reflection, as evidenced by the fact that no polarity change is observed, and is from the base of the T-junction. A further reflection, from the end of the T-piece, is observed at 12 m and in the event of the T-piece being closed, a polarity change is observed, as expected based on the data displayed in FIGS. 10 and 11. The reflection from the open end of the main pipe body, observed at 15 m, is such that both data sets now have the same phase as the incoming wave (the reflection from the end of the pipe is not secondary to the reflection from the t-piece opening, it is a completely separate event i.e. a separate "part" of the signal that was transmitted down the pipe. As the pipe end is open, the polarity of the corresponding event is not shifted in comparison to the original signal). Reflections occurring at distances greater than 15 m are secondary or higher reflections.

The data presented above demonstrate the validity of the technique described in relation to the embodiments of FIGS. 6-9 for not only detecting blockages, but also for surveying and characterising the inherent features of an unknown conduit.

A method for determining the size of the blockage relative to the conduit diameter will now be described.

As described above, the position of a blockage can be accurately detected in air filled conduits. As a continuation of this work, the experiment described above in relation to FIGS. 6-9 was performed in a real, air-filled storm drain with a diameter of 1.2 m, and the data was assessed in order to establish if it was possible to ascertain the cross-sectional area or size of the blockage relative to the diameter of the conduit i.e. the percentage of the conduit that was blocked. A schematic showing the geometry of the experiment is displayed in FIG. 14.

Figure 14:
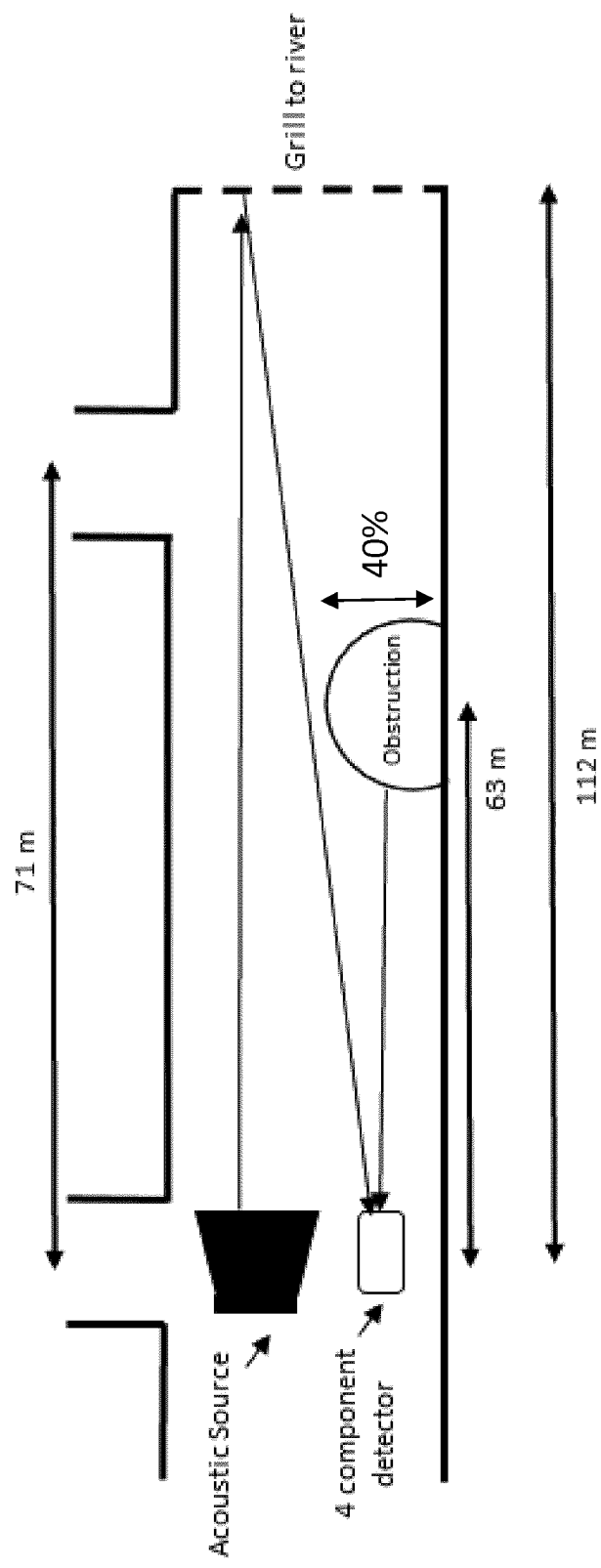
FIG. 14 is a schematic showing geometry of storm drain experiment.
Figure 15:
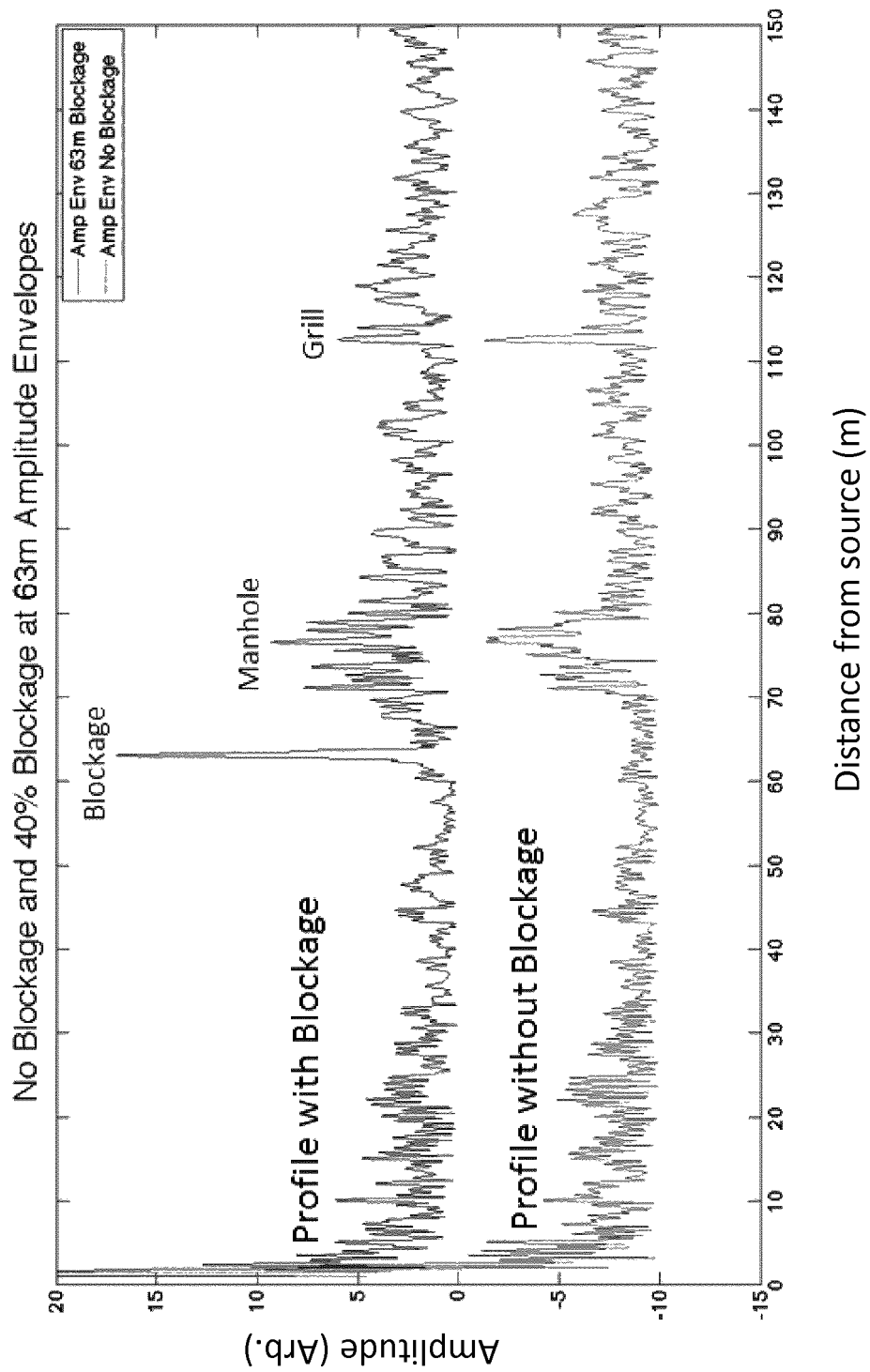
FIG. 15 illustrates a signal recorded by cardioid microphone in storm drain when no blockage is present in the drain (green) and after the introduction of a blockage at 63 m (blue)

FIG. 15 shows the data acquired (as a function of distance from the source) when no blockage was present (green curve) and when a blockage, with a diameter 40% of that of the drain, was placed 63 m away from the source (blue curve), as described by FIG. 14. When no blockage is present, there are two clear events. The broad peak between 70 m and 80 m is a reflection from the manhole chamber at 71 m, whilst the narrower spike at 112 m is a reflection from the gate at the river entrance. When a 40% blockage was introduced at 63 m, the data display the same two events but there is now a very clear narrow-band event as a result of the presence of the blockage.

The data presented here are Amplitude Envelope data. The Amplitude Envelope of an oscillating curve is a smooth curve that outlines its extremes. It allows for ease of analysis of a data set and can be calculated in various ways. All Amplitude Envelope data reported in this addendum were calculated using a Hilbert Transform.

Figure 16:
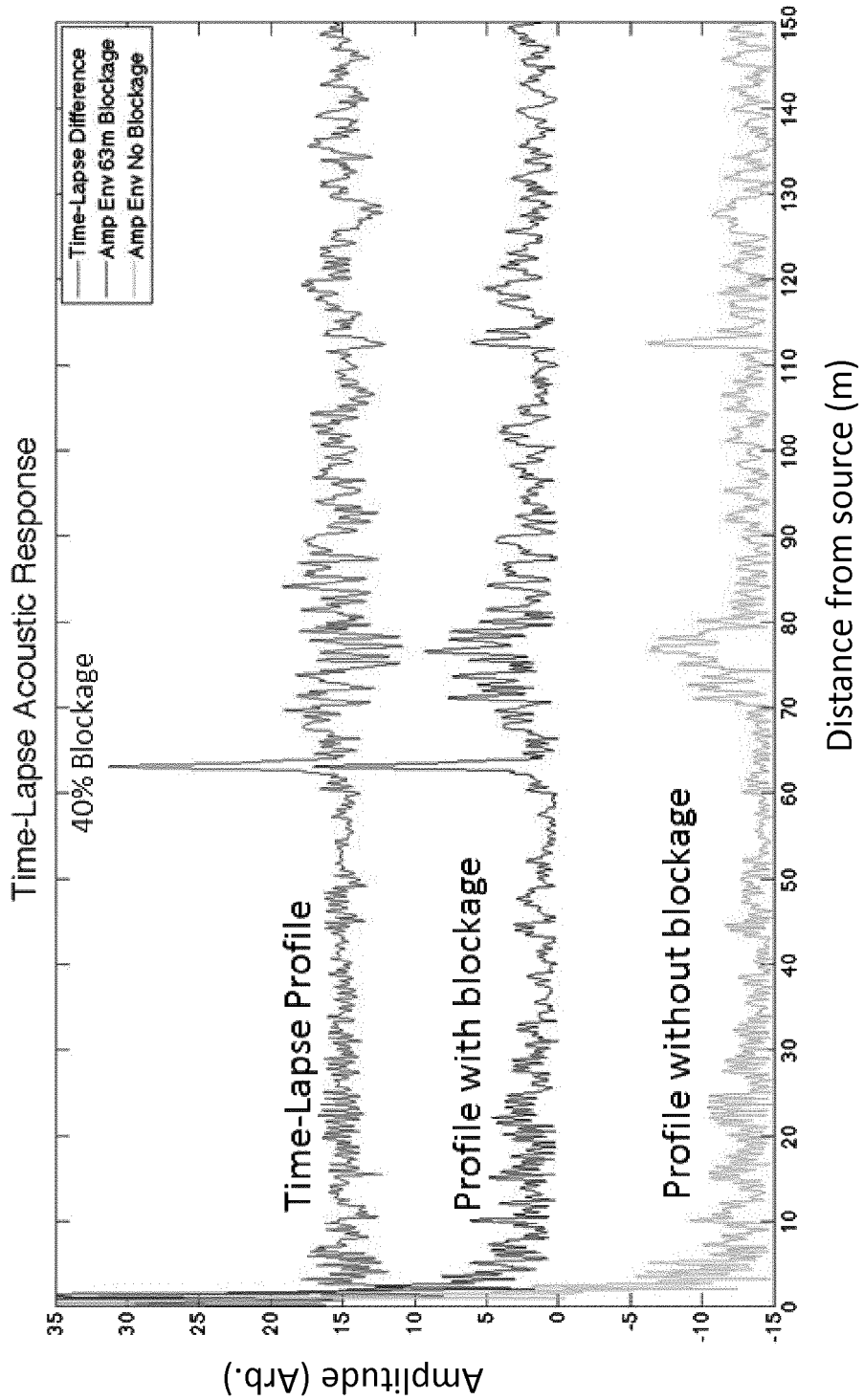
FIG. 16 illustrates (as in FIG. 14 but with the addition of the Time-lapse curve) a subtraction of the blockage free data from the blockage data.

FIG. 16 displays the data described above with the addition of a Time-lapse curve (red). The Time-lapse analysis technique involves subtracting a baseline dataset, in this case the data acquired when no blockage is present, from all subsequent data sets, in order to monitor any changes in the condition of the conduit. As shown in FIG. 16, the signals from any permanent features such as manholes, gates etc. will be removed, leaving only the signals from any new, unwanted features i.e. a blockage.

Figure 17:
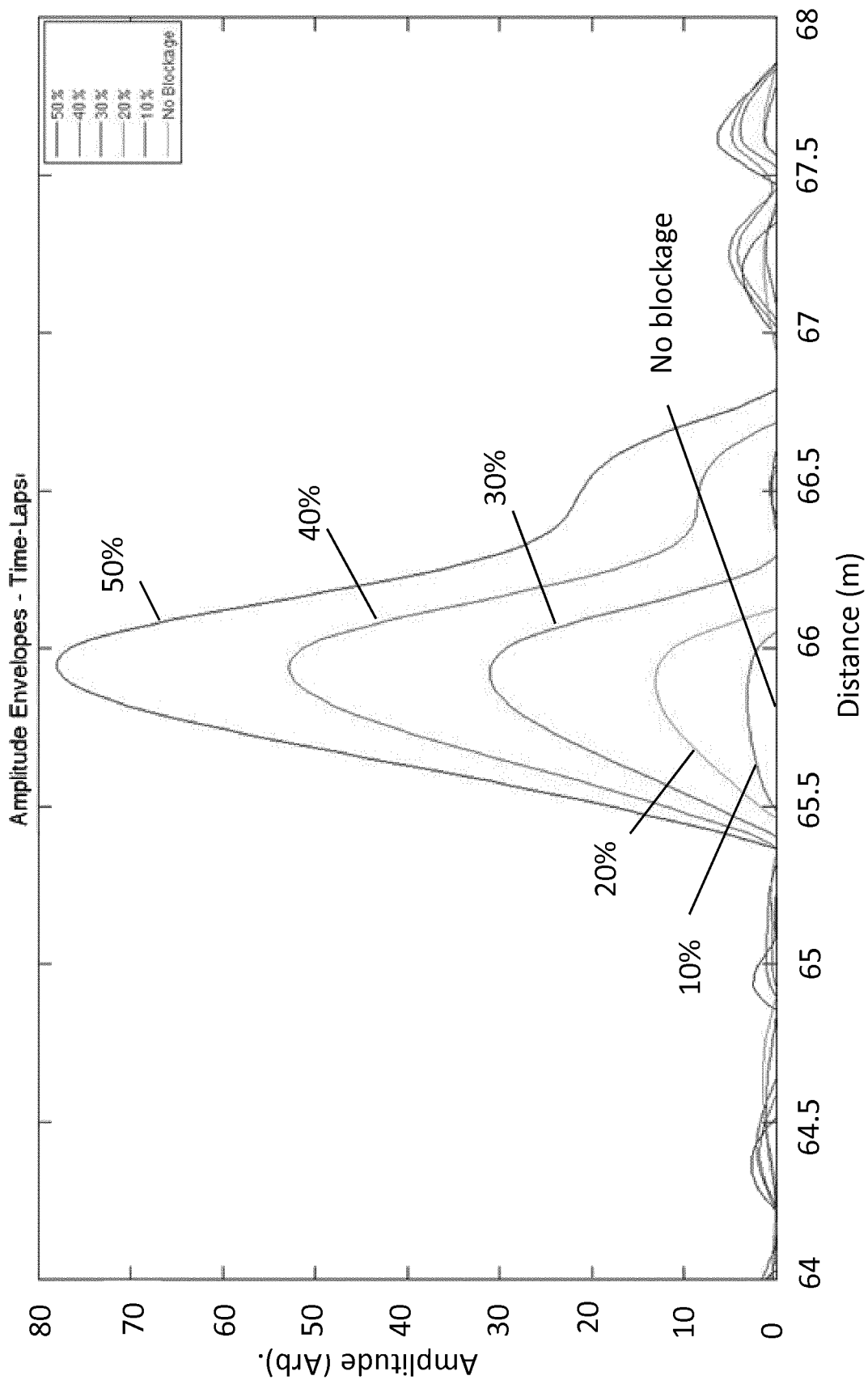
FIG. 17 illustrates time-lapse curves for blockages of varying cross-sectional areas or blockage sizes.

It is also possible, using this method, to estimate the size of the blockage relative to the diameter of the conduit. To demonstrate this, the experiment depicted in FIG. 14 was repeated using a series of different sized blockages. The obstruction placed in the storm drain ranged in diameter from 10% to 50% of the diameter of the drain. FIG. 17 displays the Time-lapse data acquired from each survey. The data clearly show the evolution of the blockage growth due to the growth of the peak amplitude as the blockage size increases, demonstrating that acquisition of comprehensive baseline data allows for the characterisation of blockages that form in conduits, in addition to their detection and location.

A method for monitoring a fluid-filled conduit will now be described.

A 6.1 m long, 0.15 m diameter polyurethane pipe was constructed from two, 3 m long sections joined by a 0.1 m long double socket. An acoustic source was located at the entrance to the pipe and an array of five hydrophones was located 3.2 m in front of the source. The experimental set-up is described by the schematic in FIG. 18.

The emitted acoustic signal was the linear chirp described above in relation to FIGS. 4-5 and the recorded signals were cross-correlated with the known emitted signal. A series of reflections were recorded from each hydrophone, as shown in FIG. 19, where they are plotted as a function of arrival time.

There are four events measured by each hydrophone and there is a clear lag in arrival time between each hydrophone. The average time interval between the same event being recorded by hydrophone 1 (H1) and hydrophone 5 (H5) was 0.53 ms which corresponds to a speed of sound in water of ~1500 m/s, a value that agrees well with the theoretical value of 1480 m/s.

Figure 19:
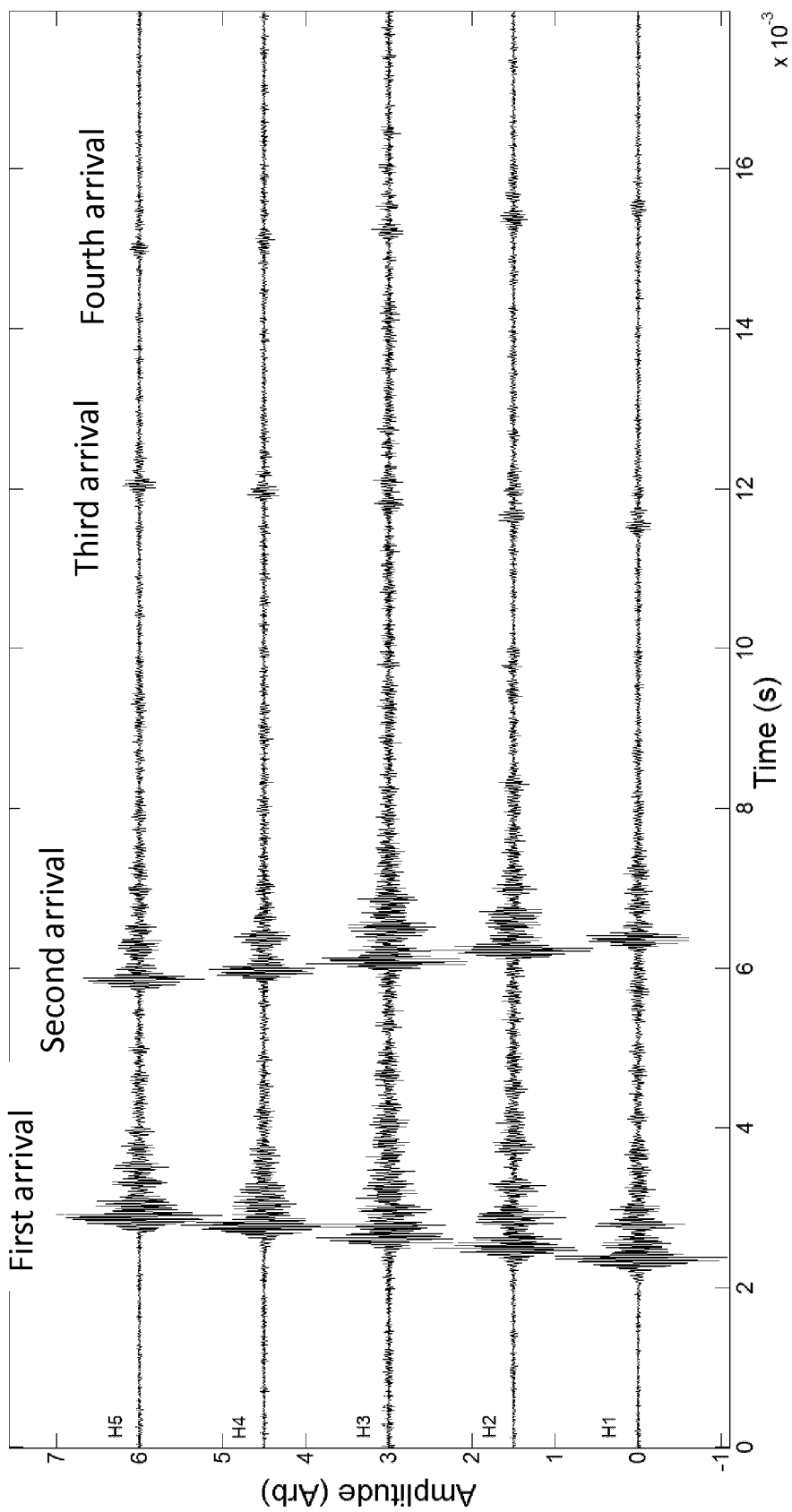
FIG. 19 illustrates a signal recorded by each hydrophone in the array in a fluid filled, closed end pipe, plotted as a function of time.
Figure 20:
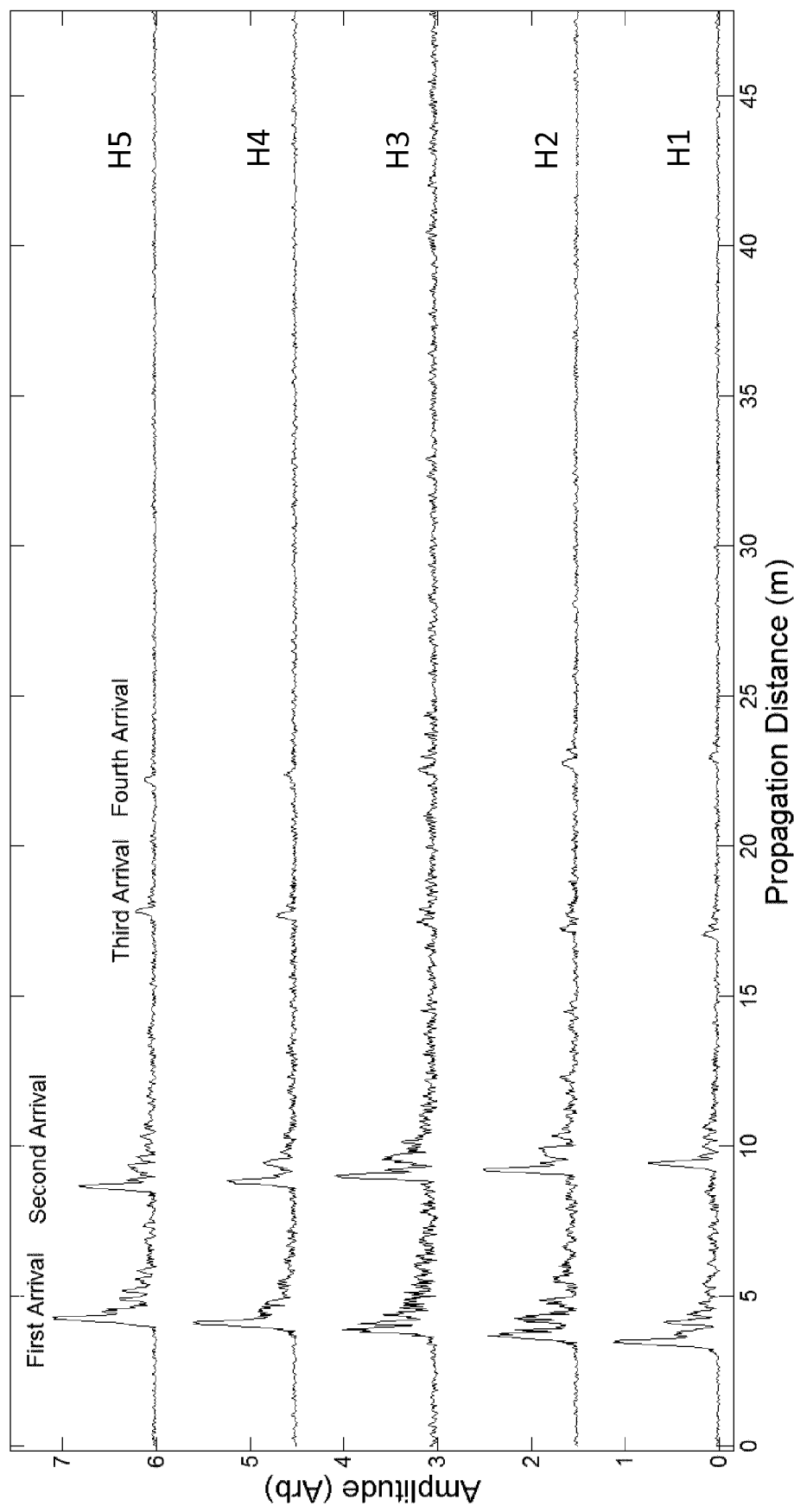
FIG. 20 illustrates a signal recorded by each hydrophone in the array in a fluid filled, closed end pipe, plotted as a function of propagation distance.
Figure 2I:
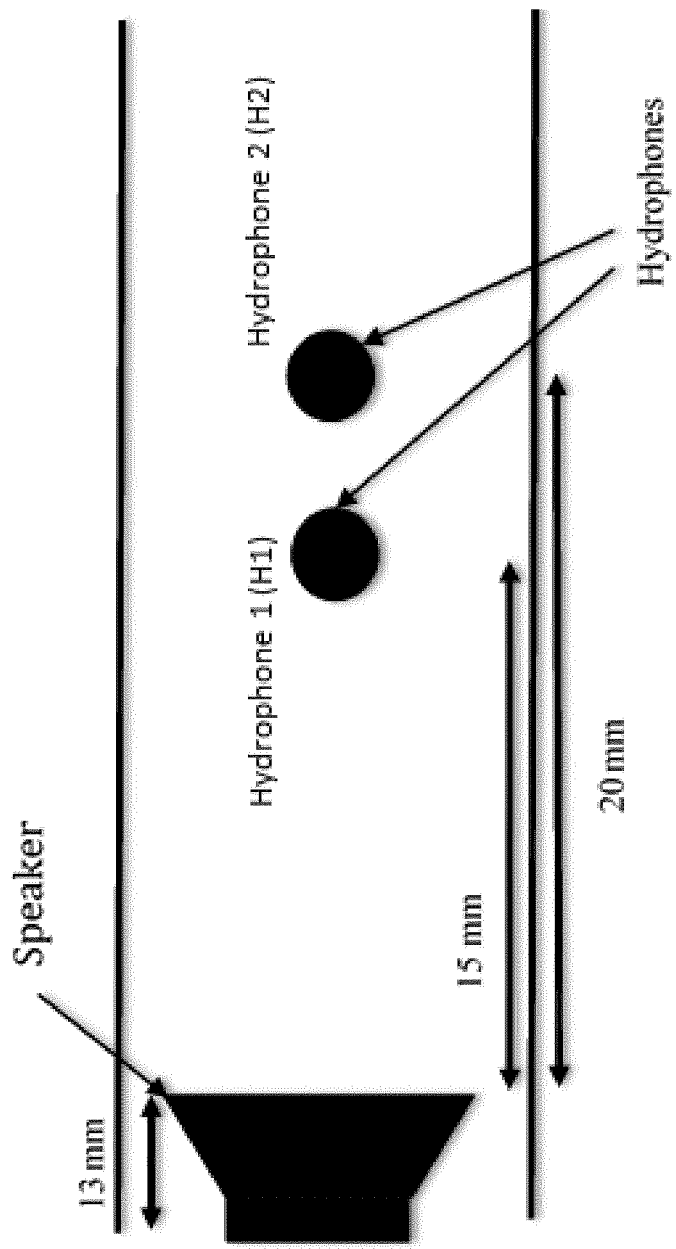

FIG. 20 displays the Amplitude Envelope of the data displayed in FIG. 19, now plotted as a function of total propagation distance, assuming that the speed of sound in water is 1480 m/s.

Figure 18:
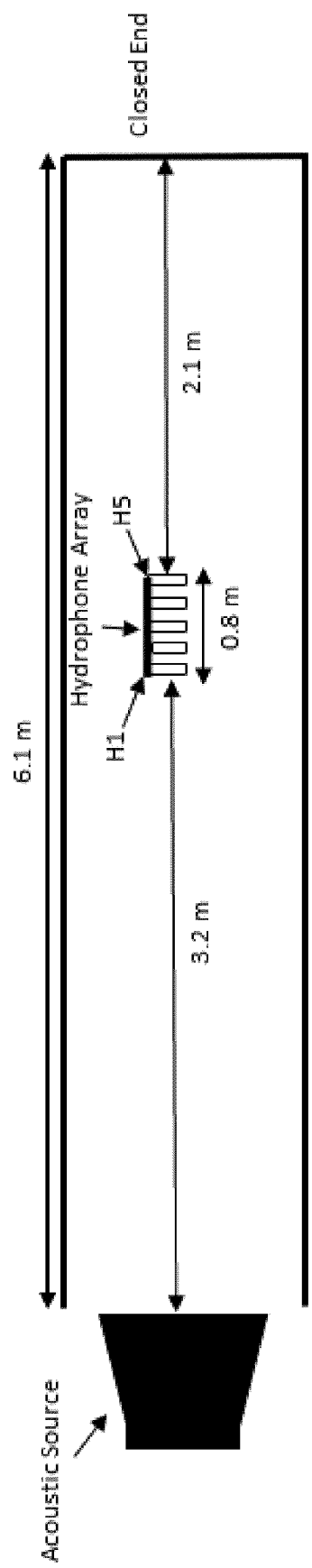
FIG. 18 is a schematic showing laboratory experiment surveying unobstructed, fluid filled polyurethane pipes.

The first arrival recorded by hydrophone 1 is at 3.2 m, corresponding to the outgoing signal passing the hydrophone array after being emitted by the source (see FIG. 18). The second arrival is recorded by hydrophone 1 as having a total propagation distance of 9.2 m, corresponding to a signal that has travelled from the source to the pipe end, been reflected, and travelled back towards the source. It is important to note that, as expected from a reflected signal, the second arrival is detected by hydrophone 5 first. The third arrival is recorded by hydrophone 1 as having a propagation distance of 16 m and is clearly an outgoing wave. This would suggest that the speaker itself is now acting as a blockage and reflecting the signal back down the pipe. The fourth arrival is a second reflection from the pipe end.

The data clearly demonstrate that using these techniques, blockages in fluid filled conduits can be reliably and accurately detected.

A method demonstrating that hydrophones operate as effectively in air as microphones will now be described, giving rise to the potential for a device that can be operated in both air and liquid media.

The above descriptions of FIGS. 6-9 and FIGS. 18-20 relate to two different methods by which conduits can be surveyed and monitored with ease and accuracy irrespective of the media with which they are filled. This is achieved by altering the components used to acquire the data, and for the chosen method to be appropriate and therefore successful, prior knowledge of the conduit condition is required. Furthermore, there must be some guarantee that, for at least the duration of the measurement period, there will be no change in the medium with which the conduit is filled. In order to develop a permanent conduit monitoring system, the device must be constructed of components that operate with ease and accuracy in a range of media, both wet and dry. As it is clear that microphone elements, such as the ones comprising the embodiment in FIGS. 6-9, will not operate effectively when submerged in a fluid, an experiment was performed in which it was sought to establish the efficacy of hydrophones operating in air. At least part of the system may be permanently or semi-permanently deployed and/or at least part of the system may be temporarily deployed.

The experimental set-up was as described in FIG. 21. A 15 m long, 0.15 m diameter polyurethane pipe was constructed from five, 3 m long sections. An acoustic source was located at the entrance to the pipe and two hydrophones, separated by 0.05 m were located 0.015 m in front of the source. The emitted acoustic signal was the exponential chirp described in relation to FIGS. 4-5 and the recorded signals were cross-correlated with the known emitted signal. Data were acquired with both open (dotted line) and closed (solid line) pipe ends. These data are displayed in FIG. 22, where they are plotted as a function of distance from the source.

Both data sets display a large initial event corresponding to the outgoing source signal. The broadband, "ringing" nature of the event is a consequence of the poor acoustic impedance between the hydrophone components and the surrounding air and consequently hydrophones will not perform well in air over short distances i.e. <5 m range. Over longer ranges, however, the hydrophones perform similarly to a microphone element, as evidenced by the clear event at 15 m which is a reflection from the end of the pipe. Furthermore, the closed end data show the polarity change observed when using the microphones, as described above in relation to the embodiments of FIGS. 10-13. The lower amplitude events observed at 6 m and 12 m are due to a slight misalignment of the individual pipe sections, demonstrating the sensitivity of this technique for characterising a conduit and its inherent features.

These data clearly demonstrate that hydrophones operate as accurately in air as they do in fluid and therefore offer potential for the development of a multi-media surveying tool that can be permanently mounted in a conduit irrespective of its changing conditions.

Signal processing techniques allowing for the separation of data according to its direction of travel will now be described.

Figure 22:
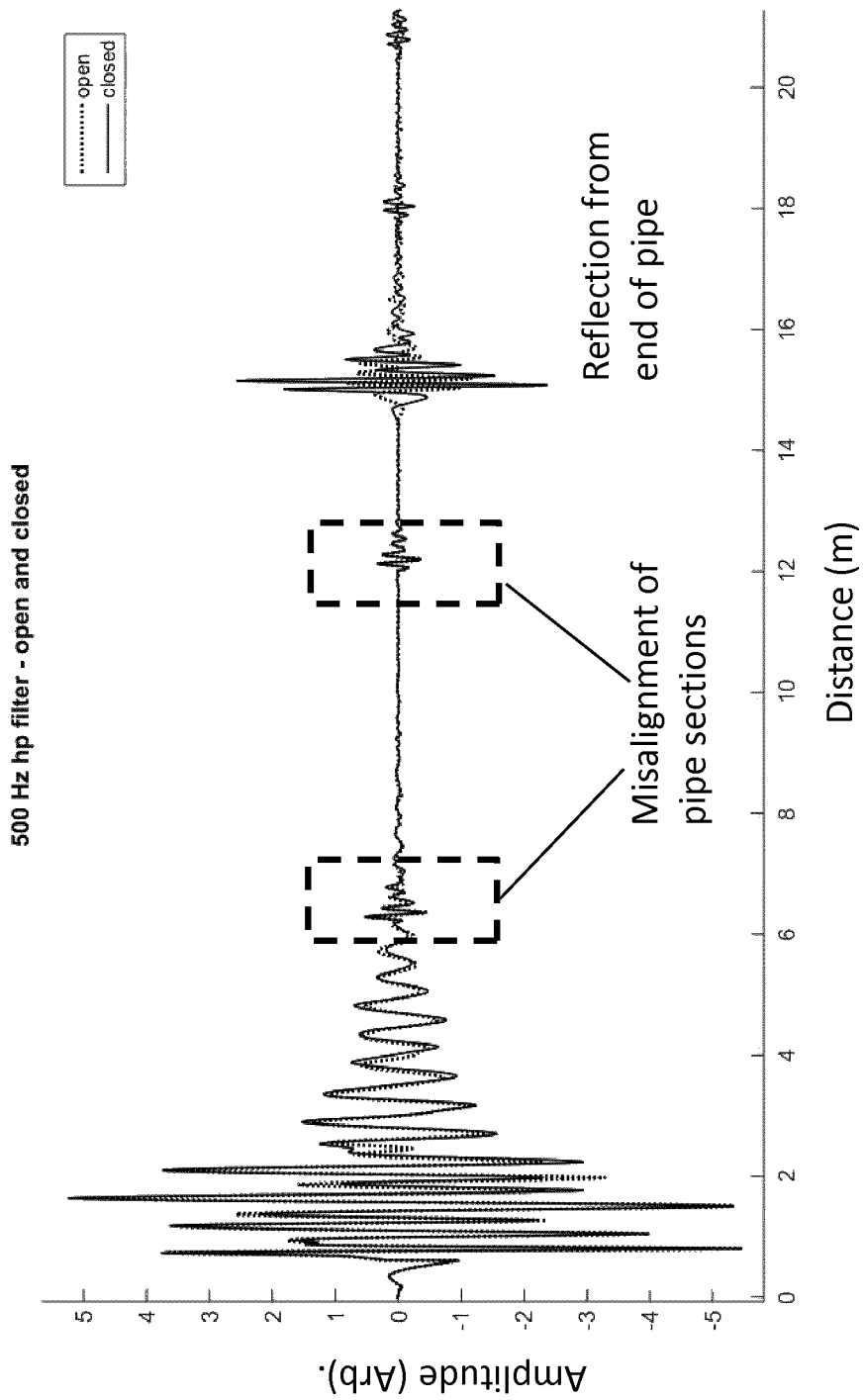
FIG. 22 illustrates a signal recorded by hydrophone 2 with an open (dotted line) and closed (solid line) ended pipe.

Whilst the embodiments shown in FIGS. 21-22 describe a device that allows for in-depth characterisation and monitoring of a conduit, irrespective of the media carried by said conduit, the data presented were acquired under laboratory conditions which, to allow proof-of-principle, represented the most simple system possible.

Figure 23:
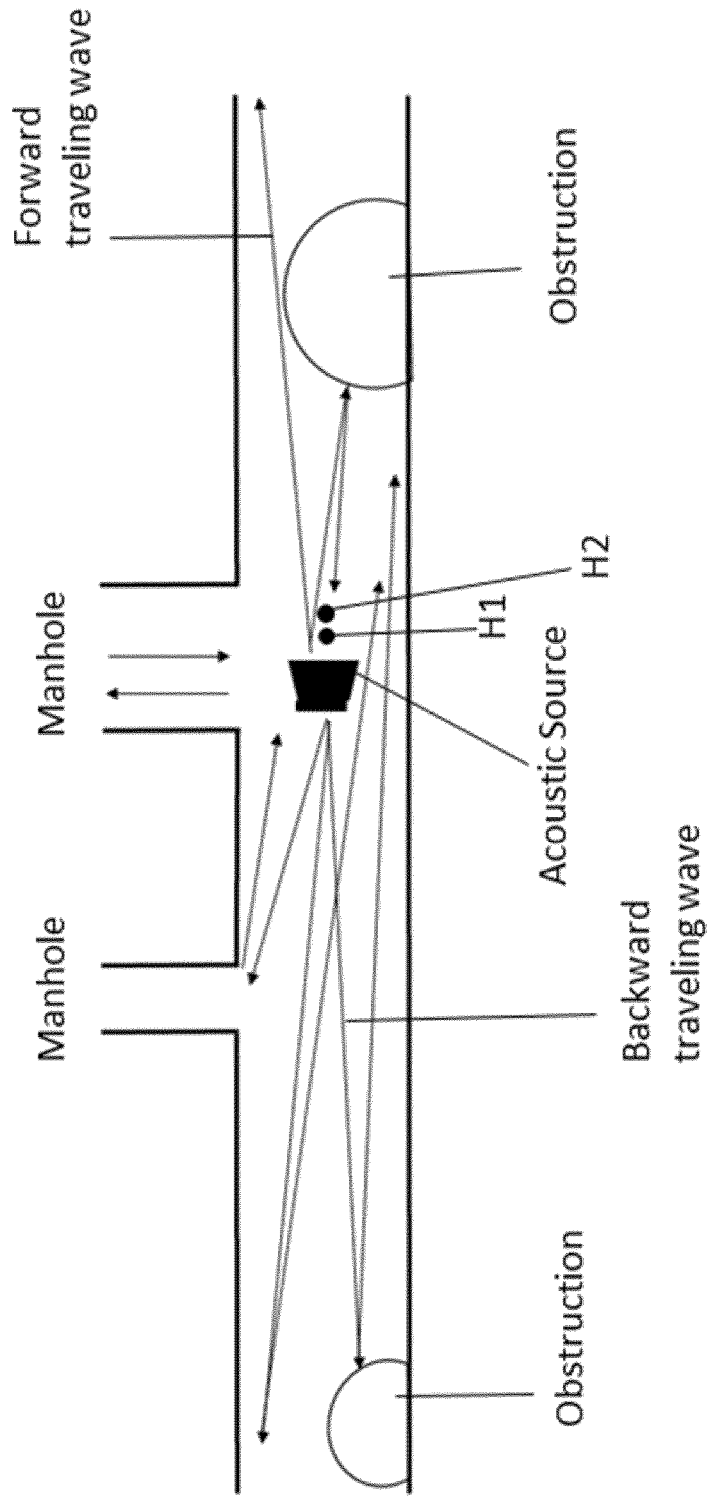
FIG. 23 is a schematic of a more complicated conduit system.

Consider a more complicated case, such as that described schematically in FIG. 23, involving multiple manholes and blockages both in front of and behind the device location, and it becomes clear that for a device to be truly useful, it is necessary for it to have the ability to ascertain which direction the recorded events are propagating in, i.e. ascertain if the blockage, for example, is located behind or in front of the device.

Two signal processing methods for separating up-going data from down-going data are described below. Both require the use of two sensors placed directly in-line with the source and separated by a small distance, as described by FIG. 23. Hereafter, forward traveling waves, i.e. in the direction that the source is pointing, are referred to as down-going waves and backwards travelling waves as up-going waves, whilst the hydrophone closest to the source is referred to as H1 and the second hydrophone H2.

Method 1: Pressure Gradient Calculation

The up-going wave field can be computed using the readings from closely located, in-line pressure sensors (hydrophones) using the total pressure, p(x), the wave velocity, c, and the sensor separation in m, dz, as described by equation 1:

$$p^u(x) = \frac{1}{2}\left(p(x) + c\frac{1}{i\omega}\frac{dp(x)}{dz}\right). \tag{eq.1}$$

The basic process can be described as follows: take the spatial pressure gradient, dp(x)/dz, apply a temporal integration filter, $$\left(\frac{1}{i\omega}\right),$$

and scale by the velocity of the wave, c, which is medium dependent.

The pressure gradient may be horizontal or vertical. A horizontal pressure gradient may be a gradient that is parallel with or along the same direction of travel of a propagating wave in the conduit. A vertical pressure gradient may be a gradient that is perpendicular to or at 90 degrees to the direction of travel of a propagating wave in the conduit.

The integration filter can be applied in the temporal frequency domain, but some band limitation should be included in the integration to compensate for the resultant amplification of low frequencies. An alternative approach would be to differentiate the pressure data, thereby removing the integration from this stage of processing. This would produce the differentiated up-going pressure, which as a "side-effect" might have the effect of boosting the higher frequencies and therefore simplifying the interpretation of the data i.e.;

$$i\omega p^u(x) = \frac{1}{2}\left(i\omega p(x) + c\frac{dp(x)}{dz}\right). \tag{eq.2}$$

One would still need to scale the pressure gradient data, after which it can be added to the differential pressure data.

The processing steps are;

Compute the spatial pressure gradient:

$$\frac{dp(x)}{dz} \approx \frac{p(x) + p(x + \Delta x)}{\Delta x}. \tag{eq.3}$$

Scale using c (m/s)

Differentiate p(x) applying a less or more elaborate convolution filter, or in the frequency domain by multiplication with i2πf Sum and divide by 2

Example Using Synthetic Data:

A simple synthetic data set, comprised of a down-going wave followed by two up-going waves, was created to illustrate the principle. The sensor separation was 0.05 m and the medium was assumed to be water i.e. c=1500 m/s. The data are displayed in FIGS. 24A and 24B, with the H1 data shown in (a) and the H2 data in (b)

Figure 25B:
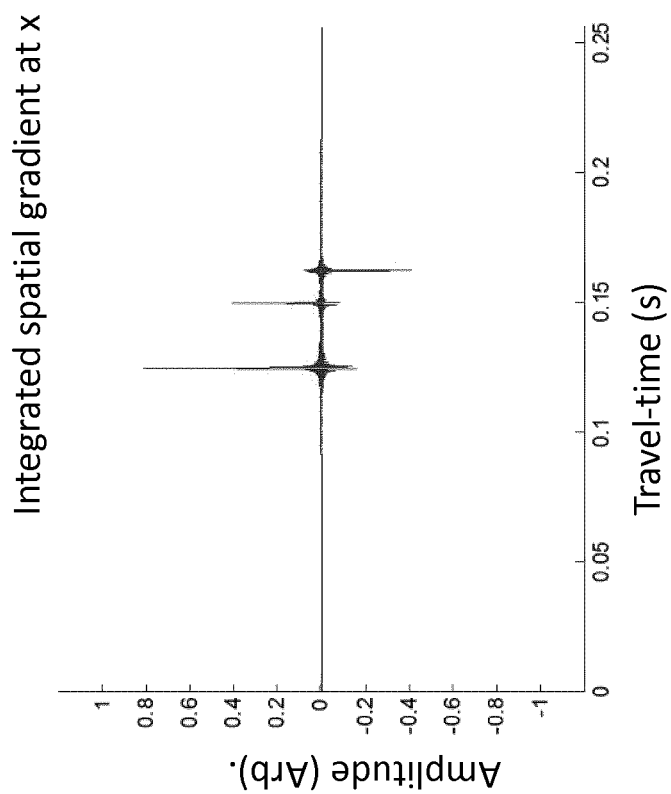
FIGS. 25A and 25B illustrate (a) The estimated spatial gradient; (b) the temporal integration respectively.
Figure 25A:
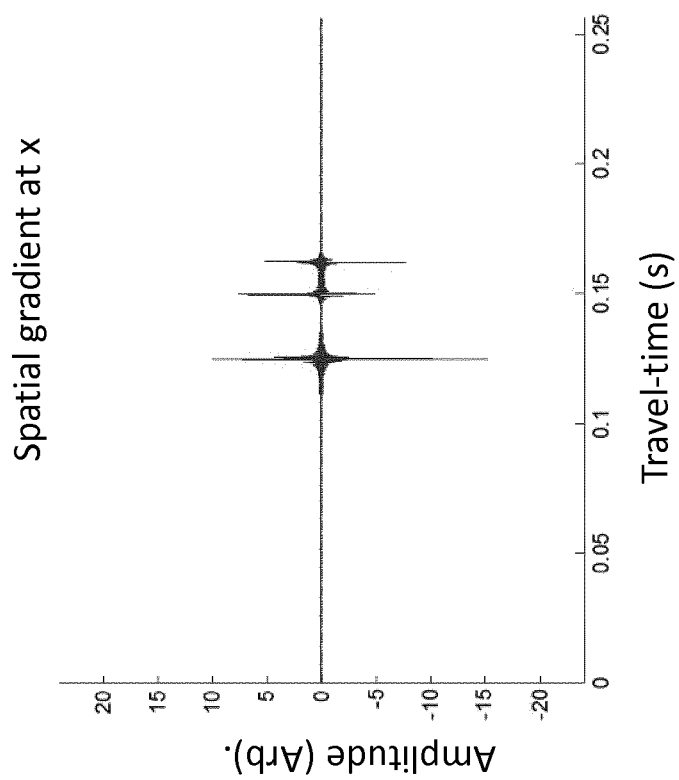

According to step 1, above, the pressure gradient should first be computed. The result is shown in FIG. 25A, whilst FIG. 25B shows the corresponding result of the temporal integration.

Figure 26B:
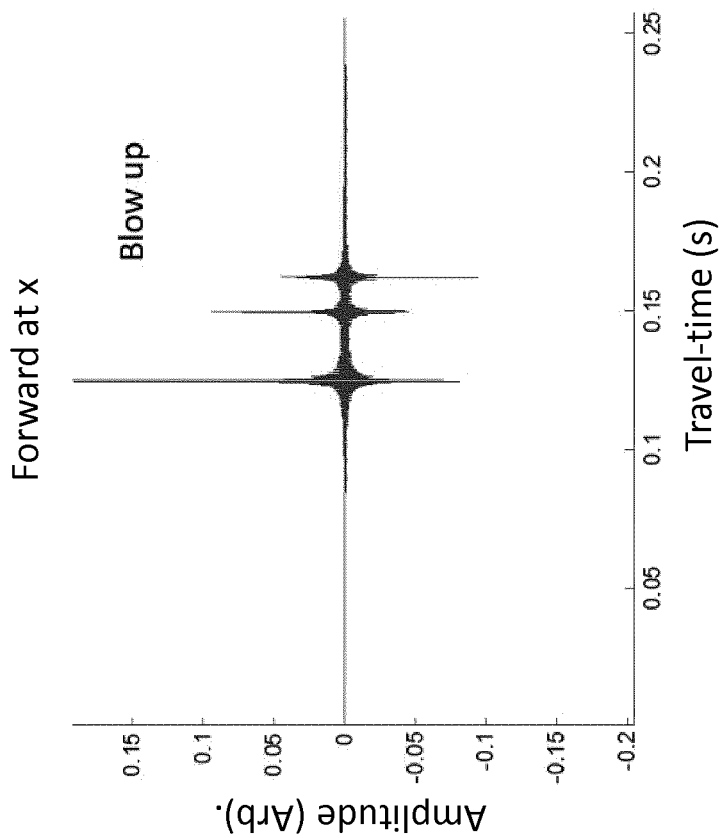
FIGS. 26A and 26B illustrate an estimate of the down-going waves achieved via suppression of the up going waves using the Pressure Gradient method.
Figure 26A:
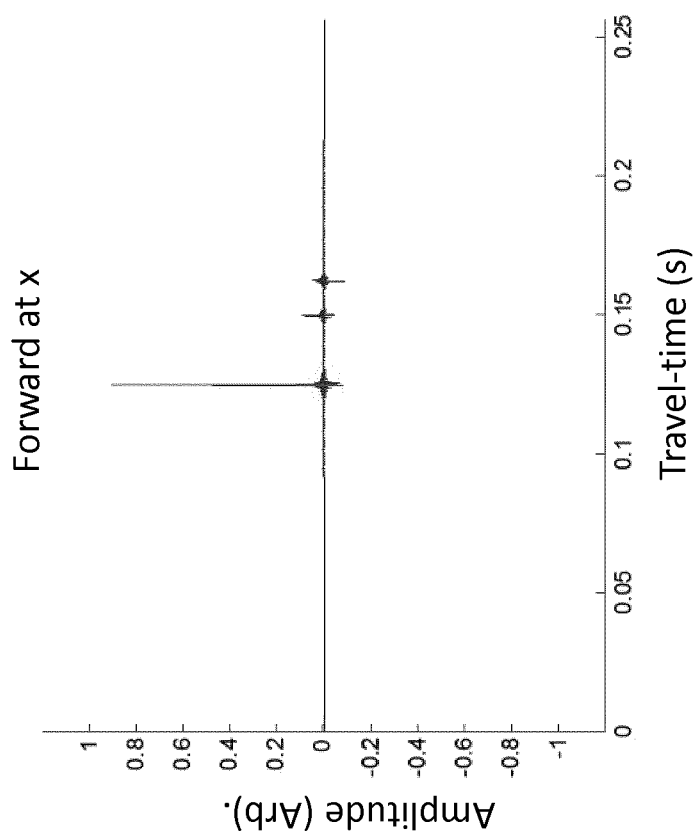

FIGS. 26A and 26B display the result of using the pressure gradient method to filter out the up-going waves, achieved by following the processing steps listed above. Note that whilst the up-going waves are well suppressed, they are not fully removed from the data, demonstrating that although the pressure gradient method is effective its accuracy is somewhat limited and could be improved by incorporating more sensors into the arrangement.

Method 2: Shift and Subtract Calculation

As an alternative to the Pressure Gradient method, the up-going wave field can be computed, again using the readings from two, in-line pressure sensors, by shifting the data from the second sensor i.e. H2, backwards by the time it takes the wave to travel between the two sensors, and subtracting this shifted data from the H1 data. This method results in near perfect attenuation of the down-going waves irrespective of the distance between the two sensors.

A consequence of this method is the presence of a "ghost" event in the resultant up-going data which occurs with a reverse polarity at twice the time it takes the waves to travel between the sensors. These ghost events can be supressed during later data processing steps by correlating the ghost for phase correction followed by amplitude correction by spectral division of the ghost power.

Figures 24A, 24B:
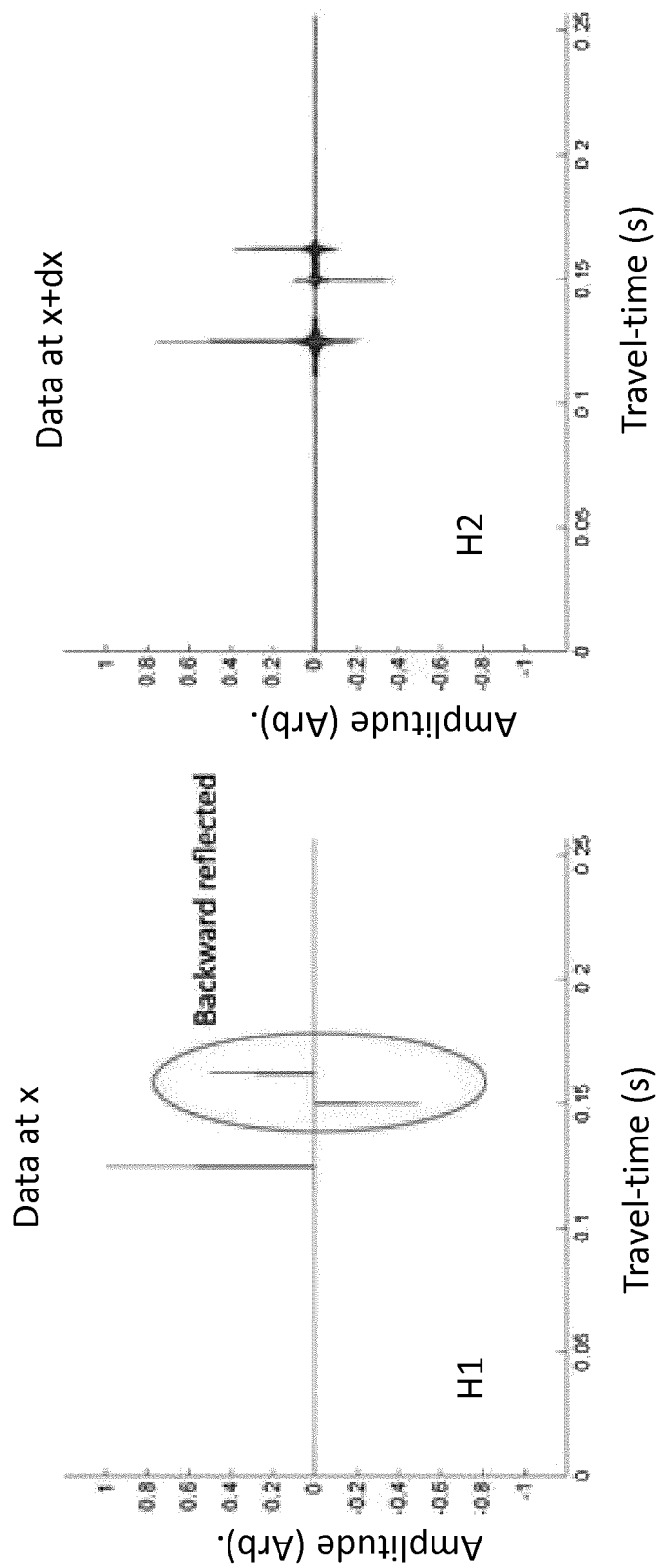
FIGS. 24A and 24B illustrate synthetic data at two pressure sensors separated by a distance of 0.05 cm at a first hydrophone and second hydrophone respectively.
Figures 27A, 27B:
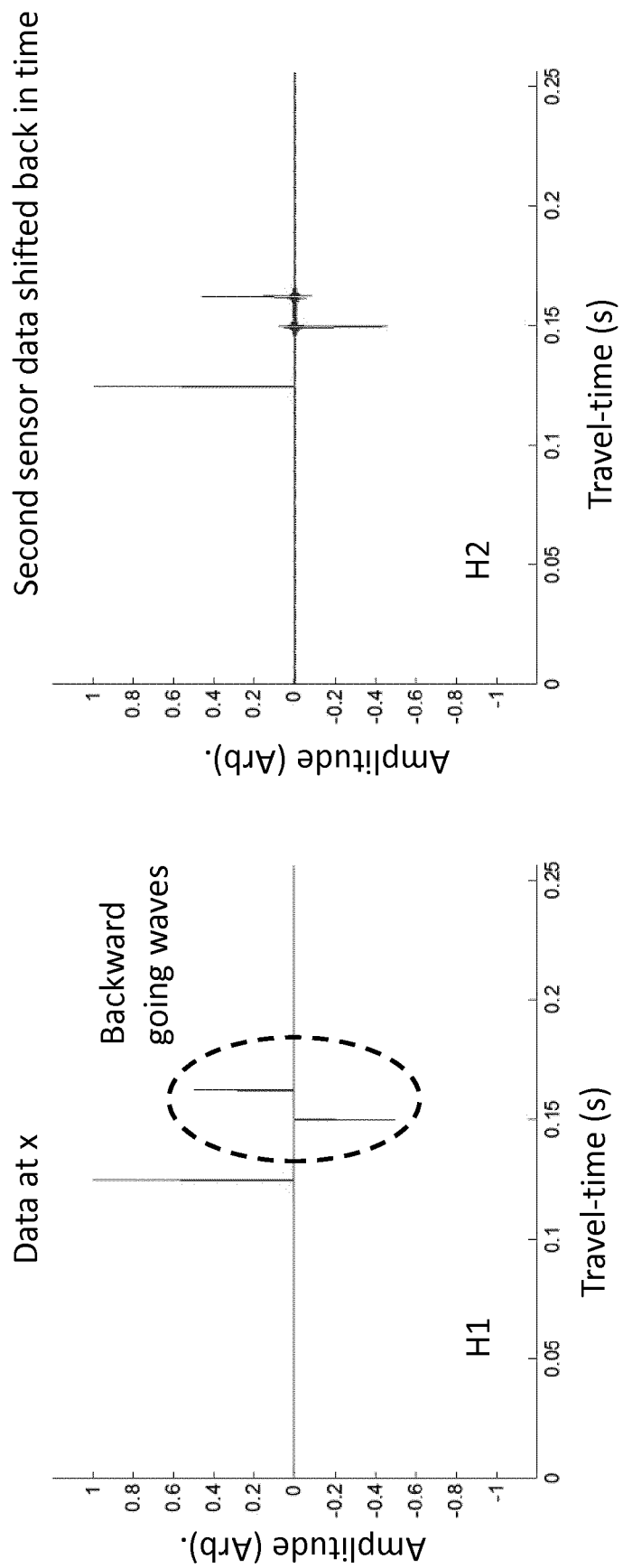
FIGS. 27A and 27B illustrate (a) H1 data; (b) time-shifted H2 data respectively.

Example on synthetic data:

The simple synthetic data set displayed in FIGS. 24A and 24B was used to illustrate the principle. As the sensor separation and the speed of sound in water are known quantities, it is simple to time-shift the H2 data such that they align with the H1 data. These data are displayed in FIGS. 27A and 27B.

Figures 28A, 28B:
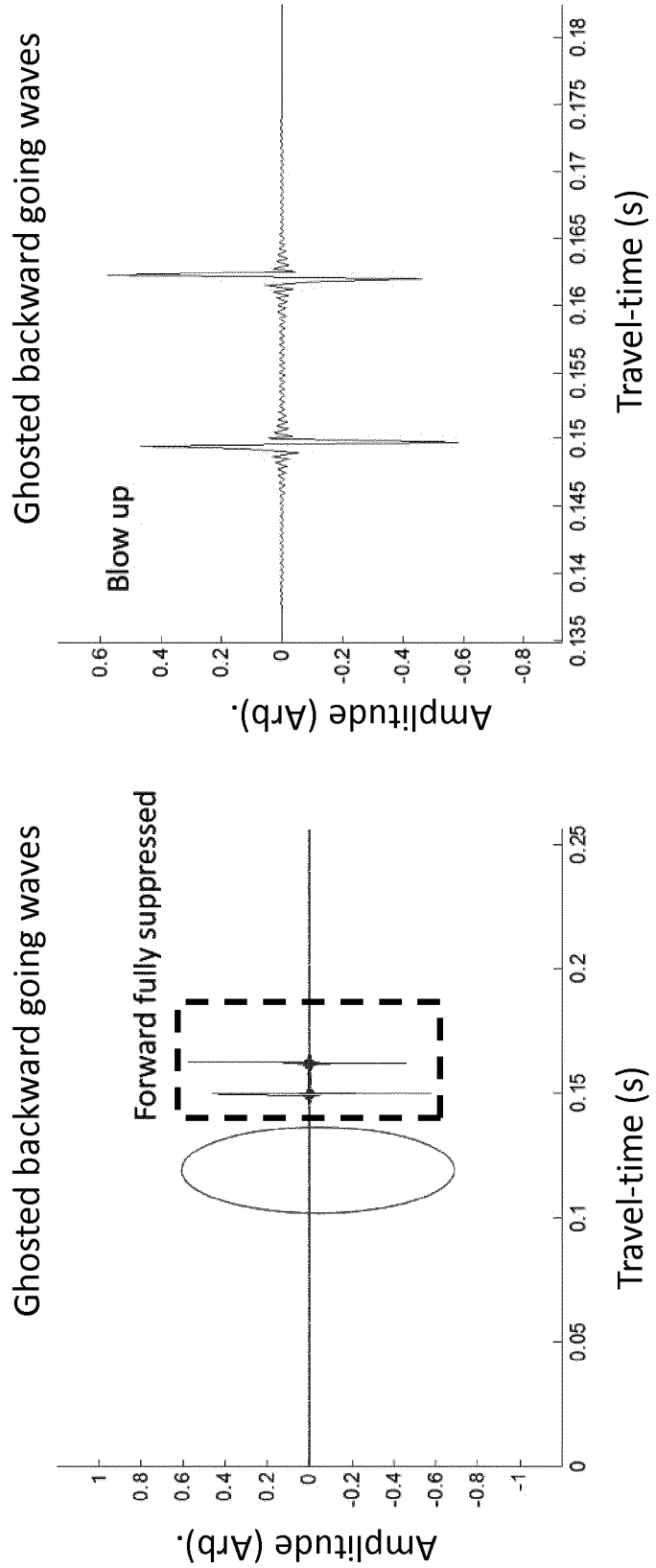
FIGS. 28A and 28B illustrate a result of subtraction after backward shifting in time of the lower sensor data at H2, with FIG. 28B a blow up of the dash-boxed region of FIG. 28A (note that the down-going wave signal is fully eliminated)
Figures 29A, 29B:
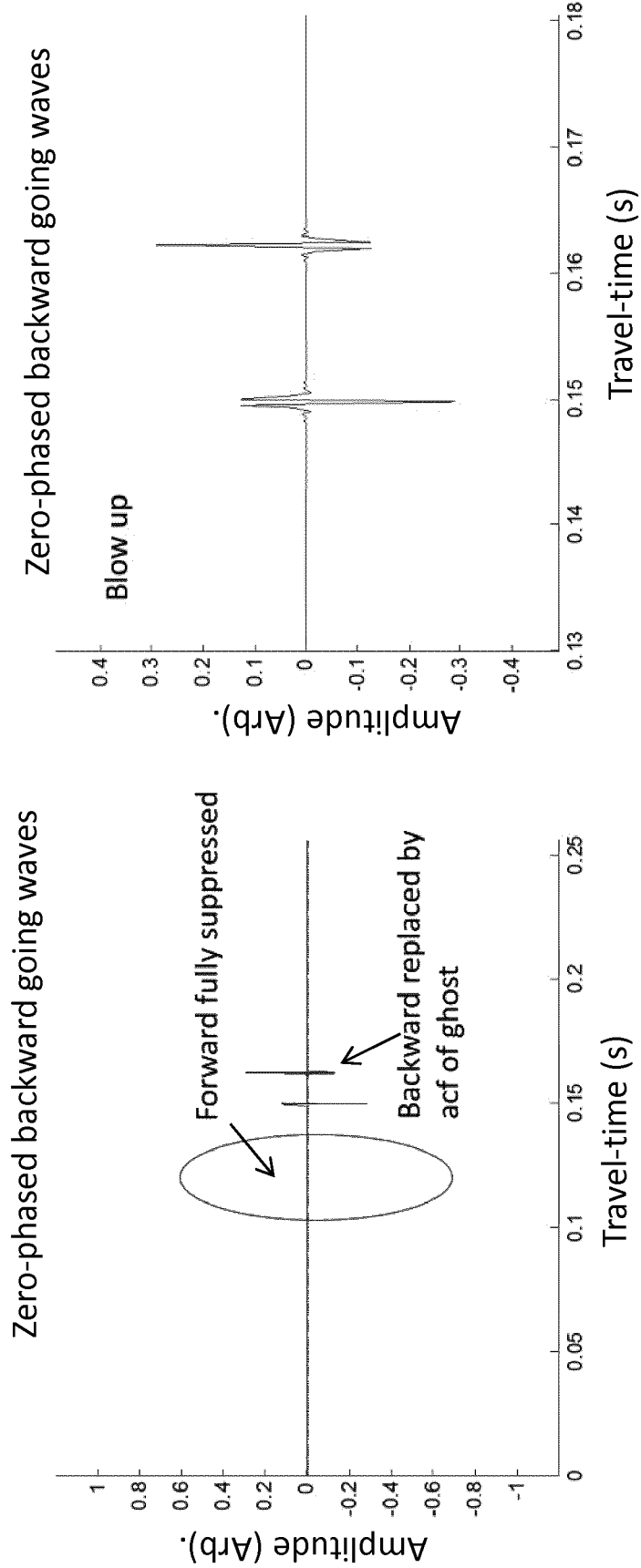
FIGS. 29A and 29B illustrate a result after zero-phasing of the introduced ghost.

As displayed in FIGS. 28A and 28B, after subtraction, i.e., H1-H2, the down-going waves are eliminated, as expected, but the up-going waves are "ghosted" with a polarity reversal. The introduced ghost has to now be attenuated in the further processing steps. The first step is the zero-phasing of the ghost, attenuating the phase error due to the ghost, as displayed in FIGS. 29A and 29B.

Figures 30A, 30B:
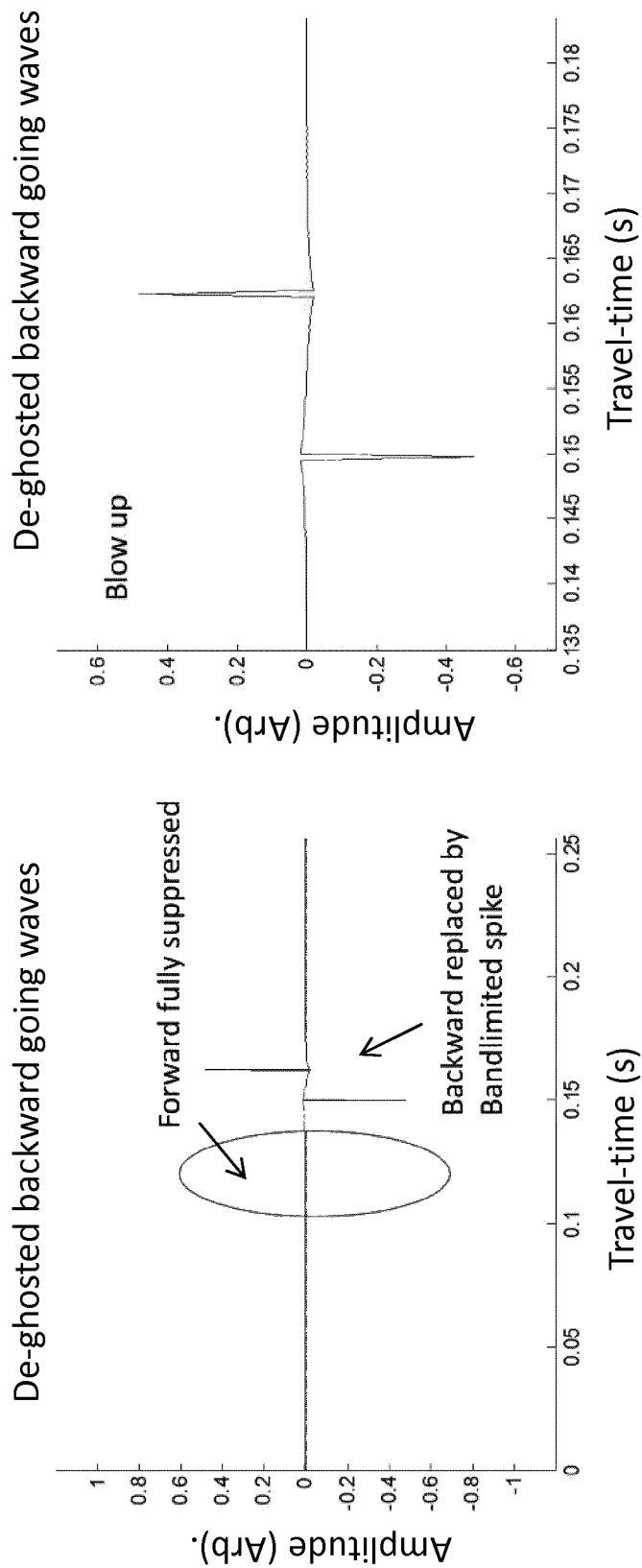
FIGS. 30A and 30B illustrate a result after amplitude correction filtering of the zero-phased up-going wave signals.

The next step is correction for the frequency dependent amplitude losses followed by spectral division with the power spectrum of the ghosting operation, see FIGS. 30A and 30B. Here we have extracted up-going waves from the two sensor data almost perfectly, albeit with a small amplitude error at very low frequencies. This relates to the attenuation of the signal in dispersive media. As the propagation distance increases the higher frequencies preferentially attenuate.

Figure 31:
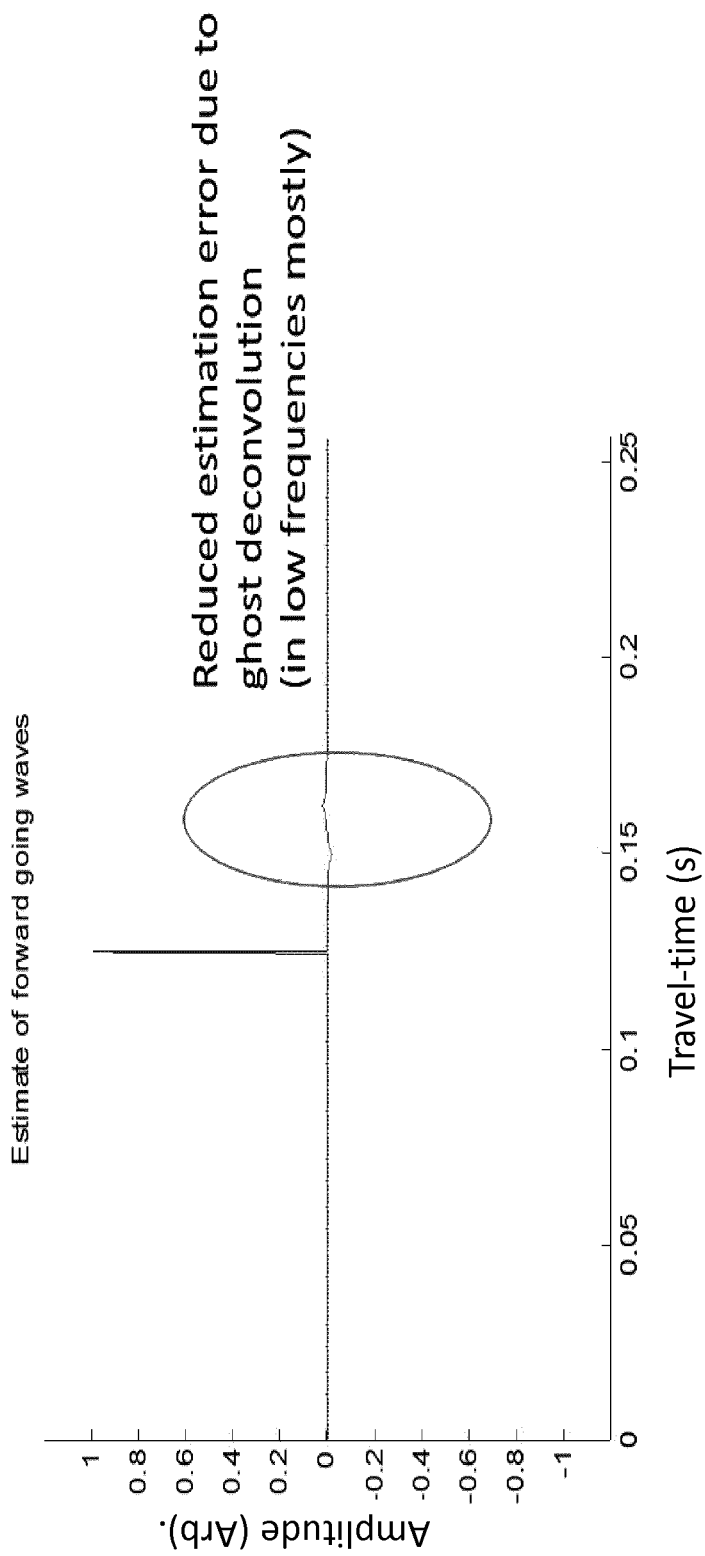
FIG. 31 illustrates the estimated down-going waves using the shift and subtract technique.

Subtraction, of the estimated down-going waves at the upper sensor H1 from the actual data at the upper sensor H1, results in the estimation of the down-going waves, using the shift and subtract technique. This result is shown in FIG. 31.

A method for data sharpening using deconvolution will now be described.

A sparse-spike deconvolution technique may be used which is based on basic matching-pursuit and has demonstrably good results in detecting the origin of a reflection signal in a conduit as follows.

Figure 32:
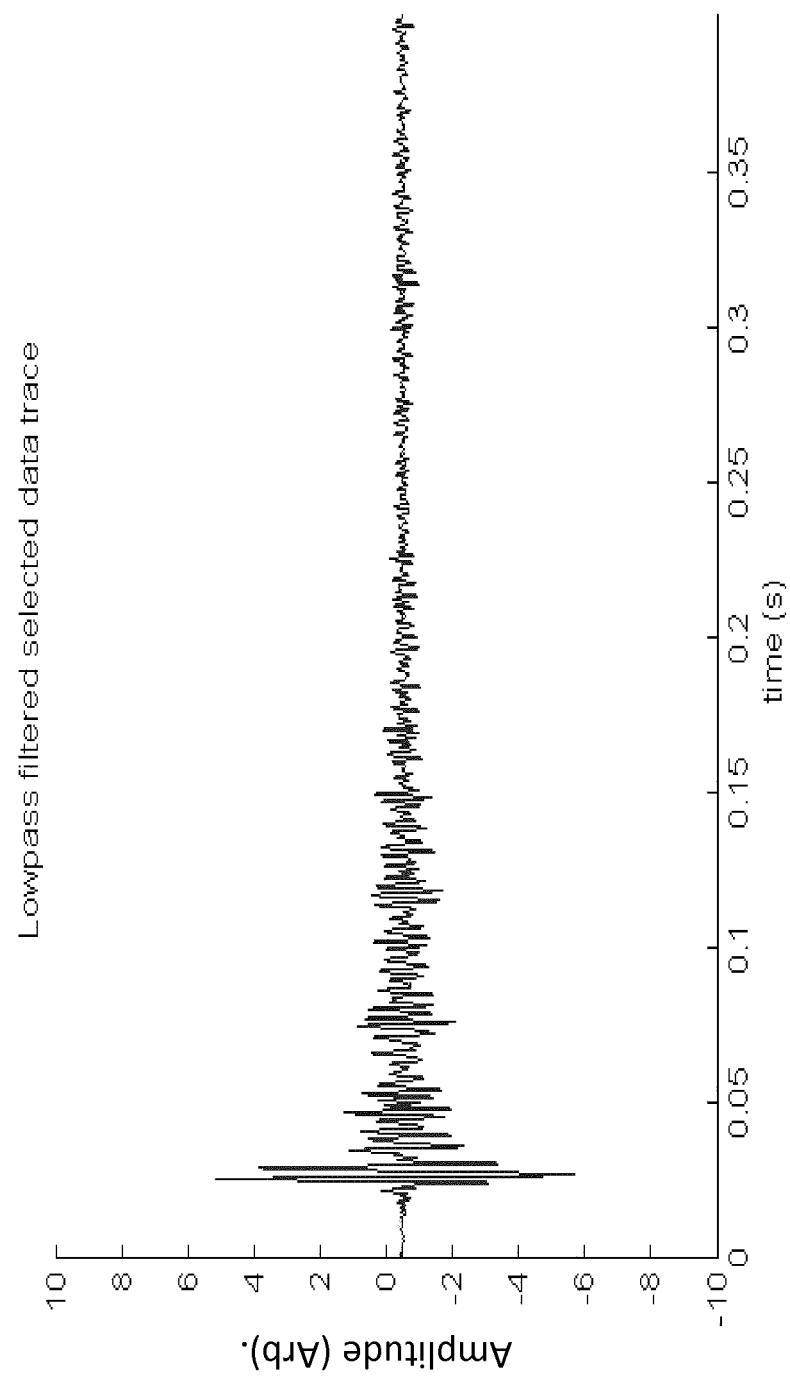
FIG. 32 illustrates a low-pass filtered data record (no sewer blockage)
Figure 33:
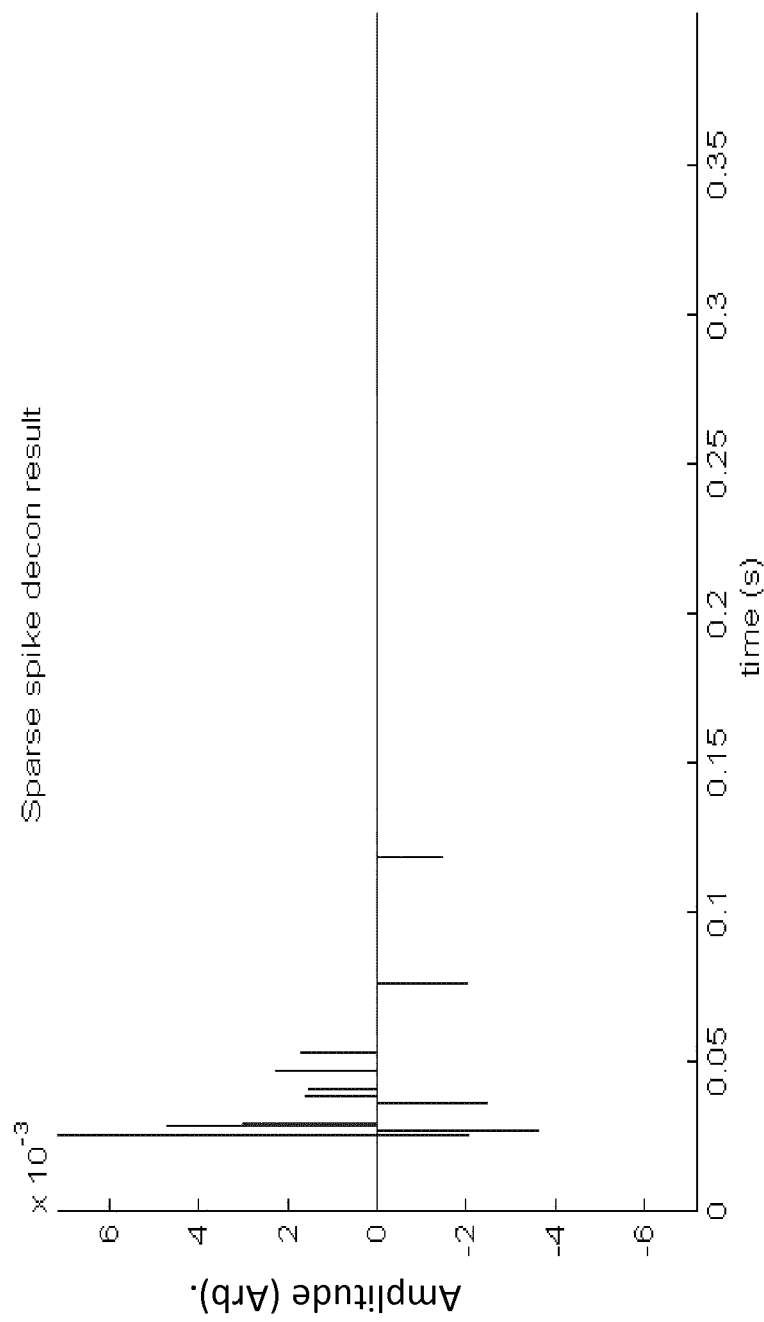
FIG. 33 illustrates a matching pursuit wavelet deconvolution (MPWD) result for data in FIG. 32, without any reflection signal detected after the direct arrival time of the source wavelet.
Figure 34:
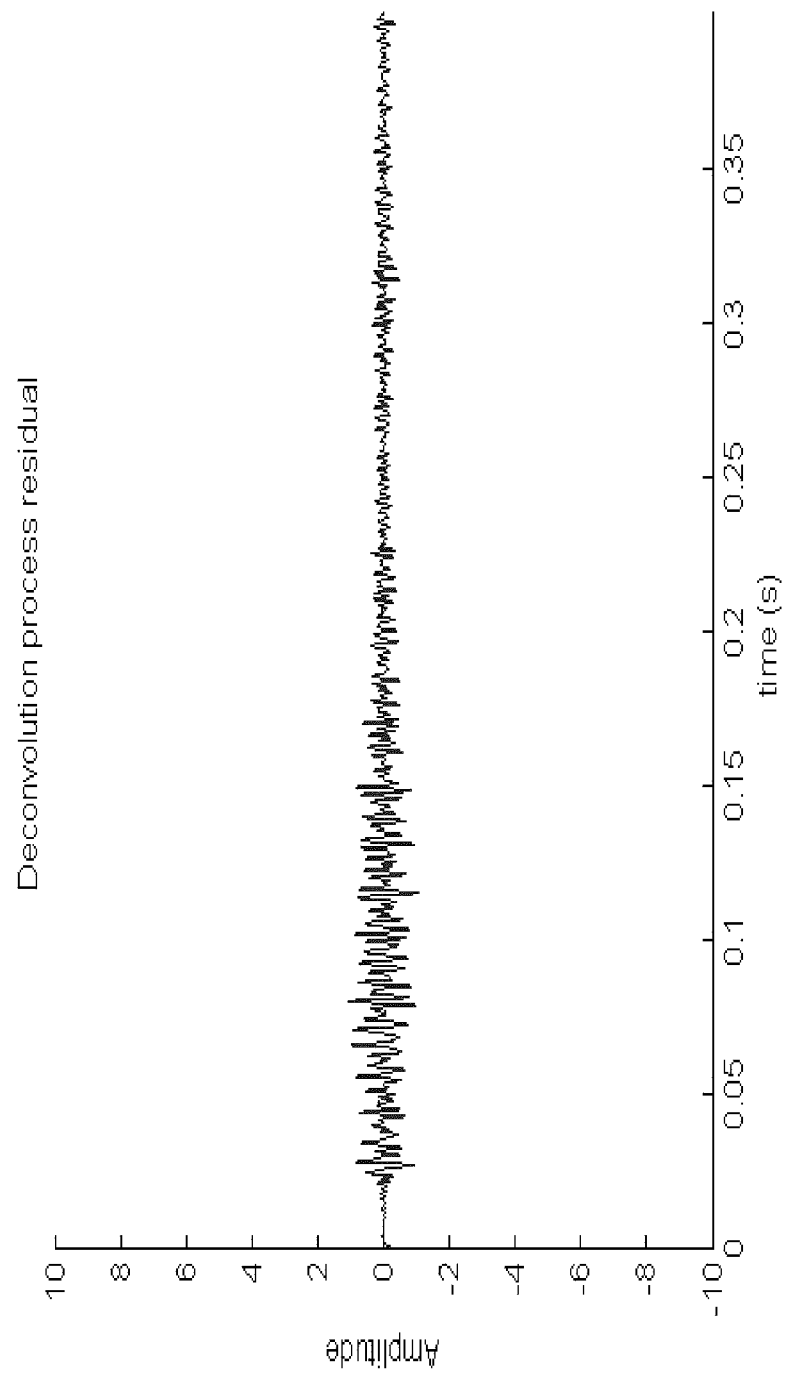
FIG. 34 illustrates residual data after MPWD of data in FIG. 32.

Illustration of Technique Using Real Data:

This example of the Sparse Spike Deconvolution technique uses two real data sets, the first acquired from a conduit without the presence of a blockage, the second with a blockage inserted at a known location. The data has been correlated with the sweep, such that the autocorrelation (act) of the sweep is deemed to be the source signal wavelet, to be deconvolved ("removed") from the data to increase temporal frequency bandwidth and anomaly detection. Conventional inverse filtering based deconvolution techniques fail here, as all they achieve is an amplification of the background noise outside of the frequency bandwidth of the source wavelet. A sparse-spike deconvolution technique hence is advised here (assuming that only a very small number of acoustically detectable blockages exist in the sewer, if any at all). Several algorithms are known do achieve sparse-spike deconvolution, which we have not tested in comparison here. We selected and implemented one based on matching pursuit we refer to as matching pursuit wavelet deconvolution (MPWD). MPWD is an iterative process which at each stage finds the temporal sample with the highest absolute amplitude. The corresponding sample of the deconvolved trace is estimated from the maximum amplitude. The scaled wavelet is then locally, i.e., centred at the temporal location of the maximum, subtracted from the input data. The algorithm together with a refinement called orthogonal matching pursuit (OMP) has been presented for seismic wavelet deconvolution by [1] Broadhead and Tonellot (2010), and further discussed by [2] Hargreaves et al. (2013). In FIG. 32 we show a data record from the sewer test in a sewer without blockage present. As to be expected strong amplitudes around the onset time of the direct wave fade soon into background noise. No individual reflection signal is visible in the noise level. This is confirmed in the MPWD result shown in FIG. 33. The deconvolution process residual is shown in FIG. 34, i.e., the original data has been split in the sparse-spike representation of the data in FIG. 33 and said residual in FIG. 34. FIG. 34 indicates that the residual is dominated by the background noise. Further reflection signal could not be detected.

Figure 35:
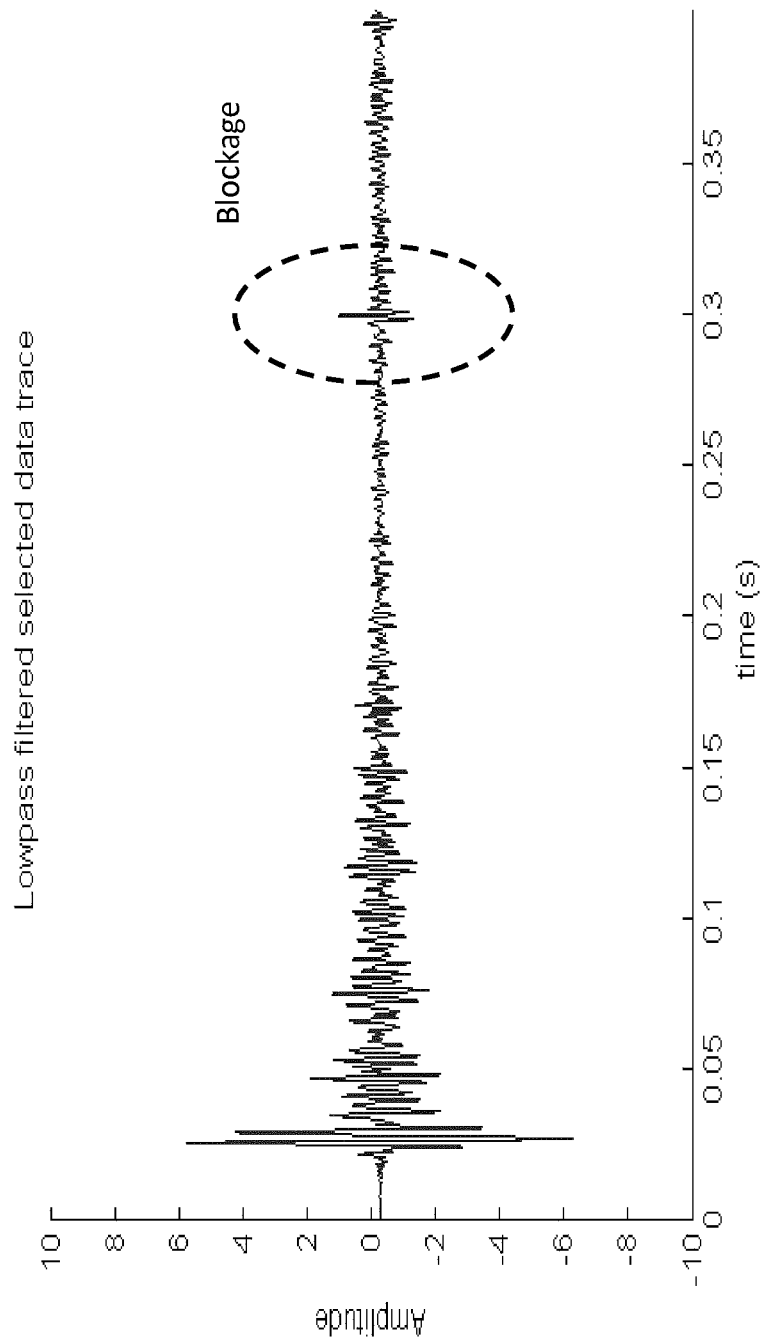
FIG. 35 illustrates a low-pass filtered data record (with temporary sewer blockage at two-way travel time of about 0.3 s)
Figure 36:
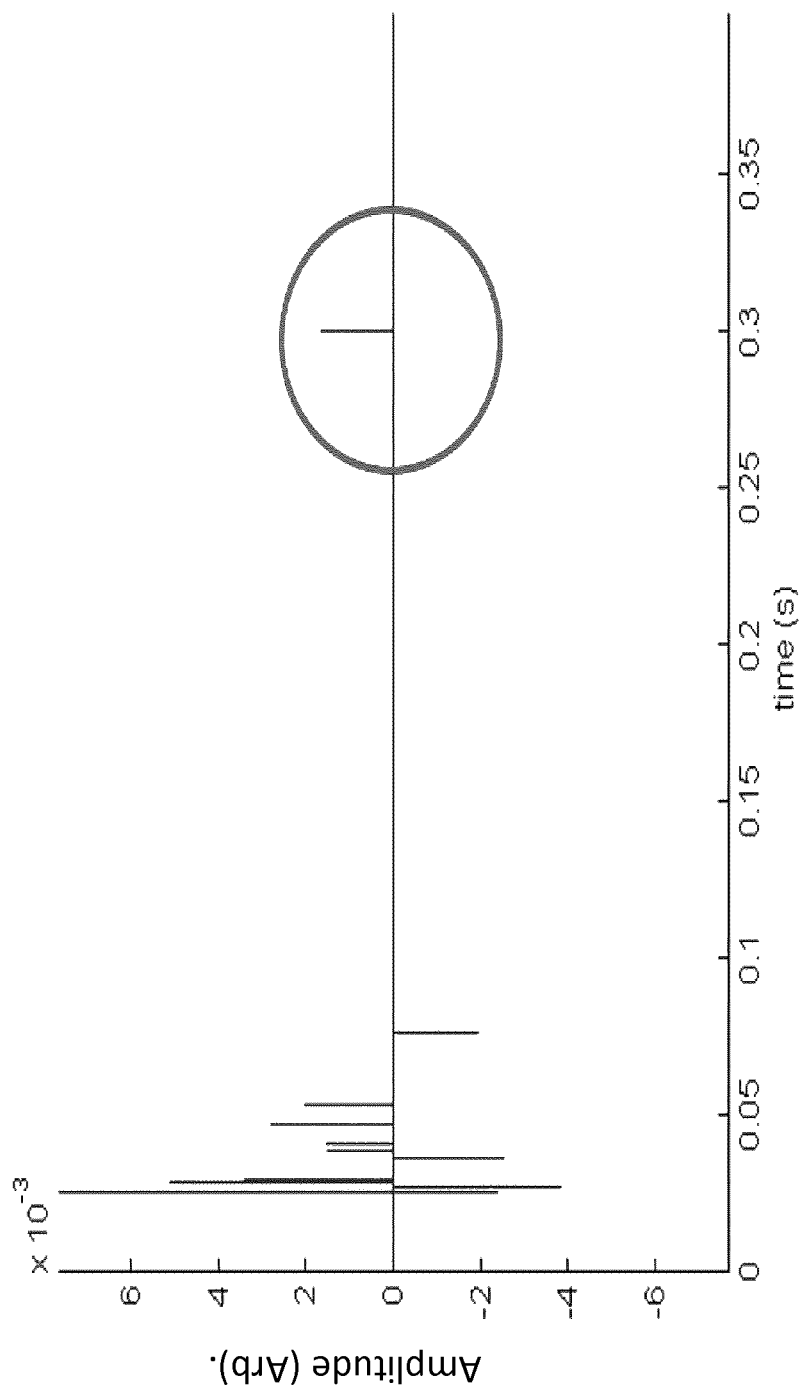
FIG. 36 illustrates a MPWD result for data in FIG. 35, clearly detecting a reflection signal at about 0.3 s two-way travel time.
Figure 37:
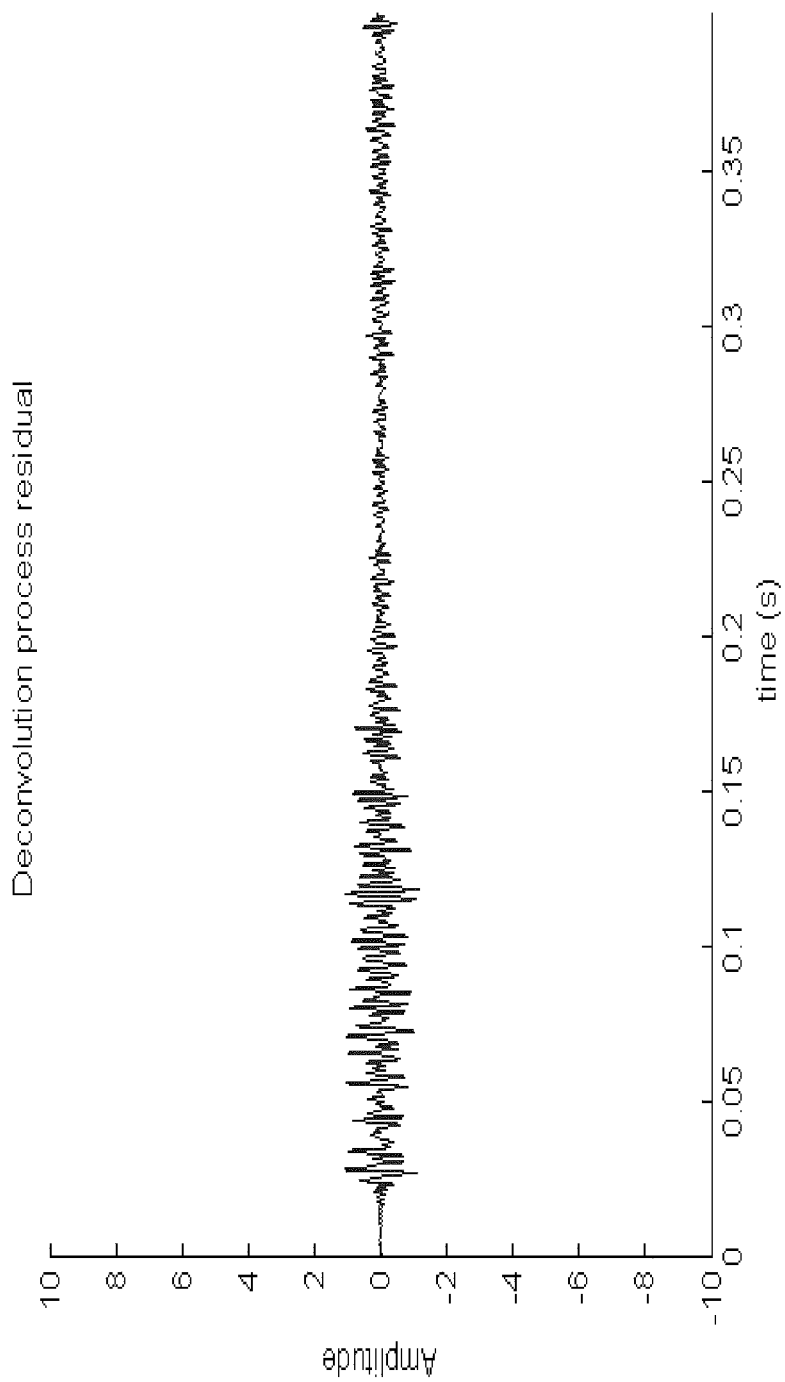
FIG. 37 illustrates residual data after MPWD of data in FIG. 35.

Next we apply MPWD to a data record acquired in the same sewer after application of a block some 50 m inside the sewer, at a two-way reflection travel time of about 0.3 s. This reflection signal is already clearly visible in the raw data in FIG. 35, but especially pronounced after MPWD (see FIG. 36). The deconvolution process residual is finally shown in FIG. 37, indicating that only background noise is left after MPWD.

This example indicates that MPWD can help in the automatic detection of reflection signal resulting from blockages in sewers. The reflection signal in the data analysed here is already clearly visible in the data record, but the deconvolved data is very likely superior as an automatic detection of the timing of the signal, and hence the distance of the blockage. We believe that the MPWD will not give detectable results if the signal to noise ratio is too low for visual detection of the signal.

Matching Pursuit Wavelet Deconvolution Algorithm

Figure 38:
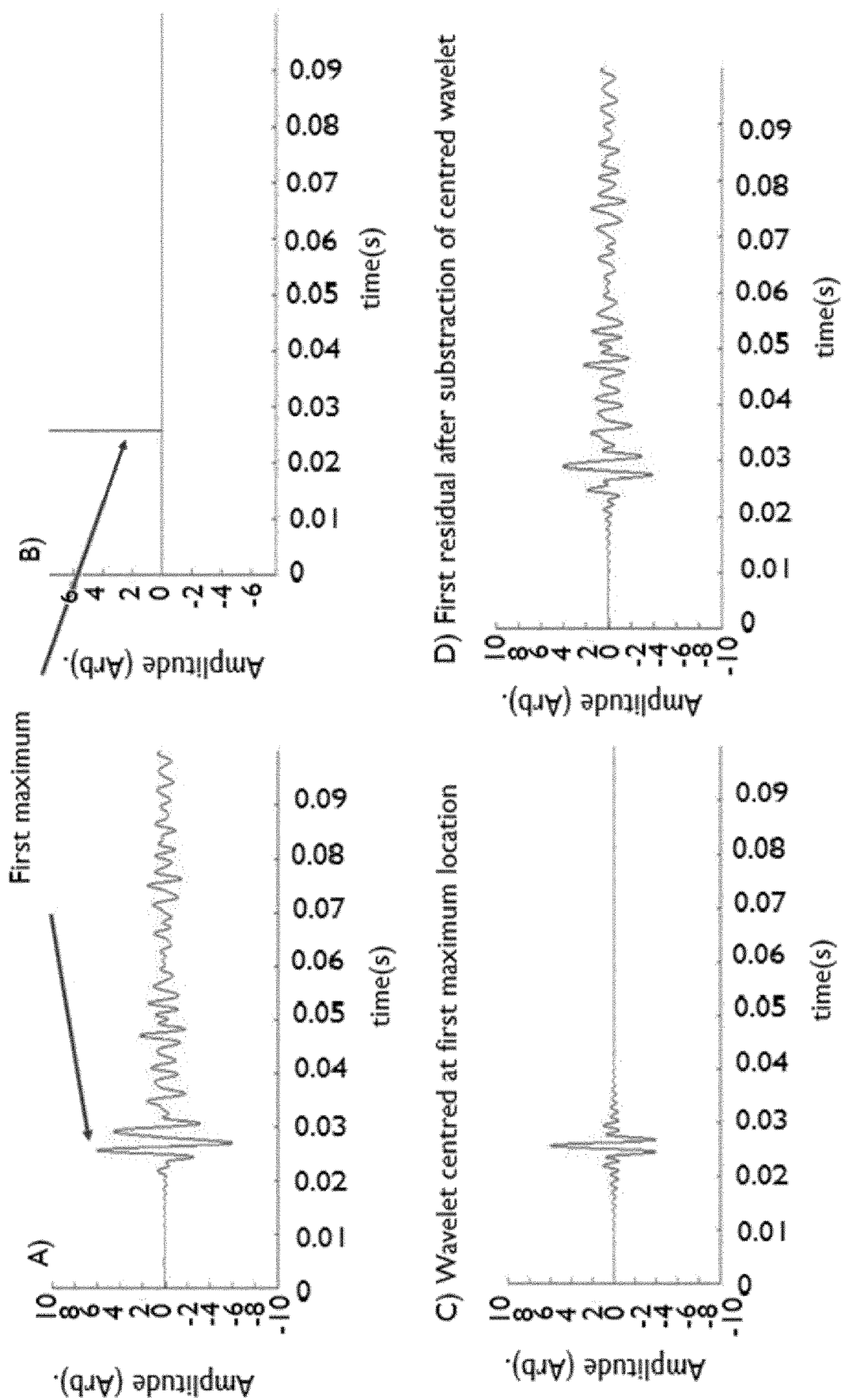
FIG. 38 illustrates first and consecutive iterative steps of MPWD.

A mathematical computer programming language, such as a Matlab function, may be used to realise the MPWD algorithm, which is a simple iterative process to locate the maximum amplitude and its temporal location, followed by a subtraction of the wavelet centred at that location, and after appropriate scaling. The first step of this iterative process is shown in FIG. 38. The original data is shown in FIG. 38A with the located maximum between 0.02 and 0.03 s, as indicated by the red arrow. The maximum amplitude is stored in the output array at the corresponding time sample, as shown in FIG. 38B. Also shown in FIG. 38C is the source wavelet centred at the location of the maximum amplitude in the data. This is subtracted from the original data yielding the first residual shown in FIG. 38D, which is the input to the next step of the iterative process.

A non-intrusive method for monitoring an air or fluid filled conduit will now be described.

Figure 39:
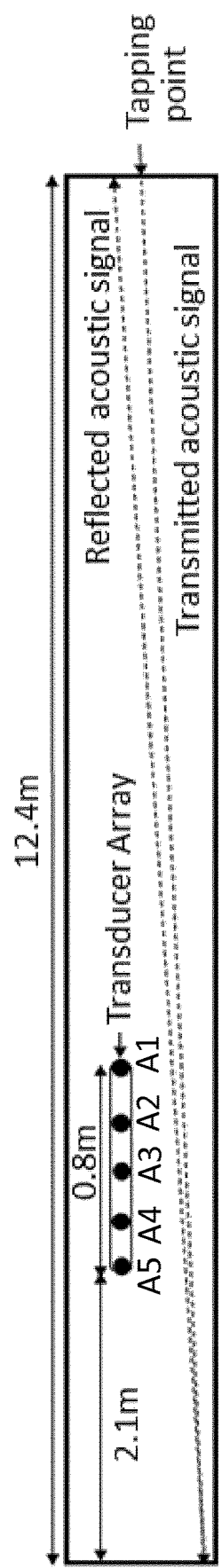
FIG. 39 is a schematic showing laboratory experiment surveying pipes using an external source and sensors.

A 12.4 m long, 0.15 m diameter polyurethane pipe was constructed from four, 3 m long sections joined by sockets couplers. The pipe was closed at both ends and was filled with water. An array of five accelerometers was located on the external wall of the pipe at approximately 2 m from one end and 9.5 m from the other end. The spacing between each accelerometer was 0.2 m and the length of the array was 0.8 m. An acoustic impulse was imparted by tapping, with a hammer, the far end of the pipe from which the accelerometer array was located. The experimental set-up is described by the schematic in FIG. 39.

Figure 40:
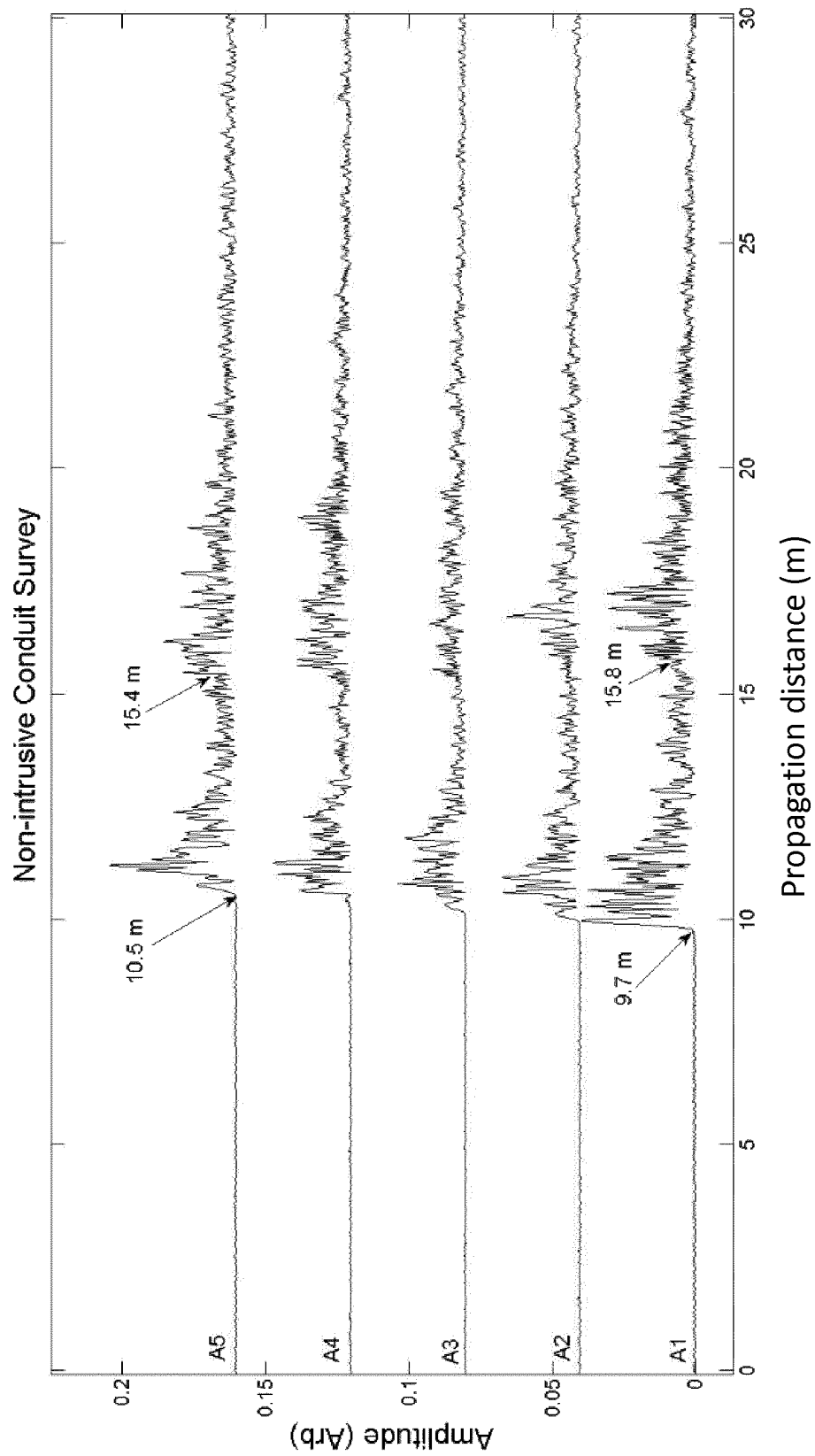
FIG. 40 illustrates signals recorded by an accelerometer array coupled to a fluid filled pipe.

FIG. 40 displays the data acquired (plotted as a function of total propagation distance) and two clear events were detected by each accelerometer. The first event is a consequence of the outgoing acoustic pulse and the 0.2 m spacing between each accelerometer is clearly reflected in the data. The second event represents the reflected signal. When considering A1, the distance travelled by the pulse between the two events is measured as being 6.1 m, thus demonstrating that the non-intrusive method described above is suitable for accurately surveying a fluid filled conduit with minimum disruption.

The invention provides the advantage of a means of rapidly surveying the status of conduits to detect partial or total blockages enables the identification of high risk obstructions. Further, more detailed investigations can then be made to identify the cause of the obstruction, or to bypass the obstruction.

Other advantages include the accurate location of a partial or total blockage or blockages and remove the requirement for personnel to go into the conduits or sewer to manually locate the blockage, identify its nature and plan remedial action. Further, the source and/or detector may be provided on a delivery vehicle, for example a remote-controlled vehicle such as a ground, air or water borne craft. This also minimises risks to personnel.

Figure 41A:
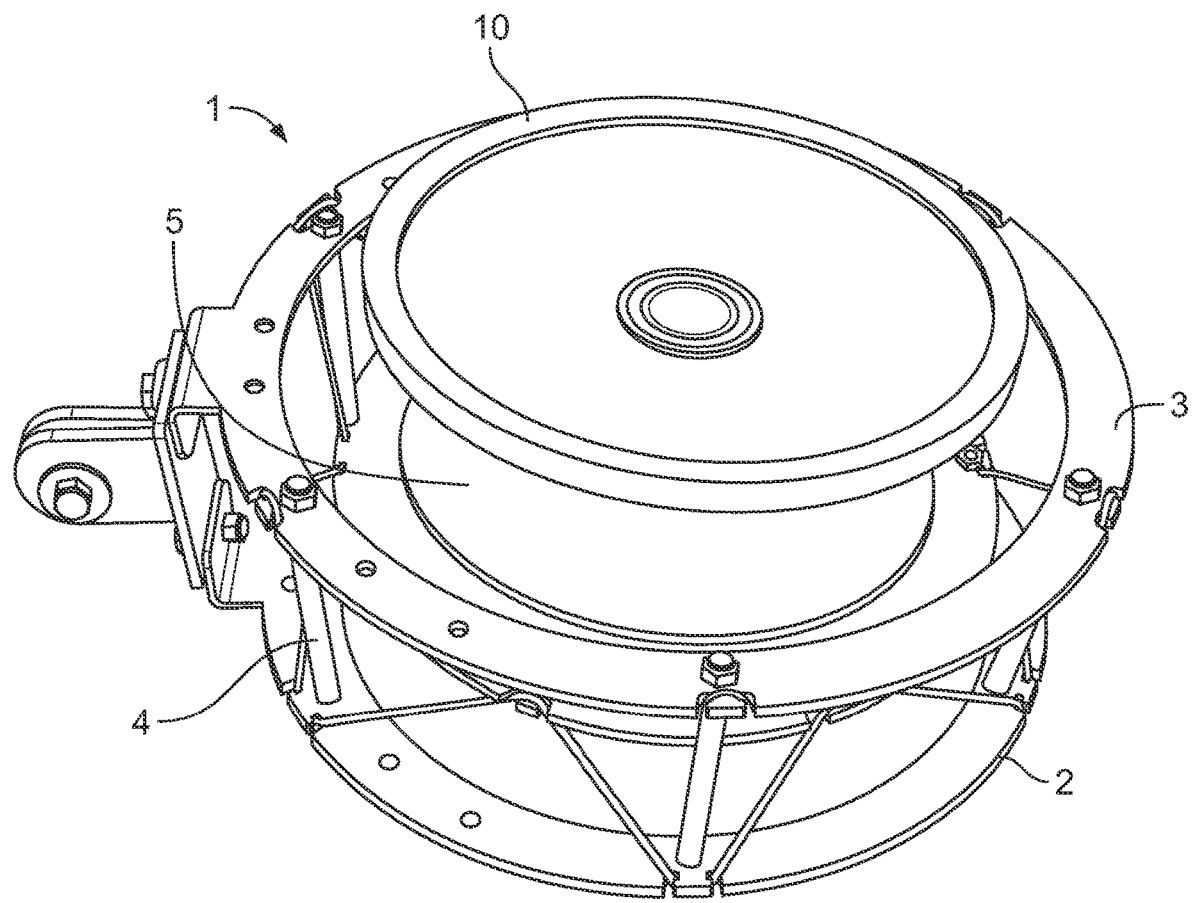
FIGS. 41A to 41C show a speaker and speaker housing apparatus formed in accordance with the present invention.
Figure 41B:
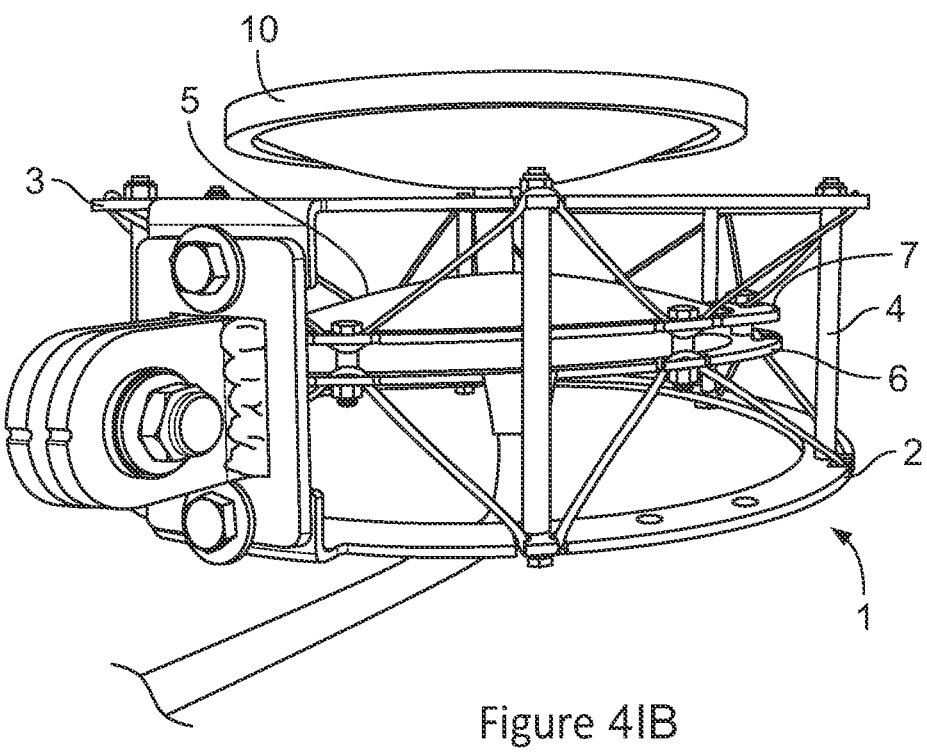
Figure 41C:
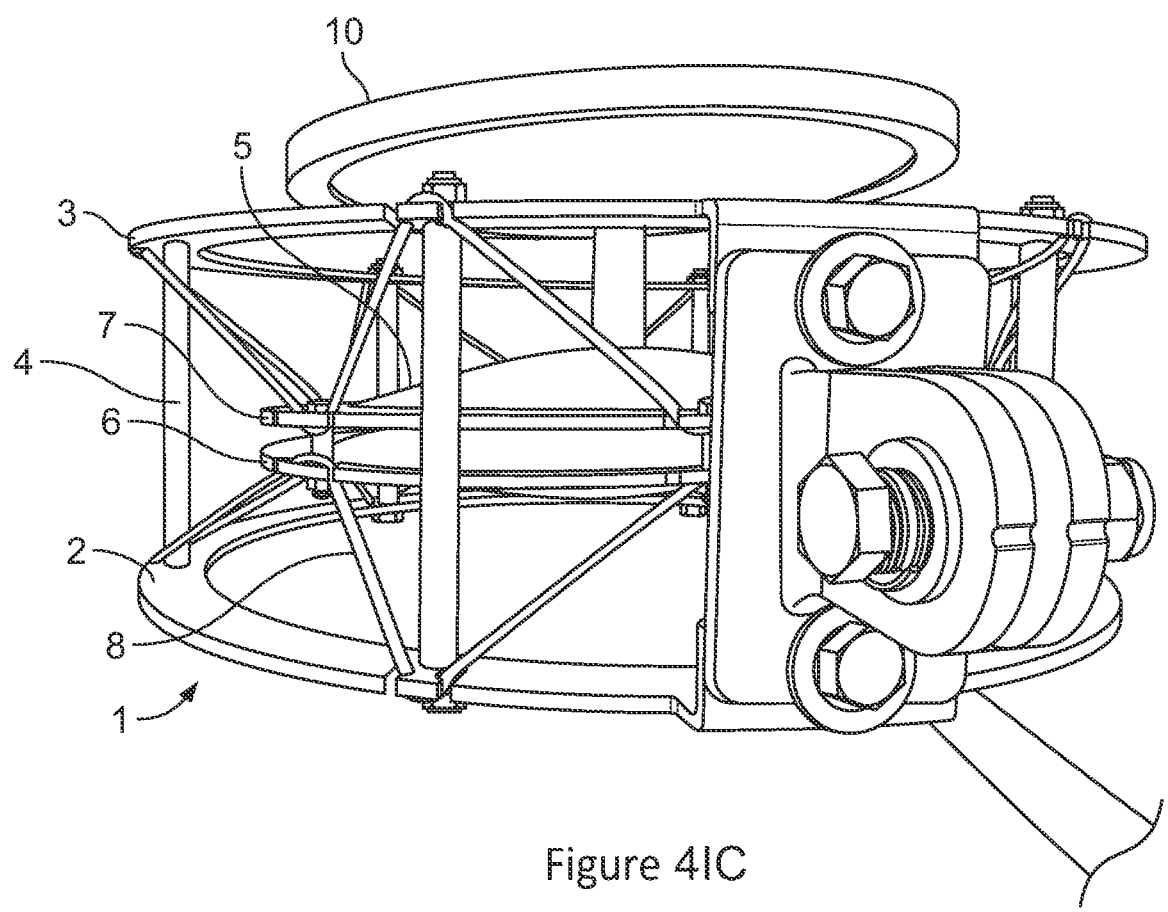
Figure 41D:
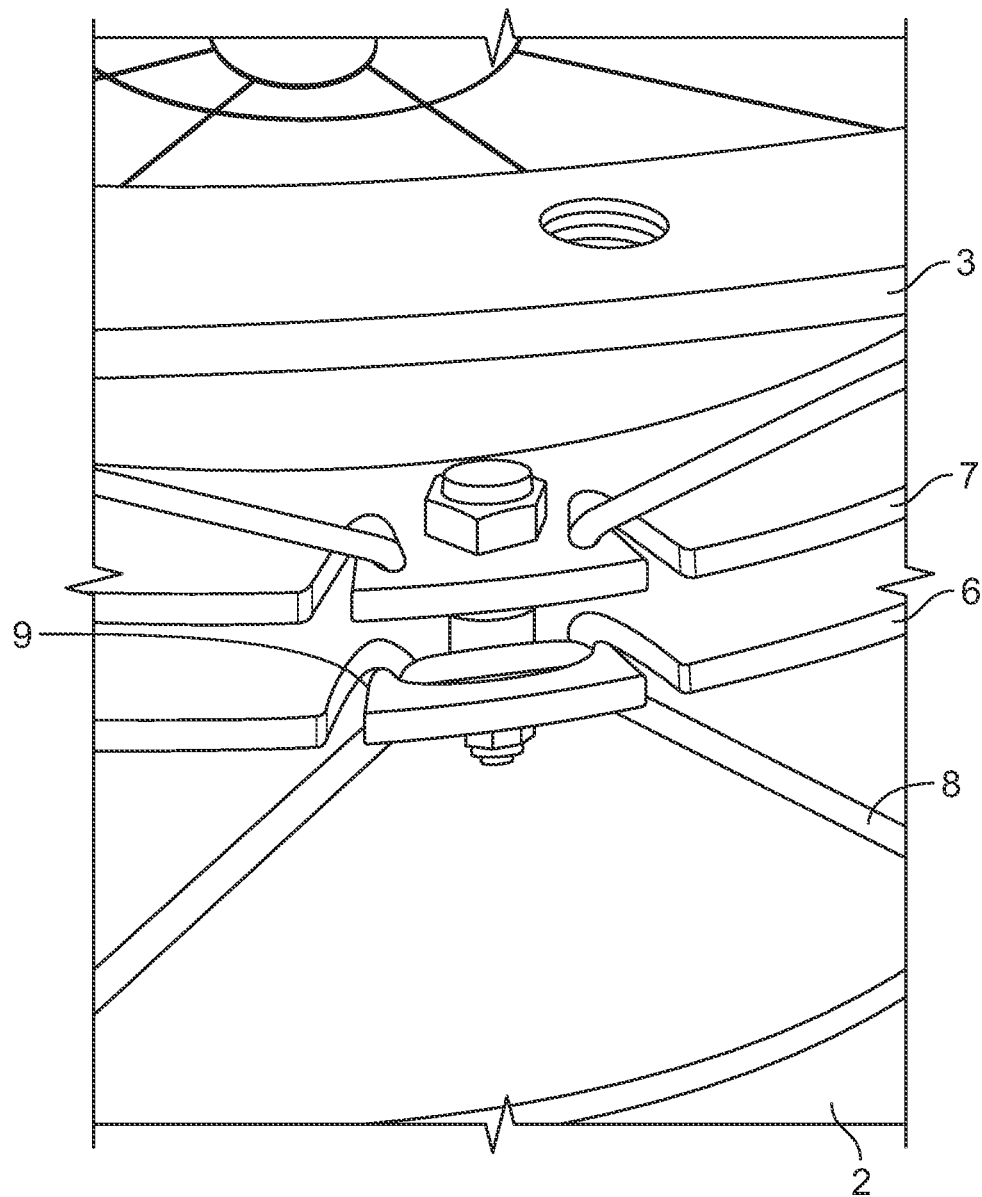
FIG. 41D shows a magnified view of a suspension cord attachment point on the housing of FIGS. 41A to 41C.

FIGS. 41A to 41C show a speaker assembly 1 comprising mutually spaced annular support rings 2, 3 joined by a plurality of circumferentially spaced axial bars 4. Suspended within the notional cylinder defined by the rings 2, 3 is a speaker 5. The periphery of the speaker 5 is held between two, smaller diameter, clamping rings 6, 7. The speaker 5 is suspended by a network of elastic cords 8, some of which are connected to the clamping rings 6 and to the support ring 2 and some of which are connected to the clamping ring 7 and the support ring 3. For this purpose the support rings 2, 3 and clamping rings 6, 7 are provided with hooked slots 9 (also see FIG. 41D). This isolates the speaker 5 from vibrations.

Mounted on the speaker is an acoustic sound lens 10 which is free to move and emits the acoustic signal in use.

In this embodiment the speaker arrangement is an underwater speaker.

Figure 42A:
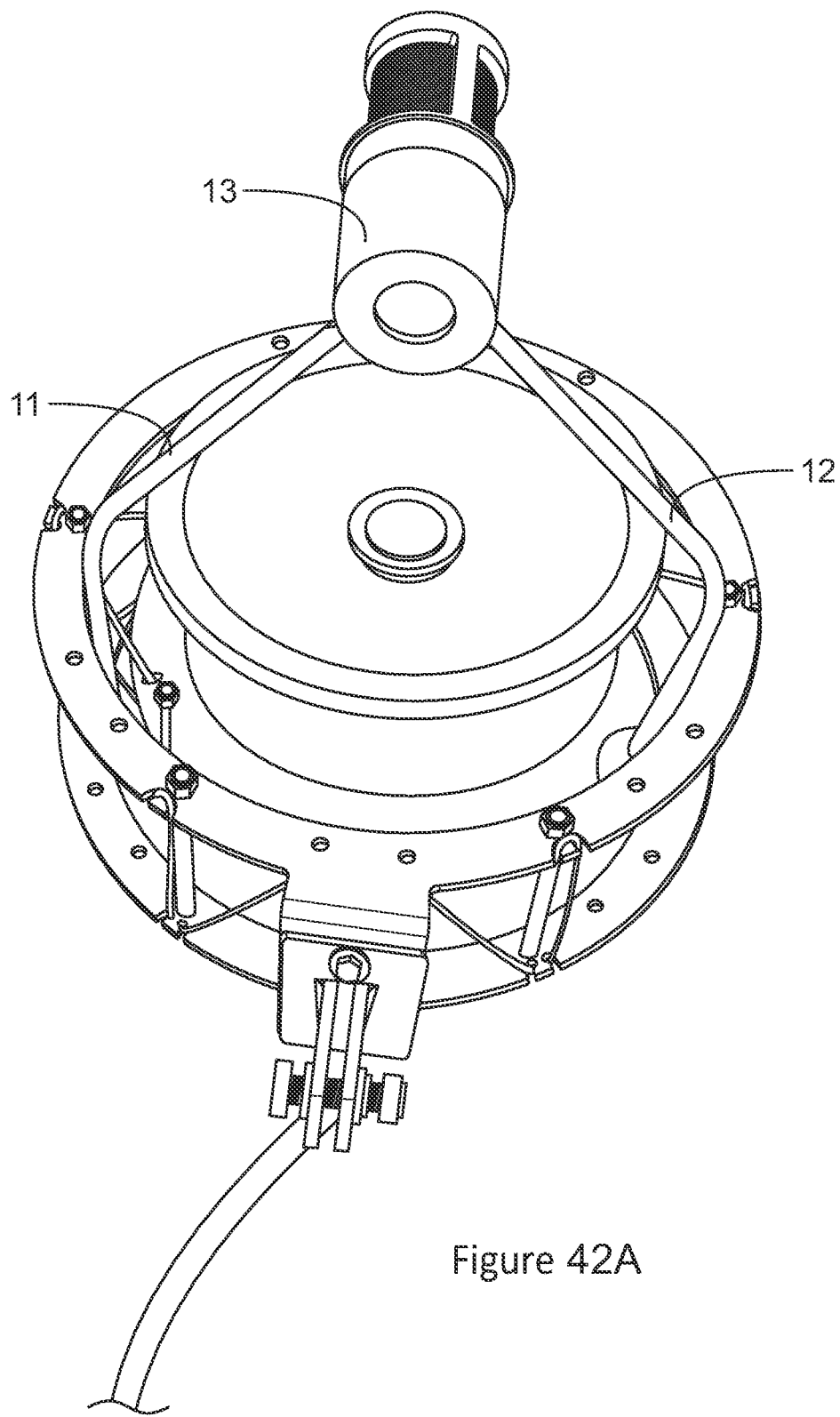
FIGS. 42A to 42C show the speaker/housing of FIGS. 41A to 41C with a microphone assembly fitted.
Figure 42B:
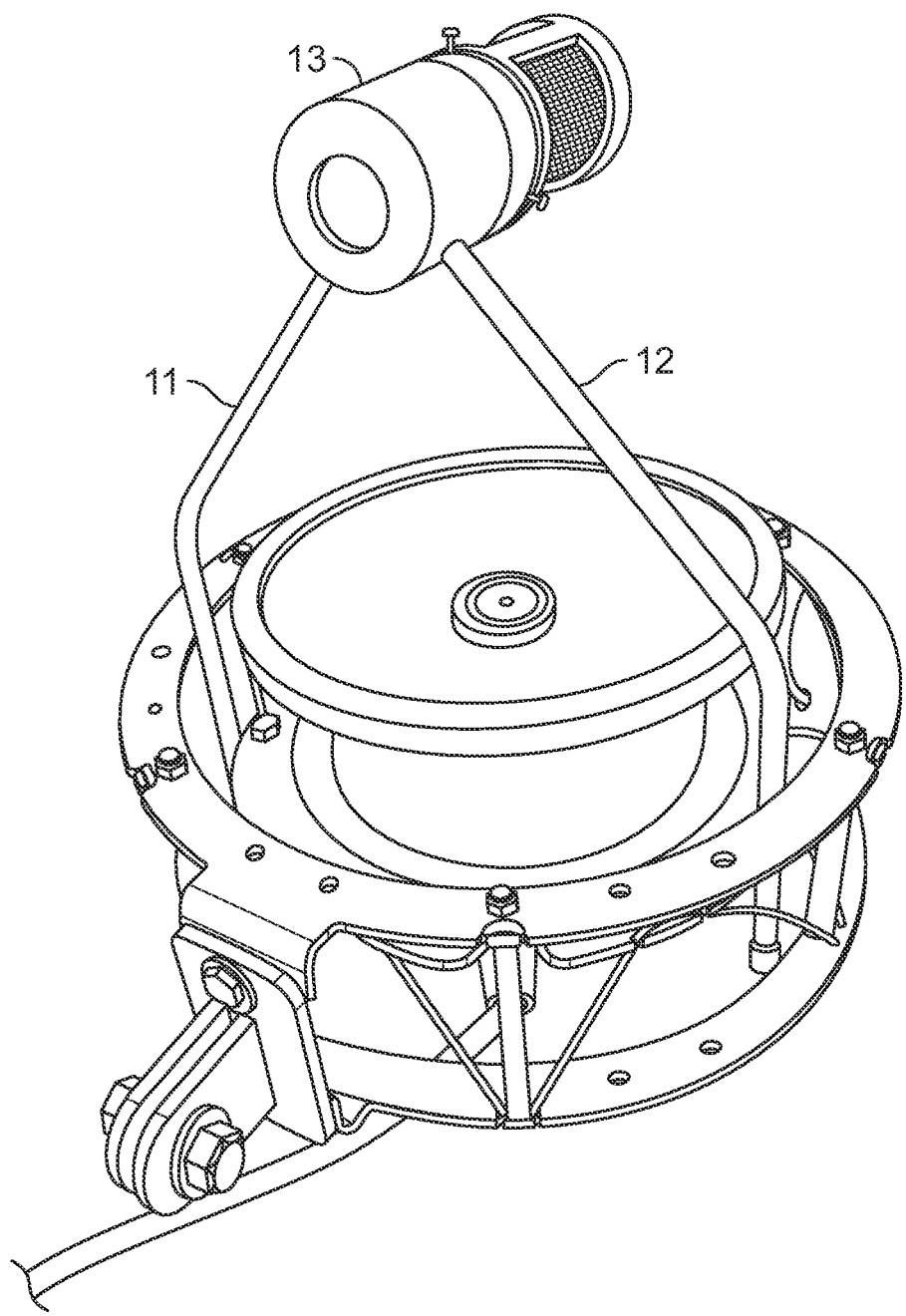
Figure 42C:
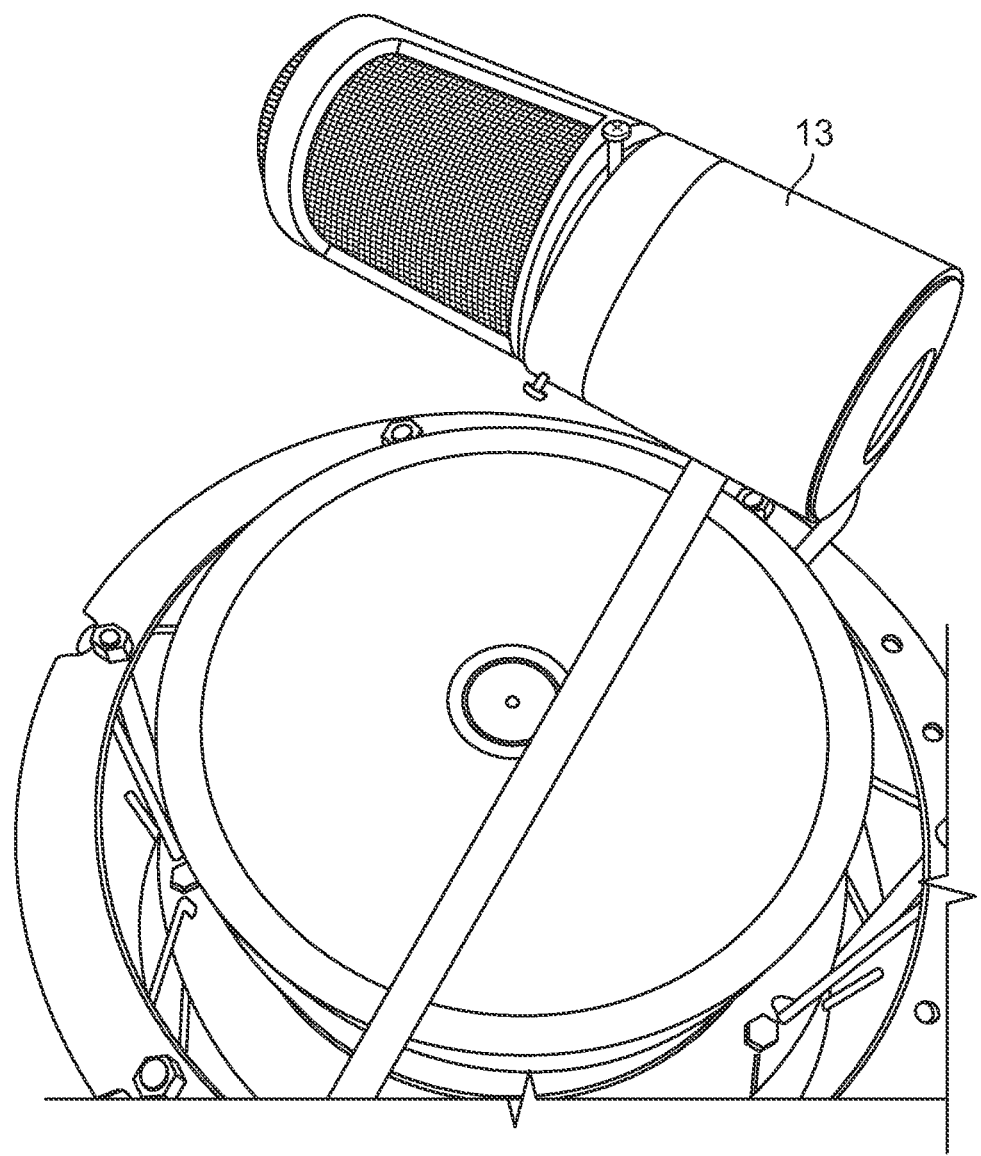

In FIGS. 42A to 42C a microphone assembly is provided and secured to the speaker assembly. A frame is provided in the form of two bent legs 11, 12 which attach to a microphone 13. In this embodiment the microphone is a hydrophone. The legs 11, 12 are fitted within the support rings 2, 3 of the speaker assembly. The microphone and speaker are isolated from each other. In some embodiments further vibration isolation means are employed, including foam and silicone.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

REFERENCES

[1] Broadhead, M. K. and T. L. Tonellot, 2010. Sparse seismic deconvolution by method of orthogonal matching pursuit. EAGE Meeting Barcelona.
[2] Hargreaves, N., S. Treitel, M. Smith, 2013. Frequency extension, resolution, and sparse inversion. SEG Houston Annual Meeting, http://dx.doi.org/10.1190/segam2013-0782.1.

The invention claimed is:

1. A system for monitoring a conduit, comprising:
an acoustic source, pointed in a direction, wherein the acoustic source emits a forward-traveling swept signal into the conduit in the direction that the acoustic source is pointing to establish an acoustic plane wave within the conduit, the acoustic plane wave being a guided wave to propagate along the conduit,
wherein the emitted signal is a linear frequency sweep; and
a pair of acoustic detectors for receiving one or more signals that are propagating along the conduit, wherein the acoustic source and the acoustic detectors are co-located within a housing.

2. The system according to claim 1, further comprising:
a memory for storing data relating to detected signals,
a processor for analysing signal data, wherein the analysis of signal data only from the pair of acoustic detectors in the housing provides determination of a condition of the conduit.

3. The system according to claim 1, wherein the conduit is a polyurethane pipe.

4. The system according to claim 1, further comprising a mount for locating the acoustic source and/or acoustic detector on an external wall of the conduit.

5. The system according to claim 1, arranged as a blockage detection system configured to generate an acoustic signal and receive a reflected acoustic signal.

6. The system of claim 1, wherein the acoustic source and the acoustic detector are vibrationally isolated from each other.

7. A method for monitoring the condition of a conduit comprising:
providing an acoustic source with a first detector and a second detector, wherein the acoustic source and the first and second detectors are co-located within a housing;
deploying, within a conduit, the acoustic source with the first and second detectors, wherein the acoustic source is pointed in a direction;
emitting a forward traveling swept signal from the acoustic source into the conduit in the direction that the acoustic source is pointing to establish an acoustic plane wave within the conduit, the acoustic plane wave being a guided wave,
detecting a reflected signal from the conduit using the first detector and the second detector, wherein the emitted signal is a linear frequency sweep;
determining, based on signal processing data obtained from the first detector and the second detector, a direction in which the sound is traveling; and
determining, based on the signal processing data, a condition of the conduit.

8. The method of claim 7, wherein the first and second detectors are omnidirectional microphones or omnidirectional hydrophones.

9. The method of claim 7, wherein the acoustic source and the first and second detectors are vibrationally isolated from each other within the housing.

10. The method of claim 7, wherein the conduit is selected from a group consisting of: a pipe, a pipeline, a culvert, a sewer, a drain, and a tunnel.

11. The method of claim 10, further comprising determining a condition of the conduit, wherein the condition is a blockage and the blockage is an improvised explosive device (IED) in the conduit.

12. The method of claim 7, wherein the conduit is an air-filled conduit.

13. The method of claim 7, wherein the conduit is filled with fluid.

14. The method of claim 7, wherein the conduit is part-filled with fluid and part-filled with gas.

15. The method of claim 7, wherein the acoustic plane wave has a frequency that is dependent upon a diameter of the conduit and the highest frequency has a wavelength that is larger than the diameter of the conduit.

16. A method for detecting a sewer blockage comprising:
identifying a sewer to be checked;
providing an acoustic source with a first detector and a second detector, wherein the acoustic source and the first and second detectors are co-located within a housing;
deploying, within a sewer, the acoustic source with the first and second detectors, wherein the acoustic source is pointed in a direction;
emitting a forward traveling swept signal from the acoustic source into the conduit in the direction that the acoustic source is pointing to establish an acoustic plane wave within the conduit, the acoustic plane wave being a guided wave,
detecting a reflected signal from the conduit using the first detector and the second detector, wherein the emitted signal is a linear frequency sweep; and
determining, based on signal processing data obtained from the first detector and the second detector, a direction in which the sound is traveling; and
determining, based on the signal processing data the location of a sewer blockage.

17. The method of claim 16, wherein the acoustic plane wave has a frequency that is dependent upon a diameter of the conduit and the highest frequency has a wavelength that is larger than the diameter of the conduit.

* * * * *